(12) United States Patent
Dahl et al.

(10) Patent No.: US 12,402,564 B2
(45) Date of Patent: Sep. 2, 2025

(54) OVER-CENTER LATCH WITH MOUNT, BASE PLATE, LEVER, AND CENTER PIN FOR COMBINE CONCAVES

(71) Applicant: CALMER HOLDING COMPANY, LLC, Lynn Center, IL (US)

(72) Inventors: Andrew Dahl, Lynn Center, IL (US); Marion Calmer, Alpha, IL (US); Daniel Wallerstedt, Rio, IL (US)

(73) Assignee: CALMER HOLDING COMPANY, LLC, Lynn Center, IL (US)

( * ) Notice: Subject to any disclaimer, the term of this patent is extended or adjusted under 35 U.S.C. 154(b) by 0 days.

(21) Appl. No.: 19/012,532

(22) Filed: Jan. 7, 2025

(65) Prior Publication Data

US 2025/0143221 A1 May 8, 2025

Related U.S. Application Data

(63) Continuation-in-part of application No. 18/676,197, filed on May 28, 2024, now Pat. No. 12,225,855, and a continuation-in-part of application No. 18/520,943, filed on Nov. 28, 2023, which is a continuation of application No. 29/868,301, filed on Nov. 29, 2022, now Pat. No. Des. 1,058,613.

(Continued)

(51) Int. Cl.
*A01F 12/16* (2006.01)
*A01D 41/12* (2006.01)
*A01F 12/26* (2006.01)
*E05C 19/14* (2006.01)

(52) U.S. Cl.
CPC .......... *A01F 12/16* (2013.01); *A01D 41/1261* (2013.01); *A01F 12/26* (2013.01); *E05C 19/14* (2013.01)

(58) Field of Classification Search
CPC .......... E05C 19/14; A01F 12/16; A01F 12/26; A01D 41/1261
See application file for complete search history.

(56) References Cited

U.S. PATENT DOCUMENTS 1,002,901 A * 9/1911 Christman ............ B60P 7/0838
                                                    267/74
1,840,037 A   1/1932 Johansson
(Continued)

FOREIGN PATENT DOCUMENTS

DE    4431372 A1 *  8/1995  ............ E05C 19/14
FR     590033 A     6/1925
FR    2726161 B1    5/1996

OTHER PUBLICATIONS

International Search Report and Written Opinion in PCT/US2023/081250, 13 pages, mailed Apr. 18, 2024.
(Continued)

*Primary Examiner* — Arpad Fabian-Kovacs
(74) *Attorney, Agent, or Firm* — HAMILTON IP LAW; Jay R. Hamilton

(57) ABSTRACT

An over-center latch for a concave combine comprises a mount directly attached to a concave combine or an accessory for a concave combine, a base plate, a lever with a loop at one end that is configured to attach to a catch, and a center pin that allows the lever to rotate with respect to a handle. Either the handle or the lever can be pulled into a vertical position.

19 Claims, 70 Drawing Sheets

Related U.S. Application Data

(60) Provisional application No. 63/579,718, filed on Aug. 30, 2023, provisional application No. 63/488,584, filed on Mar. 6, 2023.

(56) References Cited

U.S. PATENT DOCUMENTS

| | | | |
|---|---|---|---|
| 3,162,419 A * | 12/1964 | Blasingame | F16M 7/00 403/325 |
| 3,519,298 A * | 7/1970 | Gley | E05C 19/14 292/108 |
| 3,568,682 A | 3/1971 | Knapp et al. | |
| 4,004,404 A | 1/1977 | Rowland-Hill et al. | |
| 4,218,081 A * | 8/1980 | Johnson | E05C 19/14 292/66 |
| D257,218 S * | 10/1980 | Eriksson | D8/336 |
| 4,407,493 A | 10/1983 | Okolischan | |
| 4,422,218 A | 12/1983 | Brasseux | |
| 4,493,133 A * | 1/1985 | Nilsson | E05C 19/14 24/68 CD |
| 4,711,075 A | 12/1987 | Strong | |
| 4,711,252 A | 12/1987 | Bernhardt et al. | |
| D329,686 S * | 9/1992 | Mathison | D23/249 |
| D329,687 S * | 9/1992 | Benson | D23/249 |
| 5,165,148 A * | 11/1992 | Fleischer | B25B 5/12 292/113 |
| 5,478,125 A * | 12/1995 | Gromotka | E05C 19/14 292/113 |
| 5,489,239 A * | 2/1996 | Matousek | A01F 12/28 460/109 |
| 5,667,261 A | 9/1997 | Weinerman et al. | |
| 5,919,087 A | 7/1999 | Strong | |
| 6,179,350 B1 * | 1/2001 | Ely | E05C 19/14 292/285 |
| 6,374,465 B1 | 4/2002 | Dykstra | |
| 6,561,556 B2 * | 5/2003 | Fuchs | B65D 45/345 292/250 |
| 7,001,268 B2 * | 2/2006 | Puryk | A01F 12/185 460/59 |
| 7,017,955 B1 * | 3/2006 | Chiang | E05C 19/14 292/113 |
| 7,059,961 B2 * | 6/2006 | Schenk | A01D 75/182 460/59 |
| 7,118,475 B2 | 10/2006 | Schenk | |
| 7,156,429 B2 * | 1/2007 | Eriksson | F16B 2/185 292/113 |
| 7,213,848 B2 * | 5/2007 | Hagan | E05C 19/14 24/494 |
| 7,285,043 B2 | 10/2007 | Foster et al. | |
| D624,939 S | 10/2010 | Flickinger et al. | |
| 8,454,416 B1 | 6/2013 | Estes | |
| D687,659 S | 8/2013 | MacKenzie | |
| 8,561,973 B2 * | 10/2013 | Martin | E05C 19/14 269/201 |
| 8,690,652 B1 | 4/2014 | Estes | |
| 8,721,411 B2 | 5/2014 | Reiger et al. | |
| D727,134 S | 4/2015 | Yamamoto et al. | |
| 9,080,353 B2 | 7/2015 | Washio | |
| D735,772 S | 8/2015 | Ricketts et al. | |
| 9,504,204 B2 | 11/2016 | Kile | |
| 9,723,791 B1 | 8/2017 | Kile | |
| 9,763,390 B2 | 9/2017 | Matway et al. | |
| 9,913,431 B2 | 3/2018 | Van Hullebusch | |
| 10,045,487 B1 | 8/2018 | Robertson | |
| 10,143,141 B2 | 12/2018 | De Witte | |
| 10,405,494 B2 | 9/2019 | Regier | |
| 10,440,893 B2 | 10/2019 | Kile | |
| 10,602,667 B2 | 3/2020 | Ritter | |
| 10,779,474 B2 | 9/2020 | Ritter | |
| 10,849,275 B2 | 12/2020 | Estes | |
| 10,869,427 B2 | 12/2020 | Robertson | |
| 10,905,050 B2 | 2/2021 | Robertson | |
| 11,116,136 B2 | 9/2021 | Robertson | |
| 11,122,743 B2 | 9/2021 | Robertson | |
| 11,317,566 B2 | 5/2022 | Koudela | |
| D954,759 S | 6/2022 | Robertson | |
| 11,375,667 B2 | 7/2022 | Broholm et al. | |
| 11,497,171 B2 | 11/2022 | Theisen et al. | |
| 11,877,538 B1 | 1/2024 | Calmer et al. | |
| 2007/0178951 A1 | 8/2007 | Voss et al. | |
| 2015/0250101 A1 | 9/2015 | Kile | |
| 2015/0313085 A1 | 11/2015 | Coppinger | |
| 2016/0345499 A1 | 12/2016 | Van Hullebusch | |
| 2017/0105351 A1 | 4/2017 | Matway | |
| 2018/0084728 A1 | 3/2018 | Reiger | |
| 2018/0103588 A1 | 4/2018 | Ritter | |
| 2018/0352746 A1 | 12/2018 | Ritter et al. | |
| 2018/0359926 A1 | 12/2018 | Estes | |
| 2019/0037773 A1 | 2/2019 | Theisen et al. | |
| 2019/0159403 A1 | 5/2019 | Haar et al. | |
| 2019/0166767 A1 | 6/2019 | Robertson | |
| 2019/0166768 A1 | 6/2019 | Robertson | |
| 2019/0200529 A1 | 7/2019 | Robertson | |
| 2020/0196530 A1 | 6/2020 | Van Hullebusch et al. | |
| 2021/0015048 A1 | 1/2021 | Kile | |
| 2021/0105946 A1 | 4/2021 | Robertson | |
| 2022/0194149 A1 | 6/2022 | Choe | |

OTHER PUBLICATIONS

John Deere, Product Catalog, www.JohnDeere.com, 128 pages, Spring 2021.

* cited by examiner

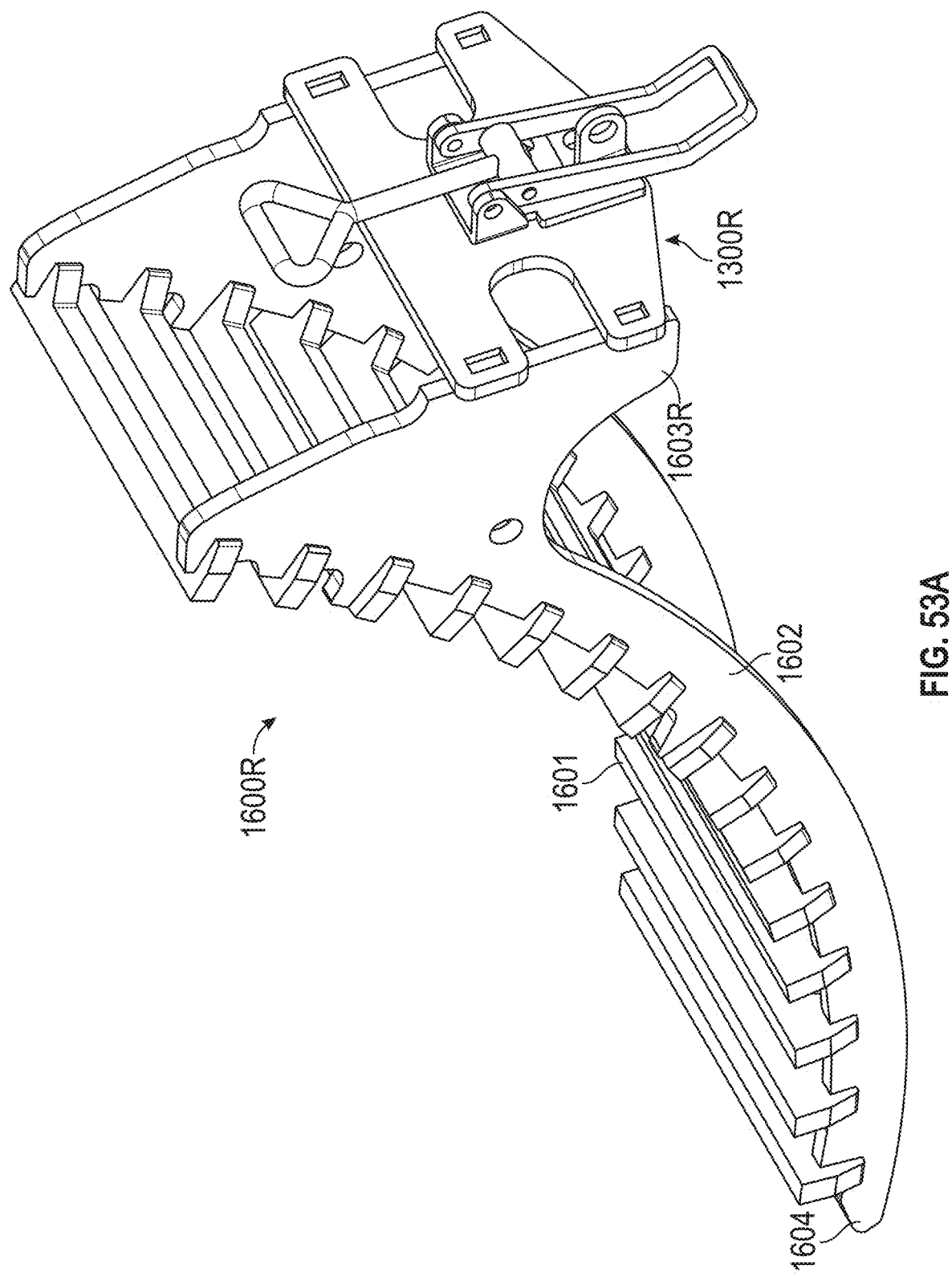

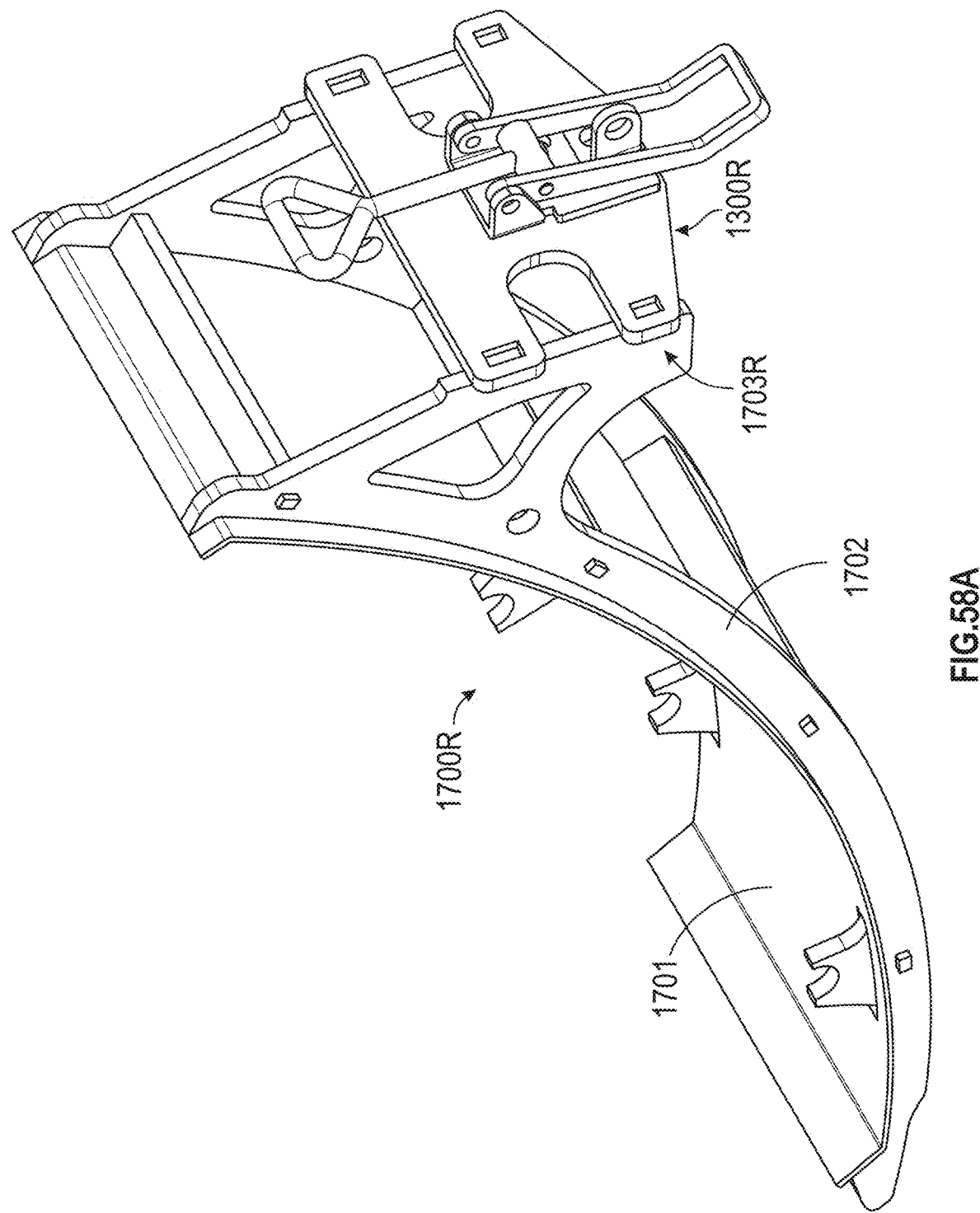

OVER-CENTER LATCH WITH MOUNT, BASE PLATE, LEVER, AND CENTER PIN FOR COMBINE CONCAVES

CROSS REFERENCE TO RELATED APPLICATIONS

This application is a continuation-in-part (CIP) application of U.S. Ser. No. 18/676,197, titled "KITS AND COMPONENTS FOR REGULATING THE FLOW OF MATERIAL OTHER THAN GRAIN THROUGH COMMON CONCAVES WHILE SIMULTANEOUSLY EQUALIZING THE FLOW OF GRAIN THROUGH COMMON CONCAVES", filed May 28, 2024, which is a continuation-in-part (CIP) application of U.S. Ser. No. 18/520,943, titled "METHODS OF REGULATING THE FLOW OF MATERIAL OTHER THAN GRAIN THROUGH COMMON CONCAVES WHILE SIMULTANEOUSLY EQUALIZING THE FLOW OF GRAIN THROUGH COMMON CONCAVES", filed Nov. 28, 2023, which claims priority under 35 U.S.C. § 119 to provisional patent applications U.S. Ser. No. 63/488,584, titled "SERIES OF ACTUATABLE MATERIAL OTHER THAN GRAIN LIMITING INSERTS FOR COMMON CONCAVE", filed Mar. 6, 2023; and U.S. Ser. No. 63/579,718, titled "METHODS OF REGULATING THE FLOW OF MATERIAL OTHER THAN GRAIN THROUGH COMMON CONCAVES WHILE SIMULTANEOUSLY EQUALIZING THE FLOW OF GRAIN THROUGH COMMON CONCAVES", filed Aug. 30, 2023; and further claims priority under 35 U.S.C. § 120 to design patent application U.S. Ser. No. 29/868,301, titled "LIMITER PLATES", filed Nov. 29, 2022, now U.S. Design Pat. No. D1,058,613, issued Jan. 21, 2025. These applications and provisional patent applications are herein incorporated by reference in their entireties, including without limitation, the specification, claims, and abstract, as well as any figures, tables, appendices, or drawings thereof.

TECHNICAL FIELD

The present disclosure relates generally to an apparatus and method applicable to the harvest of agricultural crops including a variety of small grain crops. A persistent problem presented to farmers in the threshing operation is the separation of the grain from the plant's stems, leaves, weeds, volunteer plants, and other trash or foreign materials, all of which is referred to as material(s) other than grain (MOG), which are all introduced to the combine in the harvest operation. Critical to maximizing the capture of the grain in harvest and the return obtained by the farmer is the robust, yet efficient separation of the grain from MOG. In particular, but not exclusively, the present disclosure relates to a series of MOG limiting devices that attach to and function in cooperation with a concave positioned within a combine.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Historically, a number of issues confront the farmer in conjunction with the harvest of large grains and small grains. In one regard, a problem presented to the farmer in harvest is the successful separation of the grain from the MOG which includes the application of abrasing forces upon the crop by acting upon itself as well as the metallic threshing components in the rotor chamber of the combine. Once the grain is separated, there is a need to rapidly direct the grain out of the rotary chamber of the combine while retaining the MOG within the chamber so as to maintain a low chaff load and not overwhelm the grain processing and cleaning system of the combine with MOG thus allowing for grain loss, generally referred to as sieve loss and the introduction of MOG into the grain bin resulting in the application of a dockage penalty to the farmer due to the foreign matter (FM), also referred to as foreign material, in the grain delivered for storage and sale.

In the harvest of large grain like corn, it can be difficult to divert the threshed kernels out of the rotary chamber, leaving the kernels to be acted upon by the continued threshing forces which may result in the fracture or milling of the kernel to create fines. The net result is loss of yield to the farmer. To prevent this damage and yield loss, large openings may be provided in the concaves which allows for expedited removal of the kernels, but also provides a ready pathway for large volumes of MOG to enter the cleaning system.

In the harvest of small grains, the issue presented to the farmer is to retain the crop within the threshing chamber for a sufficiently long time to allow for complete separation of the grain from the pod or other plant covering.

A notable problem with soybeans is an evolving moisture difference in the crop. In past years soybean harvest was made easier by a similar moisture content between soybean pods and stems. In recent years, soybean header widths have grown from 10 feet to 50 feet, and the headers are used on combines having dynamically increased horsepower and capacity. Most recently, the introduction of fungicides which operate to extend plant life and genetic improvements in soybean varieties contribute to difficulties in that the combine now encounters green pods, wet pods, and dry normal pods all in the same swath as well as greener stems then encountered in years past. This creates a wide range of moisture content in the material being processed within the rotary chamber of the combine. As a part of this issue, farmers no longer wait for moisture content in the soybeans to become more homogeneous given the increased number of acres to be harvested prior to the onset of colder and wetter weather. Thus, the threshing operation is faced with the requirement to process green stems with dry stems and green pods with dry pods. As a result, there is a need for increases in threshing power while simultaneously reducing the amount of MOG that passes into the cleaning system. Finally, and notably, the green stems increases the problems of plugging in both the concaves as well as the separation plates—all to the effect of increasing sieve loss.

In this effort to achieve a balance between the separation and capture of the grain while, at the same time, retaining the MOG within the rotary chamber until it is ejected at the back end onto the field historically has resulted in around the adjustment of the combine. Also, the configuration of the threshing concaves and separation grates played an important role in the threshing of the grain and removal from the rotor chamber of the combine, however, it was and remains impractical for the farmer to change out the concaves when transitioning from one crop to another for harvest. Cover or filler plates have been available to the farmer for use with the threshing concaves, but these have been most difficult to install and, further, operated to dam-up or restrict the entire open area on each half of the concaves. This configuration operated to retain the grain within the rotor chamber with resultant damage.

Given the higher volume of plant materials processed by the combine in harvest in combination with the differing moisture values of the plant material, there exists a need in the art for an apparatus which allows for case of installation combined with a refinement of operation and adjustability so as to produce the maximum beneficial results for the farmer, including but not limited to reducing damage and yield loss to grain while also reducing MOG found in an end product.

SUMMARY

A list of additional problems known in the art follow.

Large wire concaves have been used successfully for many years in position #1 in older combines that were smaller and designed to handle lower corn yields than commonly grown today. In today's high-yielding corn crops harvested in higher-moisture conditions newer combines have more horsepower and bigger appetites. The advancements have overwhelmed the capacity of the concave designs that worked sufficiently in the past. Large wire concave limitations retain shelled kernels in the rotor chamber long enough to be damaged. The low pass-through rate manifests the problems of rotor loss, broken cobs, and damaged grain in the sample. Combine models known in the art need to improve their capacities. Large wire concaves used in position #1 need to increase their concave open areas in an optimized way, all while saving investment dollars in newer equipment.

Concaves known in the art cause broken or splintered cobs in the grain tank because they unnecessarily employ large wire concaves used in positions #2 and #3, thereby causing unnecessary cob breakage. When cobs are broken or splintered into smaller pieces, they fall into the cleaning area and potentially end up in the grain tank.

Many farmers make the mistake of not considering and/or not utilizing cover plates in concave position #1 when harvesting soybeans. When harvesting soybeans, most concaves used for corn harvest have openings too large to retain pods or small grains long enough for them to thresh fully (see, e.g., FIG. 46 including a pod). Instead, when they enter the threshing chamber, the unthreshed pods fall directly through these large openings onto the auger bed. These unthreshed pods then move into and overload the cleaning system and will need to be separated and sent back a second time to thresh. This process is commonly referred to as "tailings." The tailings also contain clean threshed soybeans, which are unnecessarily re-threshed and can become split. A major problem occurs where pods are mixed with split beans and cannot be differentiated before harvest.

Another major problem in the art occurs where OEM concaves are used for harvesting all crops in all conditions. OEM concaves are either better suited for the harvest of soybeans or maize, for wet conditions or for dry conditions. A middle of the road solution does not work. If the OEM spacing between round bars in round bar concaves is aimed to be used to harvest corn and soybeans, the gaps are too narrow for corn and too wide for harvesting soybeans.

Some modern and/or persisting problems in corn include but are not limited to rotor loss, damaged grain, splintered cobs, and balancing the combination thereof.

Some modern and/or persisting problems in soybeans and other small grains include but are not limited to pods in tank, high tailings, and sieve loss.

The present disclosure sets forth a solution that enhances flow by allowing for the easy installation of inserts when harvesting all crops in all conditions. This is because the solution allows the wider round bar spacing increases flow in corn and uses inserts to narrow the spacing when harvesting all other crops.

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art. Such deficiencies include but are not limited to a lack of control over the gap (opening) size presented by the concaves and/or separation grates within a combine which operate to allow the harvested grain to drop out of the rotor chamber and into the cleaning system for movement to the grain bin of the combine. Presently, the control over the gap size is dependent upon removal of a concave or separation grate and substitution of a completely differing one with a differing gap opening size or configuration or, alternatively, simply plugging the opening to effectively prevent anything from passing out of the rotor chamber. One embodiment of the present disclosure controls the gap size to effectively prevent MOG from passing through or plugging the opening while allowing the grain to drop out of the rotor chamber.

It is a further object, feature, and/or advantage of the present disclosure to independently utilize each of the series of MOG limiting devices, also described herein as MOG limiters. In one embodiment the MOG limiter may be approximately one-quarter of the circumference of the rotor or approximate 50% of the length of the concave openings, and such MOG limiter may be referred to as a Quarter Wrap MOG limiter. In another embodiment, the MOG limiter may be of a length to cover all or nearly all of the openings on one or both sides of the concave which limiter may be referred to as a Half Wrap MOG limiter.

The MOG limiters can be selectively attached to one or more of the concaves of a combine, such as the combine shown and described by the inventors in the co-owned, co-pending patent application U.S. Ser. No. 17/899,240, titled THRESHING GRAINS AND LEGUMES UTILIZING CONCAVES WITH ADJUSTABLE OPENINGS, filed Aug. 30, 2022, which is herein incorporate by reference in its entirety. In addition to the selectivity of restriction as to parts of one or more of the concaves, the MOG limiting devices more closely align to the curvature of radius of the concaves and utilize a preset adjustment to position the insert within each gap of the concave so as to control the remaining opening of the gap.

Another embodiment of the MOG limiter allows for an adjustable tensioning connection that not only secures the limiter in place, but also operates to control the positioning of the insert within the gap so as to control remaining gap size existing between the concave crossbars.

It is still yet a further object, feature, and/or advantage of the present disclosure to improve upon the efficiency of the harvest of soybeans or other small grains where concave cover plates have heretofore been used.

It is still yet a further object, feature, and/or advantage of the present disclosure to install a one or more of the MOG limiters which may be placed on either side of the concave or on both sides of the concave. In total, at least four independently actuatable Quarter Wrap MOG limiters may be installed on each concave. In one embodiment a first plurality of MOG limiters are arranged in series and attach to the right side of the concave and arranged in series; and a second plurality of MOG limiters are arranged in series and are attached to a left side of the concave and arranged in series. In one embodiment a first plurality/series of MOG limiters and a second plurality/series of MOG limiters are arranged in parallel. The MOG limiters can approximate one-half of the curvilinear length of a concave referred to herein as Quarter Wrap MOG limiters or MOG limiters, however it is to be appreciated that embodiments exists where the MOG limiters can approximate one third, one quarter, one fifth, etc. of the curvilinear length of the concave, thereby bringing the total number of independently actuatable MOG limiting devices employed on a single concave to six, eight, ten, etc. In various embodiments, each MOG limiter operates to regulate and distribute the flow of MOG in all rotary combines, single or dual rotor designs, passing through the combine in both the rotor chamber and cleaning system.

A first embodiment of a modified concave includes an enhanced side flow rail, a C-clamp end, a first-end round bar drive, a second end plate, a quarter wrap center catch, an enhanced flow center rail, 0.625 inch diameter round bars, a left over-center catch, and a right over-center catch.

A second embodiment of a modified concave includes an enhanced side flow rail, a C-clamp end, a first-end round bar drive, a second end plate, a quarter wrap center catch, an enhanced flow center rail, 0.375 inch rub bars with 0.125 inch prouds, 0.625 inch diameter round bars, a left over-center catch, and a right over-center catch.

A third embodiment of a modified concave includes an enhanced side flow rail, a C-clamp end, a first-end round bar drive, a second end plate, a quarter wrap center catch, an enhanced flow center rail, 0.25 inch flat rub bars, 0.625 inch diameter round bars, a left over-center catch, and a right over-center catch.

A fourth embodiment of a modified concave includes an enhanced side flow rail, a C-clamp end, a first-end round bar drive, a second end plate, a quarter wrap center catch, an enhanced flow center rail, 0.375 inch flat rub bars, 0.625 inch diameter round bars, a left over-center catch, and a right over-center catch.

It is still yet a further object, feature, and/or advantage of the present disclosure to provide a hinged connection in the middle of the concave to grab on to each of the first plurality of MOG limiters and the second plurality of MOG limiters. The hinged connection can be a hook.

It is still yet a further object, feature, and/or advantage of the present disclosure to use an adjustable tensioning connection to secure the MOG limiter in place after rotating the hinged connection to a closed position.

It is still yet a further object, feature, and/or advantage of the present disclosure to be able to install one or more MOG limiting devices which allows for controlled and adjustable restrictions of the concave gaps. When secured in place, the MOG limiter aligns the inserts against one side of the round bars of the concave or may position the inserts somewhere within the gap between the round bars to provide more restricted openings to more beneficially impact the capture of grain and the rejection of MOG.

It is still yet a further object, feature, and/or advantage of the present disclosure to widen the air gap between round bars to provide better solutions for harvest of corn, while simultaneously being able to narrow air gaps for harvest of soybeans. For example, ¼ wrap cover plates and ¼ wrap inserts can be quickly installed and/or interchanged to provide an application specific approach for the harvest of corn or soybeans.

It is still yet a further object, feature, and/or advantage of the present disclosure to uniformly distribute grain and MOG in the threshing and separation chambers of the combine. For example, the MOG limiters and/or cover plates described herein can balance an amount of MOG from a rotor area of the combine to a sieve area (also referred to as the cleaning system) of the combine and allow balance of grain throughput from the rotor area to the sieve area with respect to the left side of the concave to the right side of the concave.

It is still yet a further object, feature, and/or advantage of the present disclosure to thresh most of the grain so that it falls out as quickly as possible so that it goes into the auger bed, which is beneath the rotor. Then, it is desirable to separate and to drop the last grain onto the auger bed before the grain exits the rotor and goes onto the ground as rotor loss. The last of the grain should ideally drop out at the last separating grate.

It is still yet a further object, feature, and/or advantage of the present disclosure to maintain the use of the OEM sieves, which are non-adjustable sieves (large and heavy components).

It is still yet a further object, feature, and/or advantage of the present disclosure to place a highest importance on the choice of combines, MOG limiters, and cover plates for the concaves that are in positions #1-#3.

It is still yet a further object, feature, and/or advantage of the present disclosure to improve harvest of grain such that there is 40% less grain loss (~1 kernel/sq ft; 2 soybeans per square foot); an increase in ground speed; less damaged grain; and/or less frustration to the operator of the combine.

It is still yet a further object, feature, and/or advantage of the present disclosure to adjust or achieve a proper balance in the expedited separation of grain into the processing and cleaning system of the combine while retaining MOG within the rotary chamber to be passed out the back, which balance may allow for the removal of bottom sieve in the cleaning system which often operates to disrupt air flow blowing chaff out of the combine and away from the pathway moving grain up to the storage bin.

The present disclosure addresses difficulties presented by the moisture level of the grain being harvested. For example, with corn the use of MOG limiters operates to improve the concave flow-through of small kernel corn in low moisture conditions while preventing the passage of MOG into the cleaning system. In general, as grain moisture in the harvested crop decreases, the usefulness of MOG limiters increases.

The present disclosure addresses difficulties in harvesting small grains including small kernel corn after installing the concaves. For example, it may be necessary to level the rotor after installing the concaves described herein, else the threshing efficiency of the concaves can be diminished. In yet another example, one or more additional inserts and/or cover plates can be added and/or removed at various positions in the threshing and separation chambers (e.g. positions #1-#7) when harvesting tougher crops so as to more fully remove and/or reduce white caps in the sample. In yet another example, the rear separation grates can be rotatably moved into an "up" position, wherein spacers are removed and stored in a closed post.

Cover plates can be used to improve the threshing capability of the rasp bar threshing cylinder while simultaneously capturing additional threshed grain.

The selective use of cover plates versus inserts, including the selective use of same within a single concave, can help balance the flow of MOG and grain through the combine such that it is more equally distributed when passing through various chambers of said combine. This can allow for the better and more efficient harvest a wider variety of crop types without needing to spend large amounts of time installing and uninstalling non-adjustable cover plates, inserts, and the like that at present plague the art.

The cover plate can include an elongated plate body, such as a curvilinear plate, dimensioned to be positioned between two parallel arcuate rails of a threshing concave grate assembly. The curvilinear plate preferably does not span the entire length of said arcuate rails. The curvilinear plate of the cover plate assembly is preferably constructed of a single plate of high strength material such as metal, high strength plastics or composite fabric material. For example, the curvilinear plate can be constructed of steel plating that is permanently bent in an arcuate shape matching the exterior arcuate shape of a threshing concave grate assembly. The curvilinear plate can also be constructed of flexible, high strength materials such as stainless steel or woven composite materials, or alternatively, the cast into a predetermined arcuate shape. It is to be appreciated the material that the elongated body is constructed of may also have a natural porosity and permeability. For example, the elongated body of the cover plate may be constructed of a metal mesh or composite material having organic porosity and permeability characteristics. This can help regulate moisture release from the cover plates should they become wet.

The present disclosure addresses difficulties presented while harvesting in-field. For example, the clearance between the rotor and concaves can be increased and/or decreased during operation of the combine. In yet another example, the operator may increase and/or decrease the rotational speed of the rotor. In yet another example, the operator may alter a velocity of fan speeds. In yet another example, the operator may adjust a distance between the chaffer, sieve(s), concave(s), grate(s), and/or components thereof (e.g., calibrating a position of the louvers that are included in the bottom sieve), etc.

Crops such as rice, wheat, and barley comprise three main parts: the grain—the seeds located at the top; the chaff—the seeds' dry coatings; and the stalk—the overall stem of the plant. Not all three parts are edible. Only the grain can be collected for use in bread and cereal production, which is edible. The other two—chaff and stalk—have to be removed. Threshing refers to the task of separating grain from its attached crop. This grain preparation task comes after the reaping process. Winnowing takes place right after threshing. The process of winnowing frees the grain from the chaff.

The present disclosure addresses difficulties in efficiently threshing grain and those presented by dirty samples. For example, unthreshed grain can be placed in a return of the combine for re-threshing. In some embodiments, the return runs at least at 50% full for proper re-threshing. Where a dirty sample is concerned, a power shut down may be required so that any grain and chaff in the auger bed and/or top chaffer can be dislodged, and the combine can return to more evenly distribute material across the top chaffer and/or bottom sieve.

The MOG limiters disclosed herein can be used in a wide variety of applications for the harvest of a number of crops including, but not limited to soybeans, wheat, oats, rye, barley, sorghum, flax, sunflowers and canola, alfalfa, clover, and also low yielding corn.

It is preferred the threshing systems, accessories, and configurations disclosed herein be safe, cost effective, and durable. For example, the case of installation and removal allows the farmer to only install and utilize the MOG limiters and cover plates when needed for the specific grain being combined thereby reducing wear. Further, the radial geometry and profile of the MOG limiters and cover plates, and the composition of the steel from which they are constructed, allow for extended use over the years while resisting excessive abrasive wear and/or mechanical failures (e.g. cracking, crumbling, shearing, creeping) due to excessive impacts and/or prolonged exposure to tensile and/or compressive forces which may act upon the MOG limiters and cover plates when positioned within the rotor chamber of an operational combine.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the combine.

Methods can be practiced which facilitate use, manufacture, assembly, maintenance, and repair of MOG limiters and cover plates which accomplish some or all of the previously stated objectives.

The MOG limiters and cover plates may be incorporated independently into the harvest system of a combine, single rotor or dual rotor, or may be included in kits which provide additional components to accomplish some or all of the previously stated objectives. For example, kits that upgrade existing concaves or upgrade existing combines with concaves are disclosed herein. The kits can include pairs of MOG limiters that are intended to span half of the length of the concave and half of the width of the concave, and further, pairs of quarter-wrap cover plates. These kits can be installed on said concaves and/or combines depending on the crop to be harvested or the conditions in which harvest occurs. The components in the kit are easily interchanged. The kits can include various numbers of pairs of MOG limiters and cover plates, depending on the climate in which the kit is expected to be used.

In some combines, it may be advantageous to use a full-length MOG limiter plate which covers one-half of the concave. One instance involves a combine structure wherein the shortened MOG limiter does not work due to connection problems resulting from lack of access from one side of the rotor chamber.

The adjustable use of the present disclosure provides the user the ability to more precisely balance the MOG retention within the rotor chamber and the release of grain from the rotor chamber and, also, to balance the distribution of material released from the rotor chamber onto the sieve for more efficient cleaning of the grain and increased retention of the grain during the harvest process. In areas where a smaller grain such as soybeans is harvested, immediately followed by the harvest of a large grain such as corn, the ability to adjust or easily remove MOG limiters and/or cover plates is important to facilitation of a seamless harvest which allows for optimum use of good weather days. It is also desirable to be able to adjust the size of the gaps and/or openings in the concave without needing to remove the cover plates and/or inserts, to better accommodate a wider range and/or varying in field conditions (e.g., changing moisture conditions).

In some embodiments of some aspects of the present disclosure there includes an over-center latch for attaching a cover plate or MOG limiter to an outer surface of a concave for a combine including a subbase including a pair of ears protruding therefrom, a handle in rotational communication with the pair of ears at a base of the handle, a center pin positioned between the base of the handle and a distal end of the handle configured to be in rotational communication with the handle, and further there includes a lever attached at a base of the lever to the center pin, wherein the center pin allows the lever to rotate with respect to a handle, and additionally there includes a loop at a distal end of the lever opposite the base of the lever. For this embodiment either the handle or the lever can be pulled into a vertical position orthogonal the subbase.

According to additional aspects of the embodiment, a lock hole protruding from the subbase in a same direction as the pair of ears.

According to additional aspects of the embodiment, a locking mechanism positioned within the lock hole.

According to additional aspects of the embodiment, the locking mechanism is a linchpin.

According to additional aspects of the embodiment, a threaded portion along a length of the lever that extends into the center pin, wherein the center pin includes a threaded section to receive the threaded portion of the lever.

According to additional aspects of the embodiment, a locking nut that can attach the threaded portion of the lever to the center pin.

According to additional aspects of the embodiment, a nylon friction ring positioned within the locking nut that dampens vibration.

According to additional aspects of the embodiment, the handle includes an angled portion on the distal end of the handle to assist with lifting the handle, wherein the angled portion is angled away from the subbase when the handle is positioned substantially parallel to the subbase.

According to additional aspects of the embodiment, an over-center latch assembly including the over-center latch and further comprising a base plate configured to attach to the subbase of the over-center latch.

According to additional aspects of the embodiment, the subbase includes a plurality of apertures and the base plate includes a plurality of holes, wherein the apertures may align with the holes for connecting the base plate to the subbase.

According to additional aspects of the embodiment, threaded rods or screws inserted through the holes and the apertures for connecting the subbase and base plate, wherein the threaded rods or screws include a locking nut with a nylon insert to fasten the threaded rods or screws to the over-center latch assembly.

According to additional aspects of the embodiment, the subbase and the base are a monolithic component via weld such that the pair of ears extend directly from the base plate.

According to additional aspects of the embodiment, the base plate comprises substantially a pentagonal shape.

According to additional aspects of the embodiment, the base plate comprises substantially a rectangular shape.

According to additional aspects of the embodiment, the over-center latch assembly attaches to either of a MOG limiter or a cover plate via the base plate.

According to additional aspects of the embodiment, the base plate includes slots positioned at opposite ends of the base plate and the base plate attaches to the MOG limiter or the cover plate via plug welds in the slots.

According to additional aspects of the embodiment, the over-center latch assembly secures the cover plate or the MOG limiter to an outer surface of a concave.

According to additional aspects of the embodiment, the concave includes catches for the loop to connect to for securing the cover plate or the MOG limiter to the concave.

According to other embodiments of other additional aspects of the present disclosure, a method for securing a MOG limiter or cover plate to a concave via an over-center latch assembly, including positioning a hinge point of the MOG limiter or cover plate within a cross bar of the concave, lifting a handle of the over-center latch such that a lever operatively connected to the handle extends outwardly away from the MOG limiter or cover plate, placing a loop that is positioned at a distal end of the lever on a catch of the concave, rotating the handle a direction opposite the lifting such that lever retracts back towards the MOG limiter or cover plate, and placing a locking mechanism through a lock hole on the over-center latch assembly after the handle has been rotated past the lock hole.

According to other embodiments of other additional aspects of the present disclosure, a combine including a concave, including a plurality of cover plates and/or MOG limiters positioned on an outer surface of the concave and a plurality of over-center latch assemblies configured to secure the plurality of cover plates and/or MOG limiters to the outer surface of the concave, wherein each of the cover plates and/or MOG limiters includes one of the plurality of over-center latch assemblies secured thereto, wherein each of the plurality of over-center latch assemblies comprises a base plate with a pair of ears extending therefrom; a handle operatively connected to the pair of ears; a center pin positioned along a length of the handle and capable of rotating with relation to the handle; a lever extending from the center pin; and a loop positioned at a distal end of the lever; wherein the cover plates and/or MOG limiters are secured to the concave via insertion of hinge points into a cross bar of the concave, wherein the hinge points are positioned on the cover plate and/or MOG limiter at an end opposite the over-center latch assembly, wherein the cover plate and/or MOG limiter is further secured to the concave via attaching the loops of the over-center latch assemblies to catches positioned at each end of the concave.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

FIG. 53A shows a first perspective view of the over-center latch assembly of FIG. 47A mounted to a solid, extended mounting portion that is included in a right-side quarter wrap (QW) MOG limiter assembly.

FIG. 58A shows a first perspective view of the over-center latch assembly of FIG. 47A mounted to a triangular mounting portion that is included in a left-side quarter wrap (QW) cover plate assembly.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Figure 1:
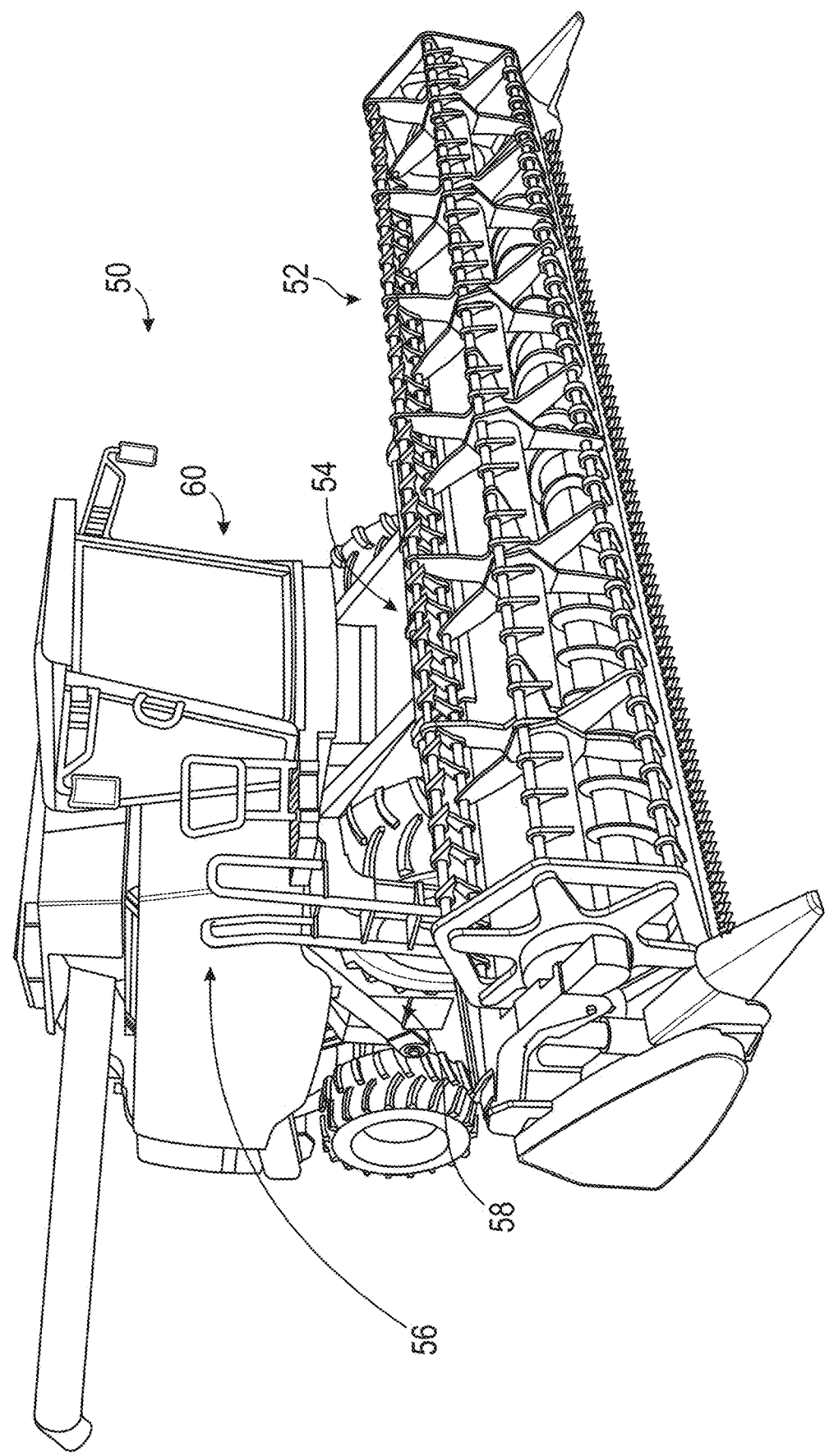
FIG. 1 shows a perspective view of a prior art example of a combine in which embodiments of the present disclosure may be used.

FIG. 1 shows a typical combine harvester 50 which may utilize the embodiments described herein. The combine harvester 50 typically includes a header 52 to interact with crops, a conveyer 54 to take the crops that have been cut by the header 52 into the combine 50, a threshing chamber 56 to receive the cut crops from the conveyer, the threshing chamber 56 containing a rotor surrounded by a cage of concaves to separate grain from the crop, a cleaning system 58 located below the threshing chamber to catch separated grain and any MOG (material other than grain) on sieves which filter grain through the sieves and release MOG out a back of the combine, and a cab 60 for a user to sit in and operate the combine. As will be described herein, systems, kits, and devices of the present disclosure relate to components within the threshing chamber 56 to improve the combine harvester's 50 performance.

Rotor combines utilize an internal chamber wherein the harvested plant material including the grain is passed from the head of the combine into the threshing chamber or rotor chamber. This rotor chamber processes the material by a threshing operation and a concurrent separation operation. A series of curved apparatus are positioned at the bottom of the rotor chamber whereat grain is allowed to drop out of the chamber into the cleaning system which operates to clean the grain then convey and store the grain in the grain bin or tank in the combine. As an example of this set up, the John Deere single rotary combines have seven curved apparatus running from the front of the chamber rearwardly and positioned side-by-side in positions #1-#7. Positions #1-#3 (positioned closest to the header, see, e.g., FIG. 22) are customarily referred to as the threshing section and are occupied by threshing concaves, and positions #4-#7 (positioned further away from the header along the cage surrounding the rotor) are customarily referred to as the separation section and are occupied by separation grates.

The symptoms indicative of inefficiency in the harvest of small grains such as soybeans include the presence of unthreshed pods in the grain tank or bin of the combine, excessive return tailings, MOG in the grain tank, split beans, and/or sieve loss. A primary contributor to these symptoms involves the combine which historically has utilized a single concave design in the threshing of multiple grains, larger and smaller in size.

The combine concaves are a key part of a combine harvester, with two vital roles in the harvesting process: freeing seeds from plants (threshing), and moving them away from the chaff (winnowing). The quality of the harvested crop depends significantly on the quality and configuration of combine concaves in use which form the cage surrounding the rotor within the threshing chamber.

As shown in FIGS. 2-5, and FIGS. 56A-57C, 61-65, concaves 101, 500, 600, 700, 800 are elongated, heavy, and curvilinear. In a combine, several concaves 101, 500, 600, 700, 800 work in tandem to thresh and separate grain from MOG and are positioned in series. The concaves 101, 500, 600, 700, 800 represent a substantial expense if differing concave designs are used by the farmer. Further, concaves 101, 500, 600, 700, 800 are difficult and time-consuming to change out in a combine. At harvest, time is critical to take-in the crop at the optimal time as conditions for harvest change with the weather. Thus, the dilemma presented to the farmer is which concave design to use within the combine and whether to change-out the concaves or live with what is in place when the combine is originally set-up for harvest.

For example, concaves 101, 500, 600, 700, 800 that are used in the harvest of smaller grains can include narrower gaps and/or openings to limit the amount of MOG that drops out of the chamber and into the cleaning system. Concaves 101, 500, 600, 700, 800 that are intended for the harvest of larger grains should include gaps that still allow the larger grains to drop out of the chamber and into the cleaning system.

The concaves 101, 500, 600, 700, 800 are generally constructed from stainless steel or plastic. The materials that are used to construct the concaves 101, 500, 600, 700, 800 should be high-quality durable materials that stand up to wear and tear over repeated use without losing their threshing efficiency.

The concaves 101, 500, 600, 700, 800 are also preferably kept in good condition so that they can effectively separate grain from chaff without becoming clogged or damaged by stray stones or other foreign objects in the field. Maintenance of the concaves 101, 500, 600, 700, 800 can be a key part of achieving optimal performance with the concaves 101, 500, 600, 700, 800. The concaves 101, 500, 600, 700, 800 must not only be kept free from debris, but also the farmer should periodically evaluate whether the openings in the concaves 101, 500, 600, 700, 800 are an appropriate size for the crop to be harvested.

However, because of the aforementioned hardship(s) associated with changing out the concaves 101, 500, 600, 700, 800, it is highly desired to be able to use concaves 101, 500, 600, 700, 800 that are suitable for both larger and smaller grains. One such solution is to always use concaves 101, 500, 600, 700, 800 that are suitable for larger grains, and to attach removable inserts 105, 1100, 1200 and/or cover plates 300, 400, 900, 1000 which narrow the gaps and/or openings when harvesting smaller grains. The removable inserts 105, 1100, 1200 and/or cover plates 300, 400, 900, 1000 could, for example, attach to the concaves 101, 500, 600, 700, 800 at upper and lower connection points 102, 102A shown in FIG. 2.

The cover plates 300, 400, 900, 1000 retain plant material to fill the large openings and create a mattress-type surface. The matte of plant material provides a gentle & natural rubbing action against each other as they travel over the horizontal grain separation bars while retaining the material in chamber for enough time to complete even the tough or green pods. The cover plates 300, 400, 900, 1000 also allow the operator to run the bottom sieve further open, pushing more air through the top sieve, reducing pod material in the tank. The use of natural plant materials reduces the chances of the rotor splitting soybeans over the longer duration in the chamber.

Use of the cover plates 300, 400, 900, 1000 allows for a more complete thresh, reduces tailings, and creates a cleaner grain sample.

A condition addressed by embodiments of the present disclosure involve the harvest of high moisture grain. In such conditions, the grain is more likely to clump or bridge the gap between concave crossbars. In such situations, MOG limiters can quickly go from helping eliminate MOG in harvested material to plugging of said gaps.

In breakdown of the threshing section of the rotor chamber of a combine, experimentation and study with the harvest of soybeans has shown that historically pods fall through the concave in the forward or #1 position due in substantial part to the failure to retain the pods within the rotor chamber to allow the pod-on-pod abrading action created by the revolving rotor and attached rasp bars which functions to open the pods and separate the beans therein. Excessive amounts of MOG historically are the function of MOG not being retained within the rotor chamber and falling through the concaves at positions #2 and #3. If OEM filler inserts are used in positions #2 and/or #3, the resultant problem is often loss of harvest yield due to the retention of the beans within the rotor chamber resulting in abrasive fracturing or crushing or their loss out the back end of the combine with the MOG.

The present disclosure is designed to address the issue of retaining MOG within the rotor chamber by metering the removal of grain from the rotor chamber. The MOG limiters thereby allow for the timely and efficient removal of the beans or other small grains, including small kernel corn, from the threshing portion of the rotor chamber of the combine. The more quickly the separated grain is removed from the rotor chamber, the lesser the process load is placed on the threshing and separation functions which increases the overall efficiency of the harvest process while maintaining heightened integrity of the grain.

The present disclosure allows the farmer to balance the load of the harvest operation in a variety of different ways. For example, several embodiments disclosed herein allow for more control over the volume of MOG dropping out of the rotor chamber to the sieve area.

In another respect, the present disclosure allows for a balance of grain throughput from rotor chamber to the sieve area. This balance relates to the constant volume flow of grain deposited through the concaves on left side versus right side. Historically, experimentation and study show that rotary combines deposit grain out of the rotor chamber heavily on the right side in what may be referred to as the 3-6 o'clock position when viewed from a position standing behind the combine. As the grain is transferred back to the cleaning area wherein the sieve is positioned, the right side of the sieve receives the majority of the material that exited the rotor chamber for cleaning while the left side of the sieve receives substantially lesser material for cleaning. Thus, the right side of the sieve is overloaded which negatively impacts its efficiency of properly separating grain from the remaining MOG and allows a greater amount of grain to be lost out of the back end of the combine. With the present disclosure, the farmer can fine tune the combine to balance out the loading of the back end to improve grain cleaning and retention for deposit in the grain tank.

Referring now to the assembly 100 shown throughout FIGS. 2-9, the MOG limiter 105 is comprised of a series of equally spaced gap bars or inserts 106, often in a rectangular configuration, positioned on a face side of the MOG limiter 105.

The series of equally spaced gap bars or inserts 106 are retained by dual, parallel rail supports 107 having a curvilinear geometry. The radius of curvature of the face side of the rail supports 107 approximates the radius of curvature of an underside of the concave 101. The inserts 106 are vertical to the rail supports 107 and are positioned to fit up and into the gap between the concave crossbars 110 to create controlled openings.

According to a preferred embodiment, the thickness of the rails is approximately 1 inch. According to yet another embodiment in need of an increase in concave open area (COA), the thickness of the rails is approximately ¼ inch where the distance in the outer surfaces of the rail supports 107 remains the same.

In one embodiment, the face side of the MOG limiter is attached to the underside of the concave 101 utilizing on one end a hinge point at the end of each rail support 107 which is insertably retained in a slotted opening of a crossbar member positioned and affixed to the bottom side of the concave 101. On the other end, a mounting plate 108 is used through which a bolt positioned on the concave 101 protrudes with retention accomplished by use of a washer and nut assembly.

In one embodiment an over-center latch assembly is utilized in cooperation with the mounting plate 108.

In one embodiment the attachment means is adjustable so as to slidably move the inserts within the gaps between the concave crossbars so as to further control the opening remaining within said gaps.

In the embodiments rounded notches 109 can be made on the face side of each rail support 107 which conform to the rounded geometry of the crossbars 110 on the concave 101, and function to position the notched surface firmly against the underside of the concave 101 round crossbar 110 depending on where the rounded notches 109 are positioned.

Figure 4:
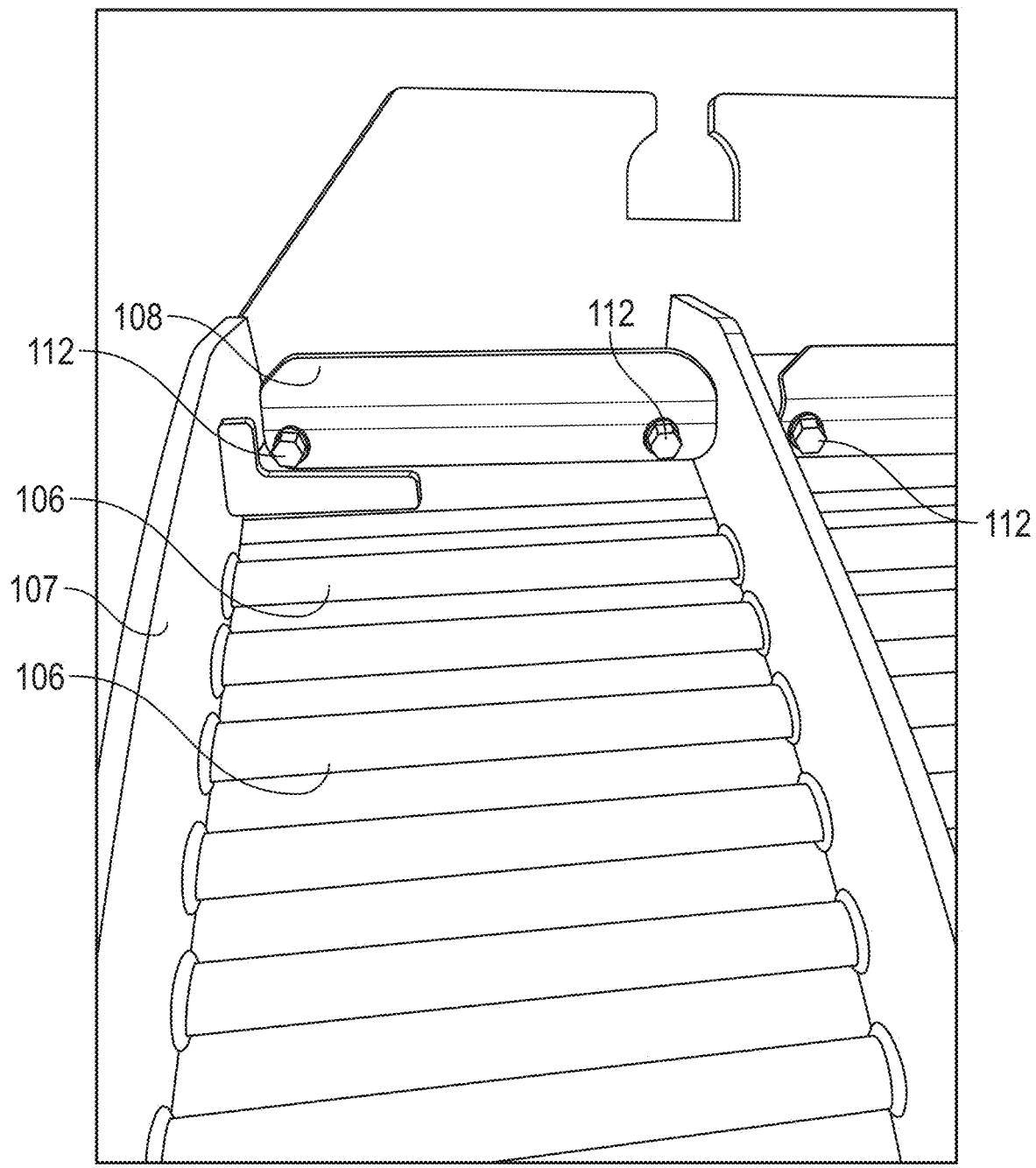
FIG. 4 shows a detailed view of a MOG limiter mounted behind the round bars of a concave.
Figure 5:
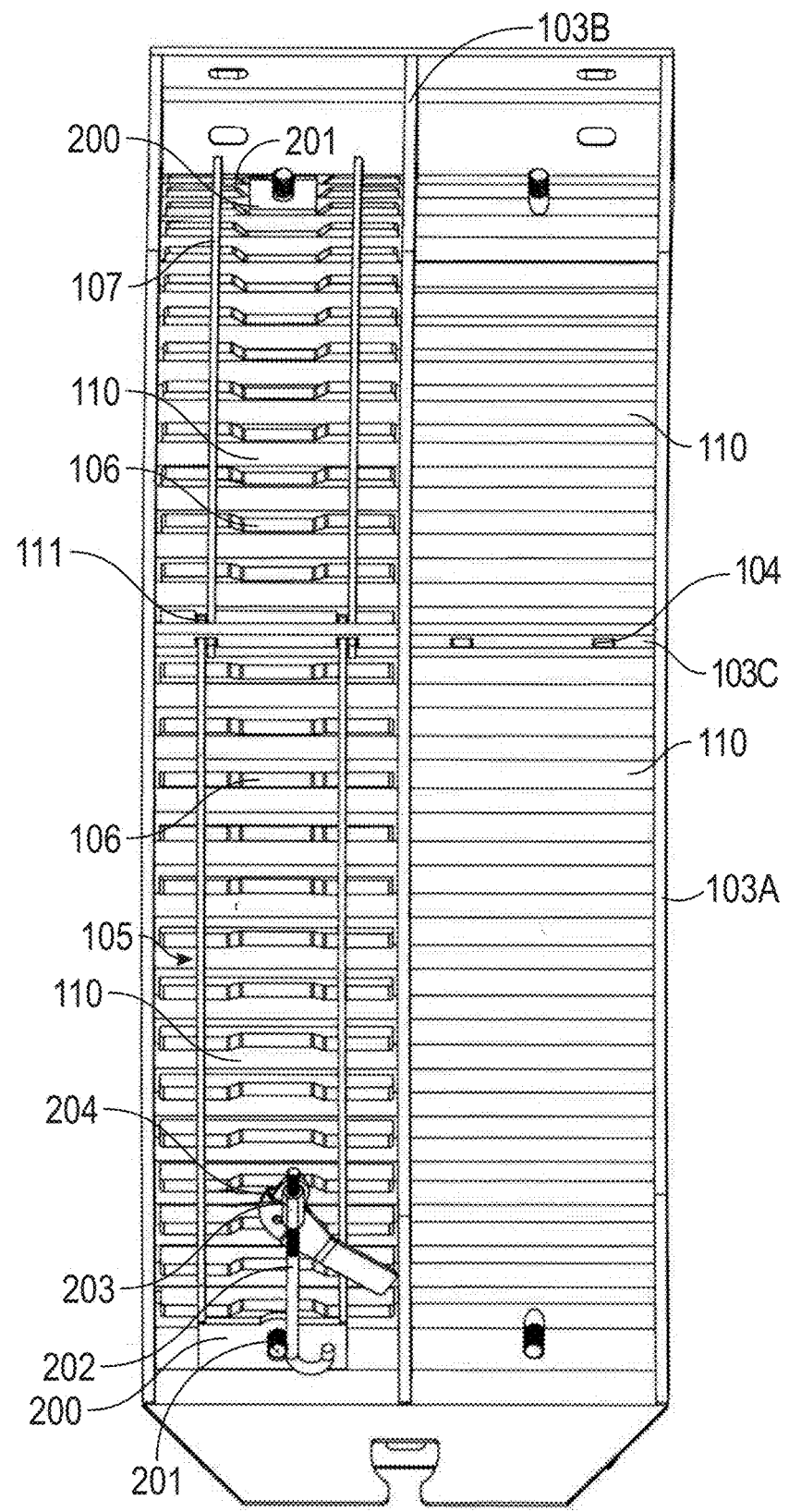
FIG. 5 shows a bottom plan view similar to that shown in FIG. 2, including exemplary hardware for attaching the MOG limiter to the concave at the upper and lower connections, according to an embodiment of the present disclosure.

In the embodiment as shown in FIGS. 2-5, the MOG limiters 105 are of a length which approximates one-half of the curvilinear length of the concave 101. A plurality of bolt, washer and nut assemblies protrude downwardly from the underside of the concave 101 with a single assembly positioned in the middle of each side as shown on FIGS. 2-3 which in cooperation with the mounting plate 108 on the MOG limiters 105 form an upper concave connection 102 and a lower concave connection 102A in each half of the concave 101 underside. The MOG limiter 105 may be positioned between a side rail 103A and a center rail 103B. In the cross frame 103C are positioned openings such as insert slots 104 to receive the hinge point 111 located at the end of each rail support 107. The hinge points 111 are slidably inserted into the insert slots 104 (as shown in FIG. 5) and then rotated upwardly to be positioned adjacent to and in conformity with the curvature of the underside of the concave 101 with the connection assemblies 102 & 102A holding the MOG limiter 105 in place. As shown in FIG. 4, bolts 112 can be used to secure the 108 mounting plate to the MOG limiter 105. The mounting plate 108 can directly attached to the axial bar 106, one or more of the rail supports 107, and/or additional supports that are added to the system to make for more robust securement.

FIG. 5 emphasizes a view of another example of mounting hardware that can be used to attach the MOG limiter 105 to the concave 101 as depicted in FIGS. 2-6. For example, a mounting plate 200 is shown receiving a threaded post 201 that allows for a J-hook 202 to attach thereto. The J-hook includes a straight end (the top of the "J") and a hooked end (the bottom of the "J"). The J-hook 202 is threaded at the straight end. In the embodiment shown, the threads are male threaded configured to receive a female threaded hexagonal sleeve 203, which is either directly and/or indirectly attached to the lever 204.

The lever 204 comprises a beam or rigid rod pivoted at a fixed hinge, or fulcrum. The rigid body of the lever 204 is capable of rotating about said fulcrum, which in this case can be the hexagonal sleeve 203, an indirect attachment that connects to said sleeve 203, and/or any other suitable component which allows pivotal movement such that the J-hook 202 can be move in a rotational direction. After being moved in a rotational direction by the lever 204, the J-hook 202 can latch onto the threaded post 201, and in the embodiment shown in FIG. 7, indirectly to the mounting plate 200. On the basis of the locations of the sleeve 203, load from the MOG limiter 105, and effort required to be input by the user, the lever 204 is designed to amplify the input force from a user to provide a greater output force. In other words, the user provides leverage and gains a mechanical advantage in that the ratio of the output force to the input force is positive.

Figure 6:
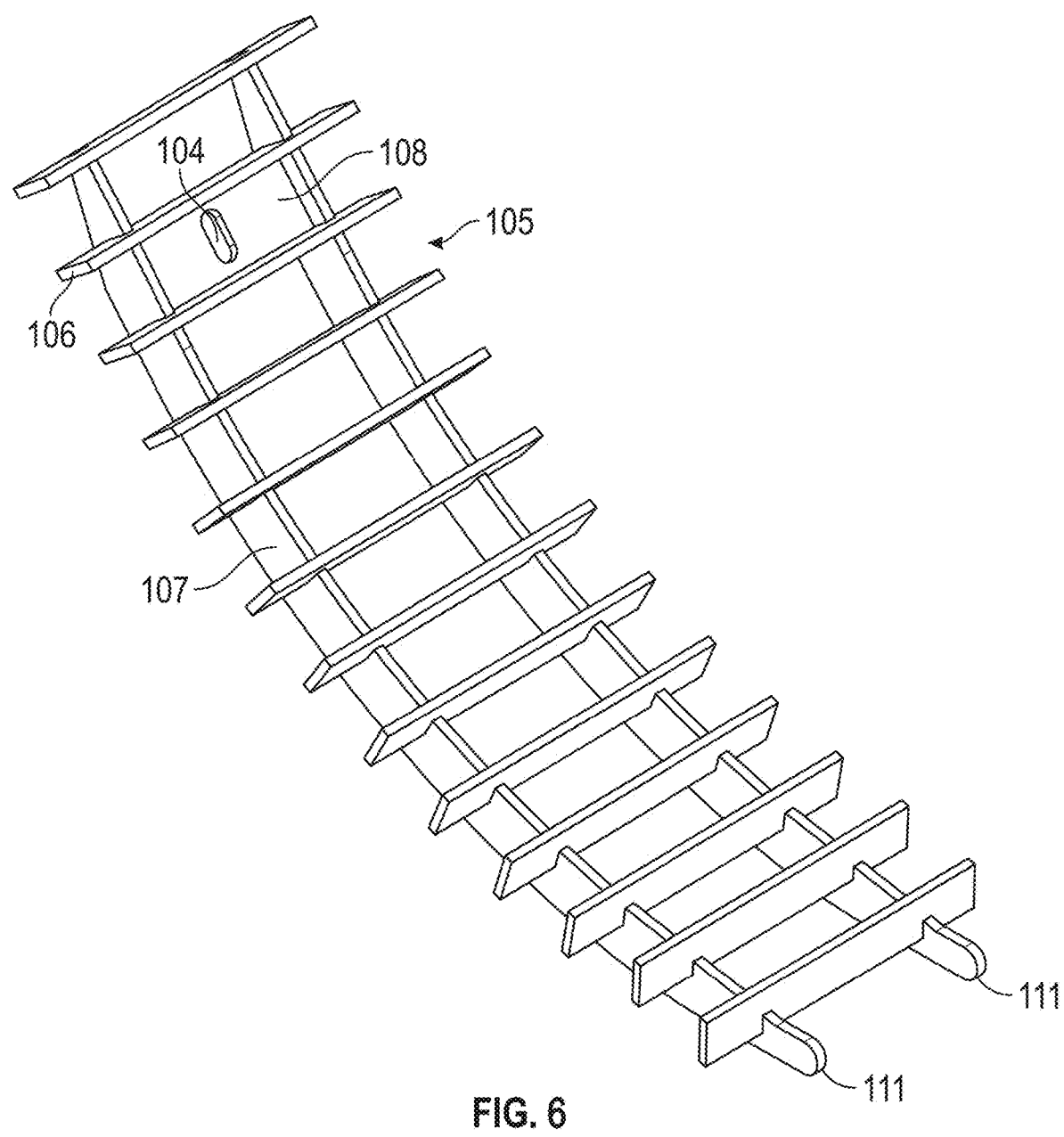
FIG. 6 shows an angled perspective view of a MOG limiter, according to an embodiment of the present disclosure.
Figure 7:
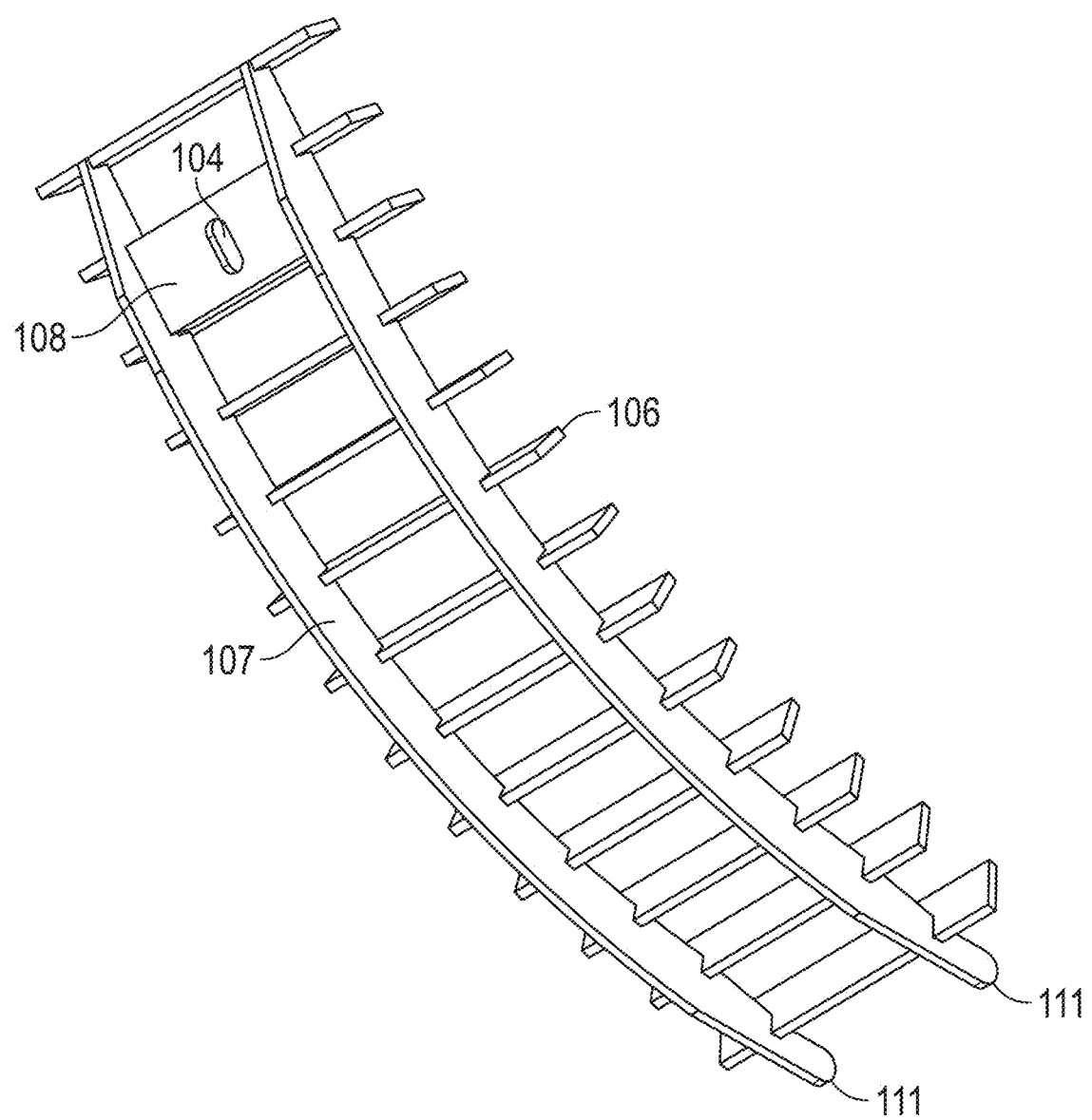
FIG. 7 is an angled perspective view showing underside of the embodiment of FIG. 6.

The embodiment disclosed in FIGS. 6-7 includes a face of the rail supports 107 that is smooth and allows the face to slide against the underside of the crossbars 10 of the concave 101 so that an adjustment mechanism at one end of the MOG limiter may operate to adjust and slidably position the inserts 106 within the gap to allow for greater control of the size of the gap and, thus, greater control by the farmer as to the operations of the threshing operation in the combine based upon weather, field conditions, crop conditions and grain type.

Figure 8:
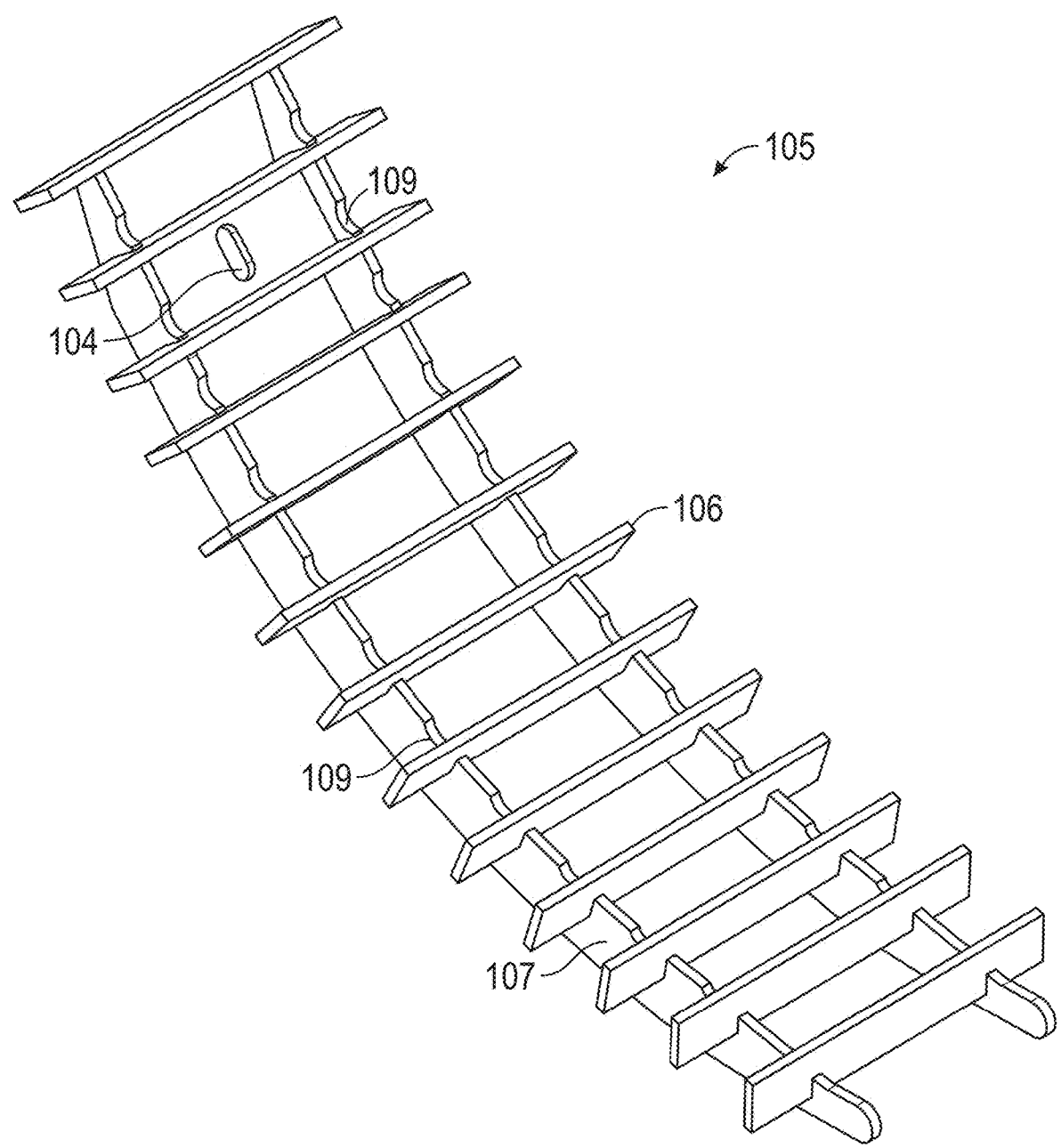
FIG. 8 is an angled view showing a topside of the MOG limiter including off-center notches, according to an embodiment of the present disclosure.

The MOG limiter 105 shown in FIG. 8 positions the notches 109 adjacent to the inserts 106 which operates to position the inserts 106 adjacent to the crossbars 110 of the concave 101 creating a more restricted area on the side nearest to the crossbar 110 and a greater opening in the remaining unrestricted gap area.

Figure 9:
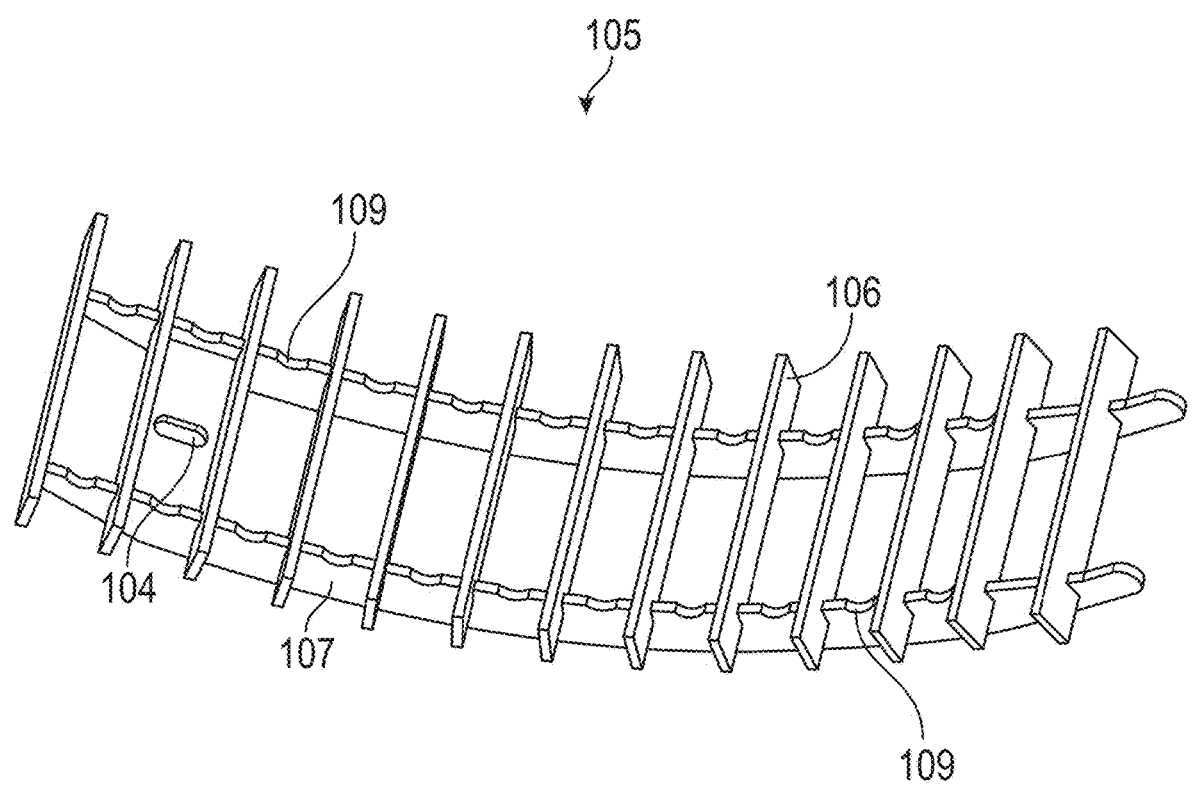
FIG. 9 is an angled view showing a topside of the MOG limiter including centered notches, according to an embodiment of the present disclosure.
Figure 10:
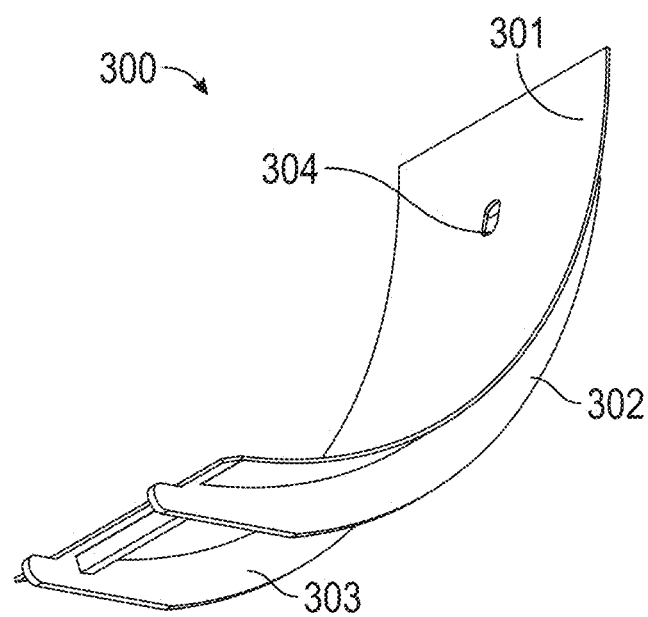
FIG. 10 is a first angled perspective view showing a left-side cover plate that can mount to the concave of a combine.
Figure 11:
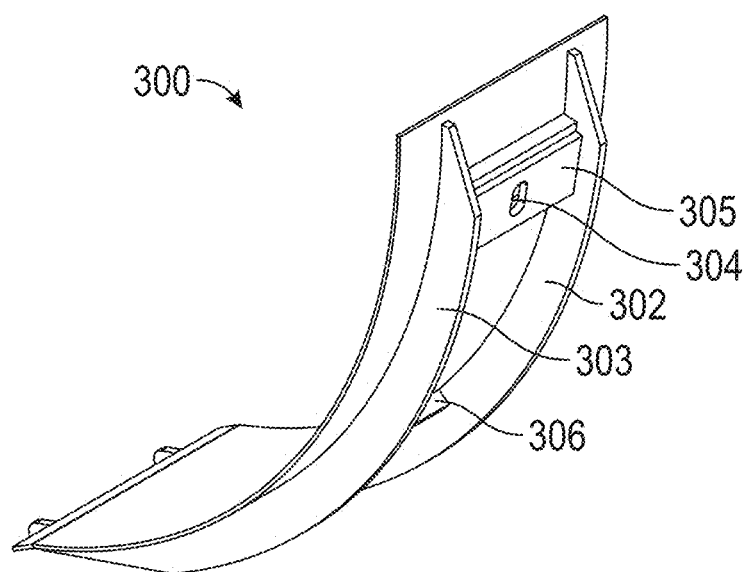
FIG. 11 is a second angled perspective view of the cover plate of FIG. 10.
Figure 12:
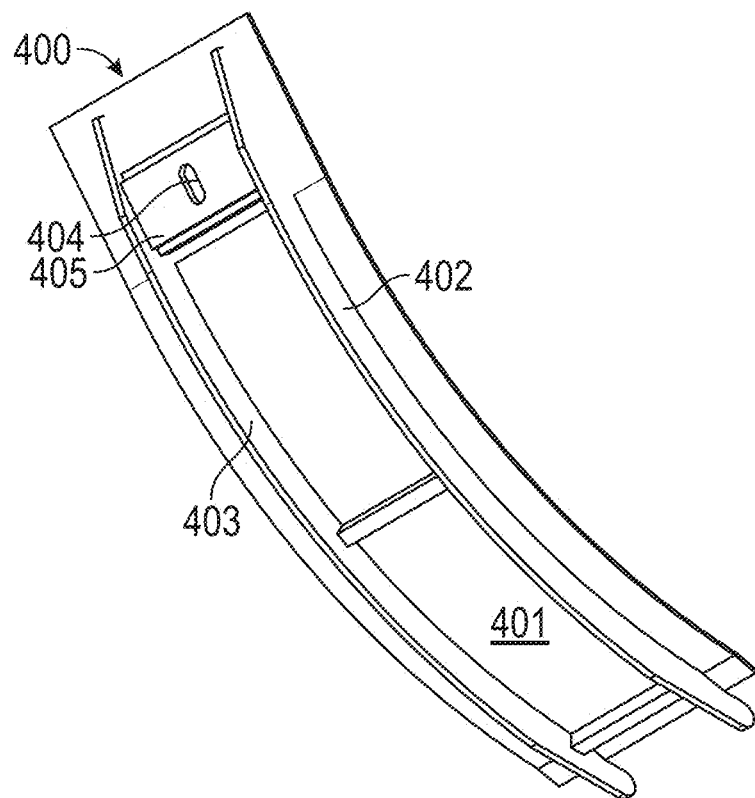
FIG. 12 is a first angled perspective view showing a right-side cover plate that can mount to the concave of a combine.
Figure 13:
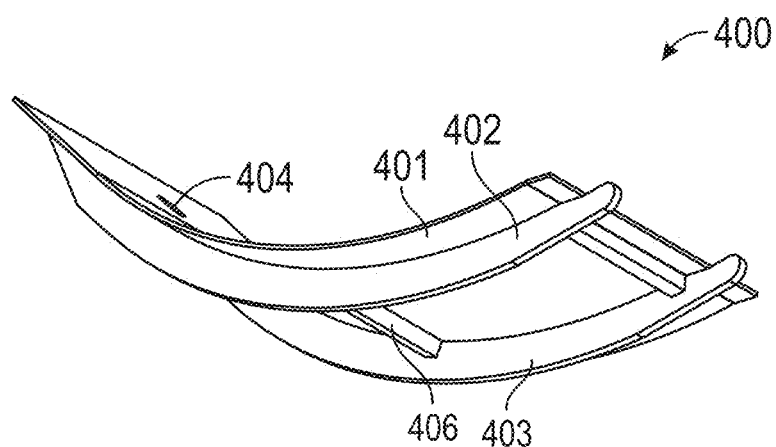
FIG. 13 is a second angled perspective view of the cover plate of FIG. 12.

The MOG limiter 105 shown in FIG. 9 involves positioning these notches 109 approximately equal distance between the inserts 106 of the MOG limiter which facilitates the positioning of the inserts 106 in the middle of the gaps of the concave 101 thereby restricting the opening allowing for small grains to drop through the concave 101 on either side of the insert while preventing MOG from passing through.

The MOG limiter 105 as shown in FIGS. 6-9 are readily installed by the farmer or technician without requiring the assistance of a second person and are easily and quickly removed once installed. This functions to enhance the flexibility provided to the farmer who may make adjustments as to how many and where MOG limiters 105 are positioned within the threshing section of the rotor chamber.

In one embodiment a known latch assembly is utilized as the upper concave connection and lower concave connection. The latch assembly may also employ a spring tensioning handle which upon closing draws the MOG limiter up into position on the underside of the concave 101.

In one embodiment, the MOG limiter 105 is designed for use on a ⅝ inch round bar concave 101 having a ¾ inch gap between the round crossbars 110.

In one embodiment, the MOG limiter 105 utilizes a clip apparatus which inserts over the concave crossbar 110 near midpoint of the concave 101 to which it is affixed.

In one embodiment, the MOG limiter 105 utilizes a pivot joint to rotatably affix the end of the MOG limiter at or near the middle of the concave 101.

In one embodiment, the MOG limiter 105 utilizes an insertable T-slot pivot assembly or other known standard pivot configurations to affix and retain the one end of the MOG limiter at or near the center point of the concave 101.

In one embodiment, the MOG limiter utilizes at least one clip mechanism to fasten the end of the MOG limiter to the end of the concave 101 and to retain the MOG limiter against the curvature of the concave 101.

In one embodiment, the clip assembly of the MOG limiter 105 is adjustable thereby pushing or pulling the MOG limiter 105 in a lateral direction as it is positioned on the concave 101.

In one embodiment the MOG limiter is designed for use with a ⅝ inch round bar concave 101 having a ⅞ inch gap between the round crossbars 110.

In one embodiment, the MOG limiter 105 utilizes at least one threaded locking mechanism to fasten the end of the MOG limiter to the end of the concave 101 and to retain the MOG limiter against the curvature of the concave 101.

In one embodiment, the threaded locking mechanism of the MOG limiter may be pulled or pushed by turning a retention housing or one or more retention nuts, thereby moving the MOG limiter laterally as it is positioned on the concave 101.

In one embodiment, the MOG limiter 105 is mechanically moved laterally thereby positioning the as it utilizes at least one threaded locking mechanism to fasten the end of the MOG limiter 105 to the end of the concave 101 and to retain the MOG limiter against the curvature of the concave 101.

Multiple other attachment mechanisms known in the art may be used to attach and hold the MOG limiter 105 in a stationary position adjacent to the concave 101 and which may allow for the adjustment of the position of the inserts 106 of the MOG limiter within the gaps existing between the crossbars 110 of the concaves residing within the combine.

Other embodiments of the MOG limiter 105 may employ inserts 106 of greater or lesser width so as to increase or decrease the openings remaining with the MOG limiters such that adjustments may be made by the operator of the combine. For example, in the harvest of sunflower seeds, the operator may set the MOG limiter to provide for a larger gap. Alternatively, in the harvest of alfalfa the opening selected may be set at or nearest to its narrowest. This may be accomplished by positioning the inserts equal distance from the crossbars to create two equal or nearly equal openings within each gap.

Figure 2:
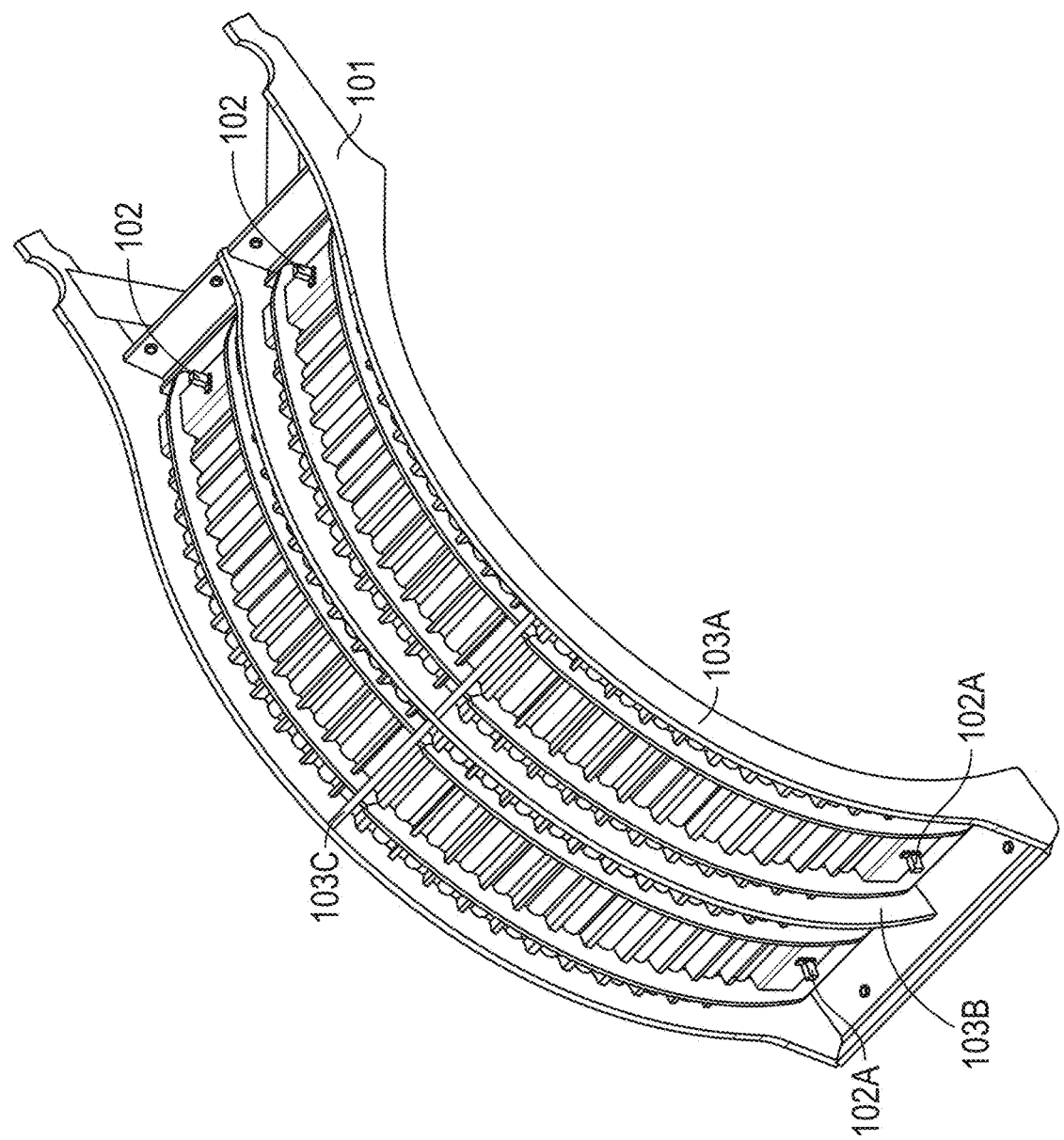
FIG. 2 shows an angled perspective of the underside of a concave with the MOG limiter, according to an embodiment of the present disclosure.
Figure 3:
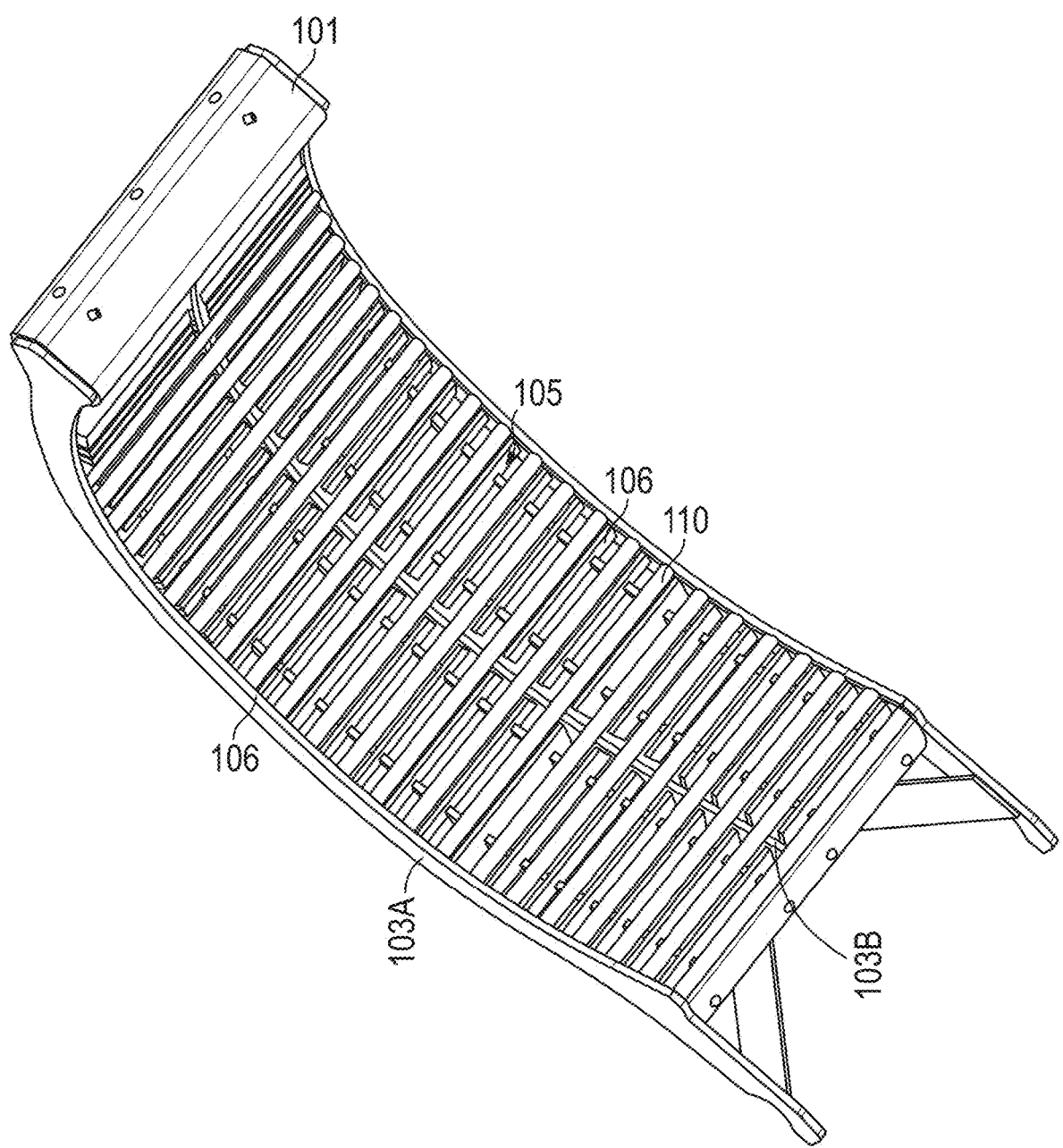
FIG. 3 shows an angled perspective view of the topside of one embodiment of FIG. 2.

In a concave 101 having a center support element on the underside as shown in FIG. 2 and utilizing the MOG limiter 105 as depicted in one of FIGS. 6-9, there are four quadrants existing on the underside of the concave 101. The farmer may install MOG limiters in all four quadrants of the concaves 101 at positions #2 and #3 to enhance the retention of MOG within the rotor chamber of the combine.

A method of use of the MOG limiters 105 in the 3-6 o'clock position on the concaves 101 placed in positions #2 &/or #3 to control the flow and distribution of grain to the sieve below so as to maximize the cleaning of the grain with the minimum of grain loss.

The assembly 100 can also include the use of one or more covers 300, 400, as is shown throughout FIGS. 10-13. Specifically, an example configuration for a left-side cover is shown throughout FIGS. 10-11 and an example configuration for a right-side cover is shown throughout FIGS. 12-13.

The left-side cover 300 can include a curvilinear plate 301. The curvilinear plate 301 comprises a flat, opaque, and rigid material that can be used to near completely prevent the flow of MOG from dropping out of the chamber and into the cleaning system. The curvilinear plate 301 is positioned between an arcuate side rails 107 and middle support rail of a concave 101. The cover plate 300 is designed to be configured in a curved supinated position against the crossbars 110 on the exterior of the concave 101.

The cover plate 300 may also include one or more arced supports 302, 303 that provide support to the curvilinear plate 301 from behind where a load of grain and MOG is applied. The one or more arced supports 302, 303 generally traverse the length (lateral direction) of the cover plates 300. In some embodiments, the one or more arced supports 302, 302 can further facilitate attachment to the arced rails 107 of the concave 101.

The latching assembly 200-204 shown and described in FIG. 5 can similarly be employed for the latching the cover plates 300 to the concave 101. The J-hook 202 in particular can maintain the lateral position of the cover plate so that curvilinear plate 201 stays adjacent the axial bars 110, thereby stopping the flow of MOG therethrough. The slot 304 is the area of the curvilinear plate 301 that allows for the threaded post 201 to pass through. The slot is preferably centrally located within a mounting plate 305 included on the cover plate 300.

Other supports that can also be included are bridge supports 306. The bridge supports 306 support the curvilinear plate 301 from behind where a load of grain and MOG is applied. These bridge supports generally span the horizontal length of the cover plate 300 from the one or more arced supports 302, 303 to the other. In some embodiments, several are employed within a single cover plate 200 one or more arced supports 302, 300 and they are spaced throughout the lateral distance of the cover plate 300 (see, e.g., FIGS. 10-11).

Likewise, the right-side cover 400 can include a curvilinear plate 401. The curvilinear plate 401 comprises a flat, opaque, and rigid material that can be used to near completely prevent the flow of MOG from dropping out of the chamber and into the cleaning system. The curvilinear plate 401 is positioned between an arcuate side rails 107 and middle support rail of a concave 101. The cover plate 400 is designed to be configured in a curved supinated position against the crossbars 110 on the exterior of the concave 101.

The cover plate 400 may also include one or more arced supports 402, 403 that provide support to the curvilinear plate 401 from behind where a load of grain and MOG is applied. The one or more arced supports 402, 403 generally traverse the length (lateral direction) of the cover plates 400. In some embodiments, the one or more arced supports 402, 402 can further facilitate attachment to the arced rails 107 of the concave 101.

The latching assembly 200-204 shown and described in FIG. 5 can similarly be employed for the latching the cover plates 400 to the concave 101. The J-hook 202 in particular can maintain the lateral position of the cover plate so that curvilinear plate 201 stays adjacent the axial bars 110, thereby stopping the flow of MOG therethrough. The slot 304 is the area of the curvilinear plate 401 that allows for the threaded post 201 to pass through. The slot is preferably centrally located within a mounting plate 405 included on the cover plate 400.

Other supports that can also be included are bridge supports 406. The bridge supports 406 support the curvilinear plate 401 from behind where a load of grain and MOG is applied. These bridge supports generally span the horizontal length of the cover plate 400 from the one or more arced supports 402, 403 to the other. In some embodiments, several are employed within a single cover plate 200 one or more arced supports 402, 400 and they are spaced throughout the lateral distance of the cover plate 400 (see, e.g., FIGS. 12-13).

In some embodiments, cover plates 300, 400 are installed in the concave 101 located in position #1.

It is thus to be appreciated that depending on the application, various combinations of MOG limiters 105, left-side cover plates 300, and right-side cover plates 400 can be employed to more uniformly distribute grain and MOG in the threshing and separation chambers of the combine.

For example, in the embodiment shown throughout FIGS. 14-17, a single MOG limiter is employed at the top left quarter of the concave 101, a single left-side cover plate 300 is employed at the lower left quarter of the concave 101, and two right side cove plates 400 are employed at the upper right quarter and the lower right quarter of the concaves.

For example, in the embodiment shown throughout FIGS. 18-21, a single MOG limiter is employed at the top right quarter of the concave 101, a single right-side cover plate 400 is employed at the lower right quarter of the concave 101, and two left side cove plates 300 are employed at the upper right quarter and the lower right quarter of the concaves.

It should further be appreciated combines including one or more assemblies (100) can include assemblies of different configurations to facilitate a more uniform grain and MOG distribution in the threshing and separation chambers of the combine. Thus, the configuration shown in FIGS. 14-17 could be used in position #1, while the configuration shown in FIGS. 18-21 could be used in position #2. An assembly having only MOG limiters could be used in position #3.

The left-side and right side covers 300, 400 are configured to compliment one another such that ends of the arced rails 302, 303, 402, 403 and/or separate pins which extend therefrom do not interfere with one another and/or interlock as they pass through the insert slots 104 within the cross frame 103C. In some embodiments, it is preferred that the left-side and right-side cover plates 300, 400 are not identical and/or mirror images of one another to help establish the aforementioned interlock.

It is to be appreciated that, in some embodiments, the left-side and right-side cover plates 300, 400 can be identically configured such that by simply rotating one 180°, a left-side cover plate 300 becomes a right-side cover plate 400 and vice-versa.

Figure 14:
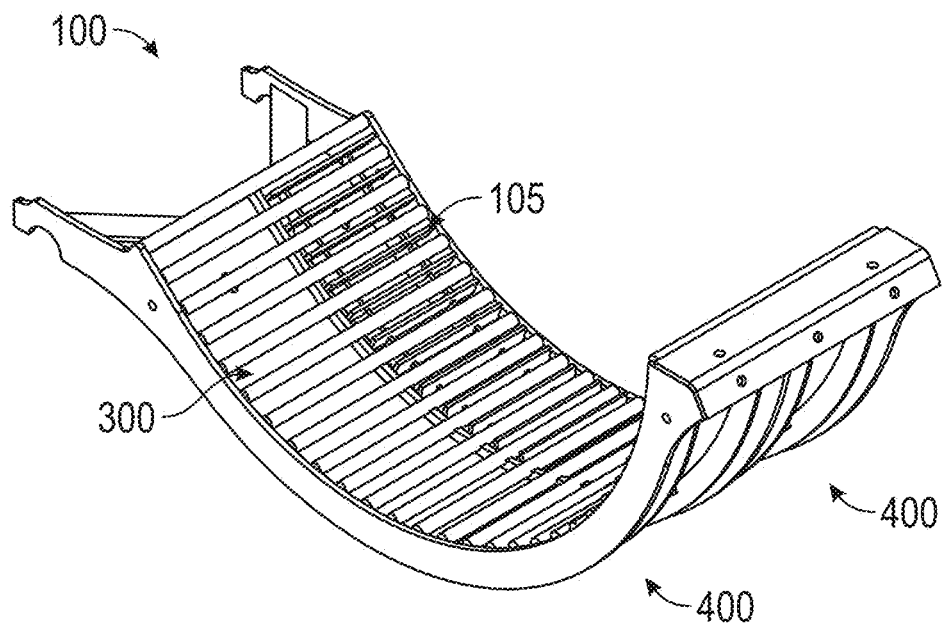
FIG. 14 is a concave, a MOG limiter, and a cover plate combination that includes two right-side cover plates, one left-side cover plate, and a MOG limiter installed on the left-side of the concave.
Figure 15:
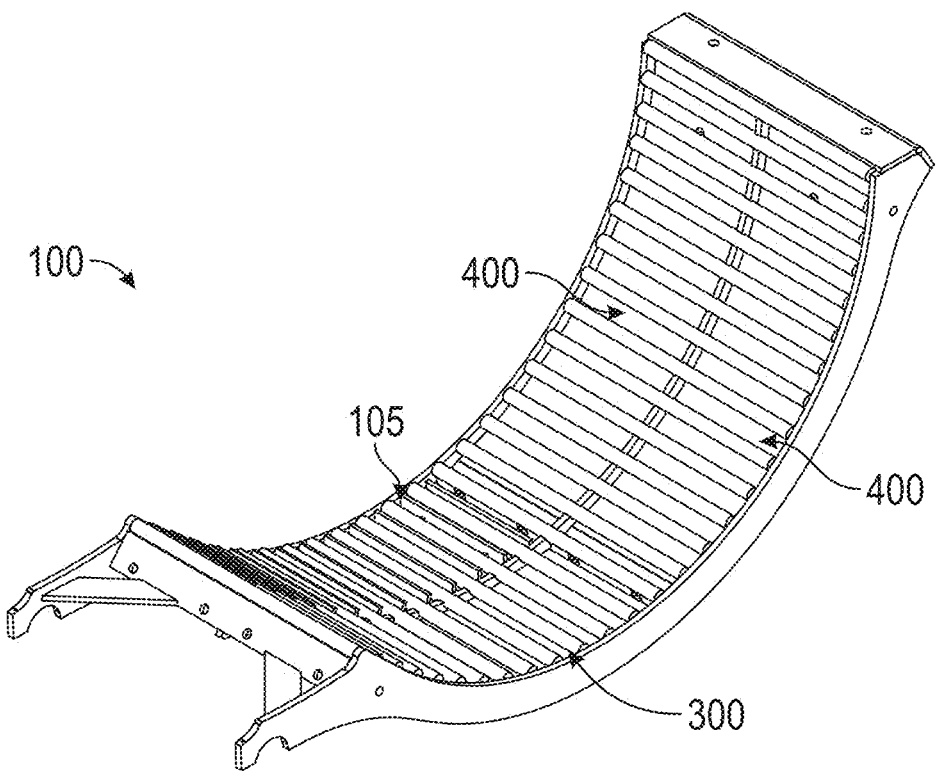
FIG. 15 is a second angled perspective view of the combination of FIG. 14.
Figure 16:
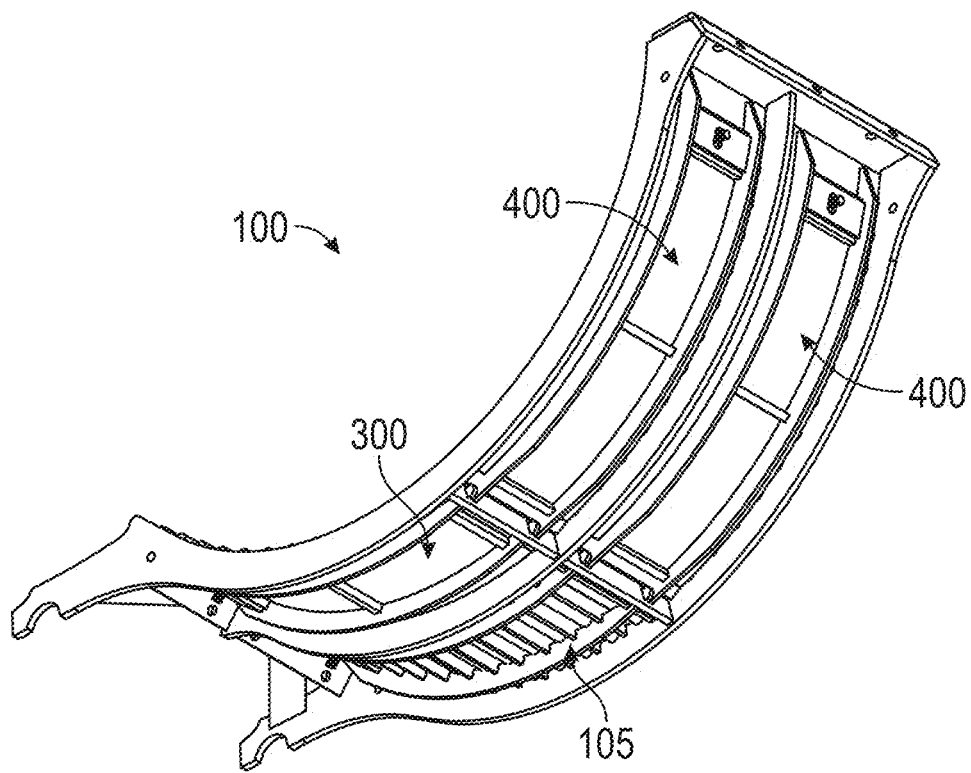
FIG. 16 is a third angled perspective view of the combination of FIG. 14.
Figure 17:
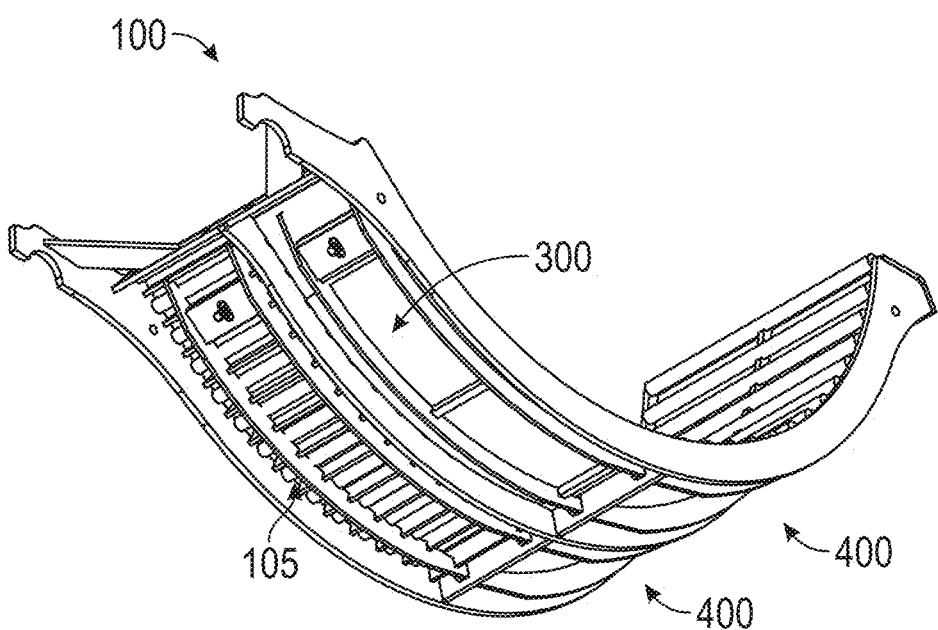
FIG. 17 is a fourth angled perspective view of the combination of FIG. 14.
Figure 18:
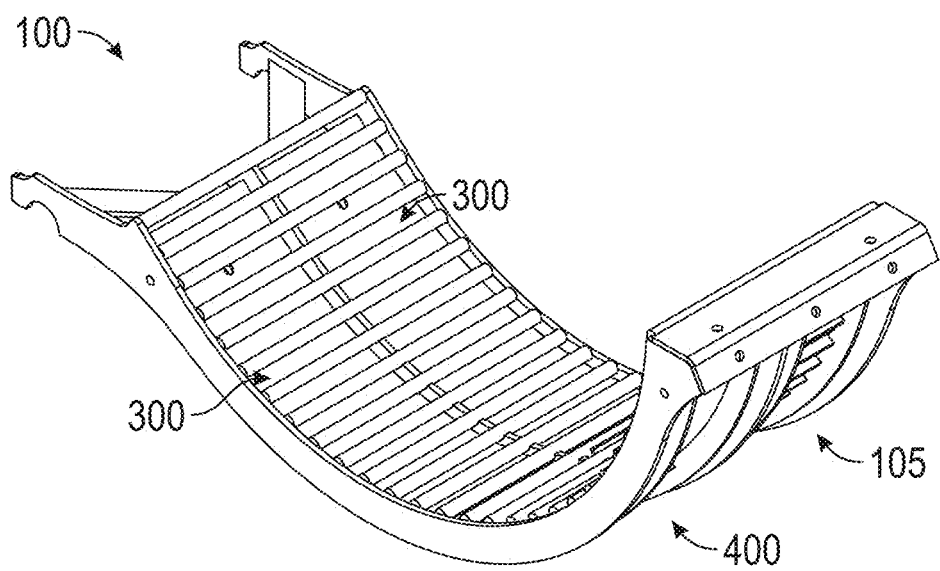
FIG. 18 is a concave, a MOG limiter, and a cover plate combination that includes two left-side cover plates, one right-side cover plate, and a MOG limiter installed on the right-side of the concave.
Figure 19:
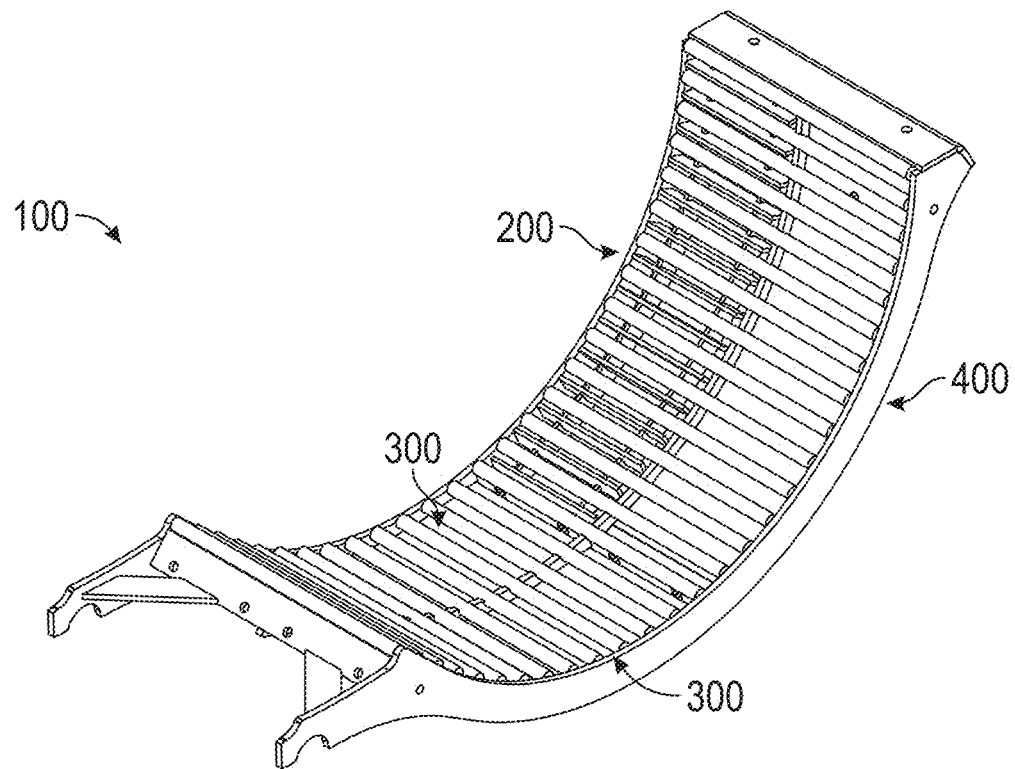
FIG. 19 is a second angled perspective view of the combination of FIG. 18.
Figure 20:
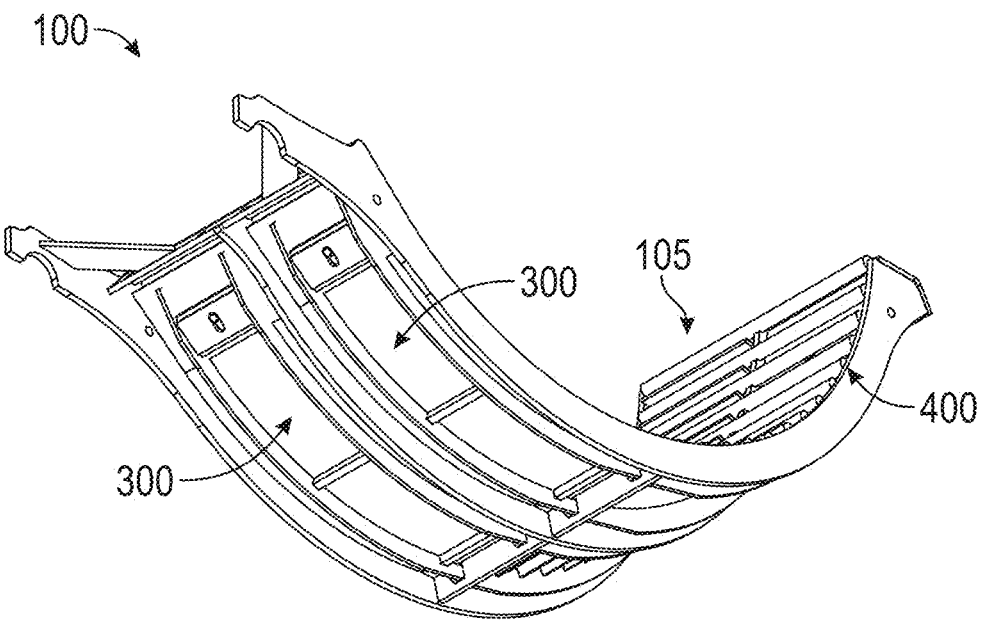
FIG. 20 is a third angled perspective view of the combination of FIG. 18.

In some embodiments, it should be appreciated that the concave can be divided into six, eight, or ten equal sections instead of the four quarter sections that are shown throughout FIGS. 14-21. One example combination is suggested in FIG. 22, in which the combination portrayed in FIG. 14 is shown in the #1 position of FIG. 22. Further, for orientation purposes, a directional continuum arrow generally presents how the concaves would be placed within a combine (such as that shown in FIG. 1). As shown, moving in a direction of lower concave positions indicates moving closer to a header of the combine (e.g., moving from position #2 to position #1), whereas moving in a direction of higher concave positions (e.g., positions #2 to position #3, or position #6 to position #7 not shown) indicates moving closer to a back of the combine.

Figure 23:
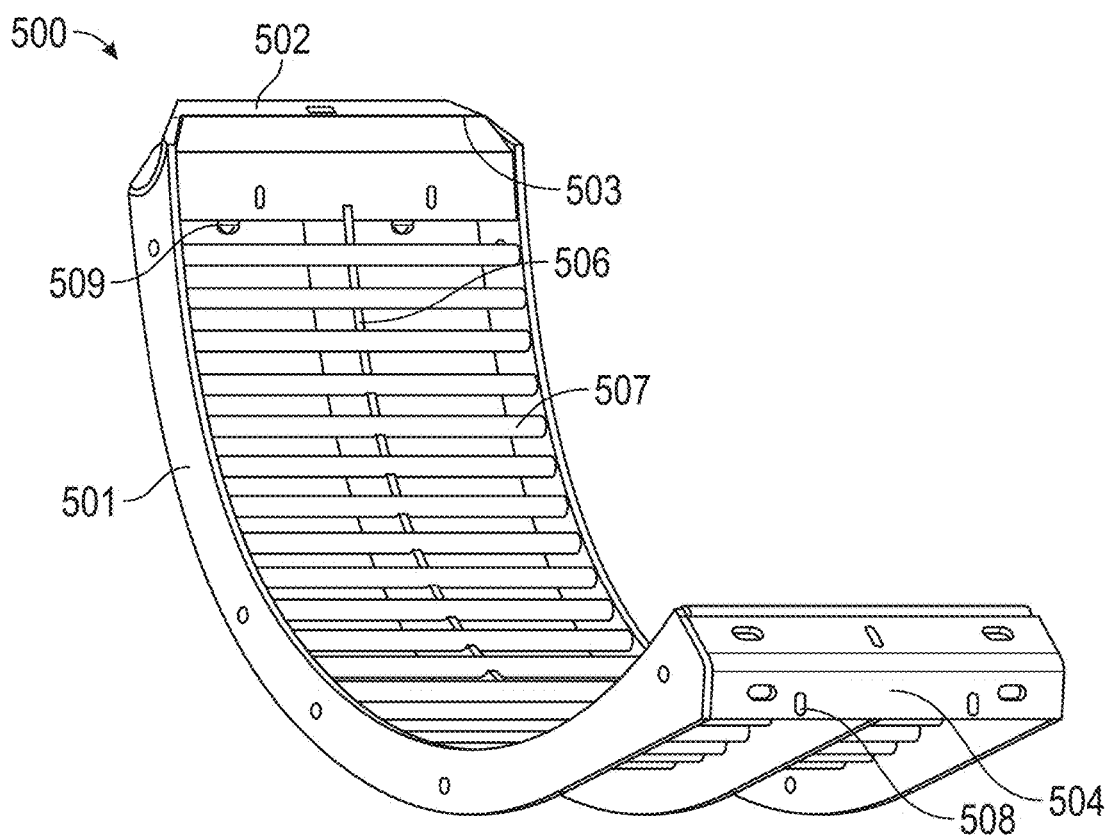
FIG. 23 shows a perspective view of a first embodiment of a modified MOG limiting concave assembly.
Figure 24:
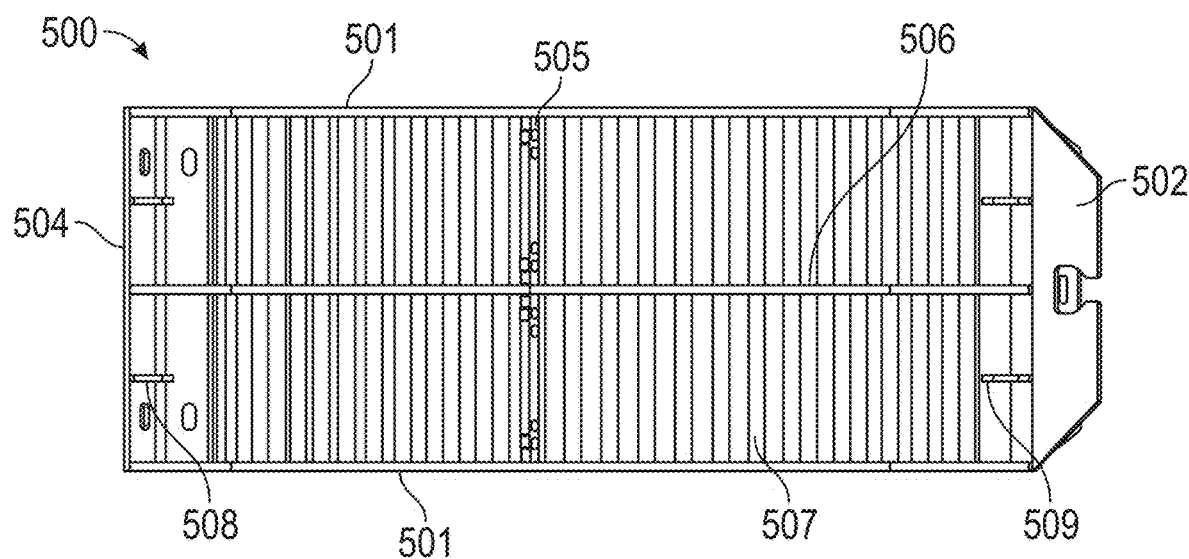
FIG. 24 shows a rear elevation view of the first embodiment of the modified MOG limiting concave assembly of FIG. 23.

A first embodiment 500 of a modified concave is shown in FIGS. 23-24. The first embodiment 500 includes an enhanced side flow rail 501, a C-clamp end 502, a first-end round bar drive 503, a second end plate 504, a quarter wrap center catch 505, an enhanced flow center rail 506, 0.625 inch diameter round bars 507, a left over-center catch 508, and a right over-center catch 509.

The side flow rails 501 are the curvilinear component that serve as the outer frame of the concave. At the C-clamp end 502 of the side flow rail 501, there exists a C-clamp that extends outwardly from a first-end round bar drive 503. At the second end there exists a second end plate 504. The C-clamp end 502 and the second end plate 504 are spaced from one another and extend generally away from one another. The C-clamp end 502 and the second end plate 504 extend transversely between and are rigidly joined to corresponding ends of the curved by way of the side flow rails 501. The C-clamp end 502 is curved in configuration for supporting the side flow rails 501, but there could exist some straight configurations for supporting the side flow rails 501 as part of the casing (not shown) below the rotor (not shown) of the combine.

The first embodiment 500 includes major central supports in the quarter wrap center catch 505 and the enhanced flow center rail 506. The quarter wrap center catch 505 is roughly equidistant between the C-clamp end 502 and the first-end round bar drive 503. The quarter wrap center catch 505 in combination with the left-over-center catch 508 and right-over-center catch 509 facilitates secure attachment to cover plates 900, 1000 and MOG limiters 1100, 1200.

The enhanced flow center rail 506 runs parallel to the side flow rails 501 and provides further support to the round bars 507. The round bars 507 are spaced substantially equidistantly from one another so that the gaps that form therebetween comprise a substantially similar or identical dimension.

Figure 25:
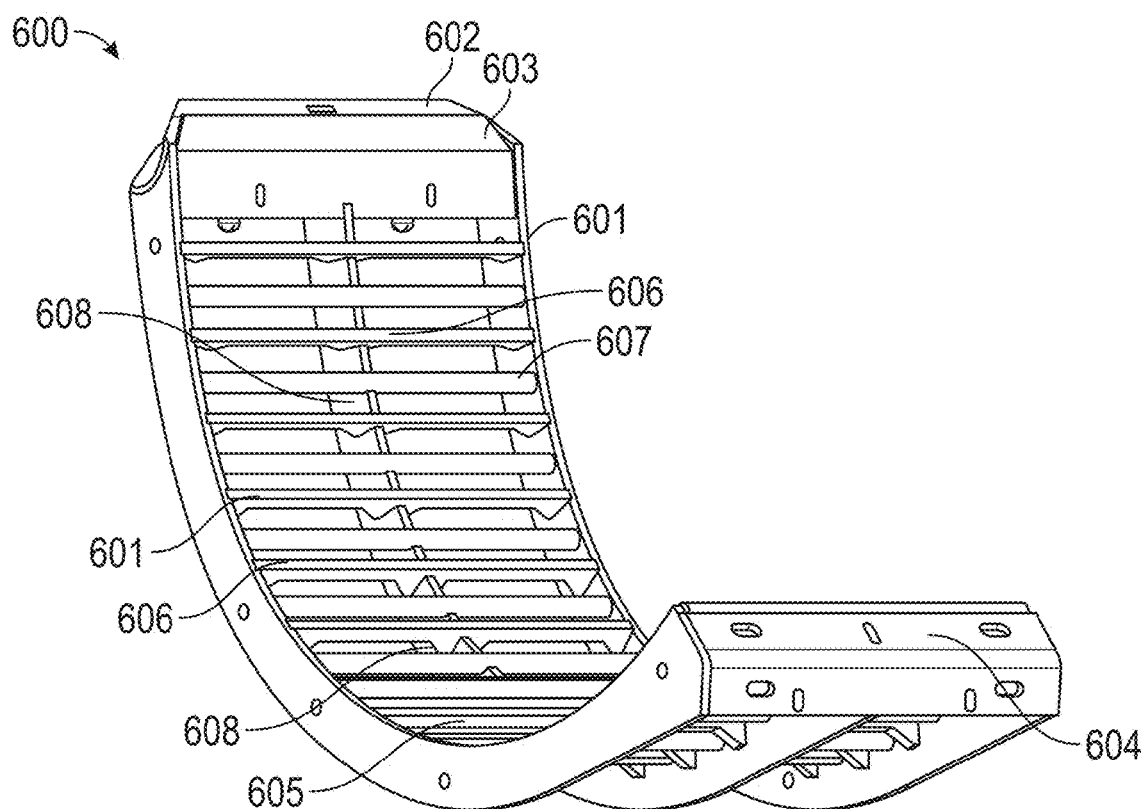
FIG. 25 shows a perspective view of a second embodiment of a modified MOG limiting concave assembly.
Figure 26:
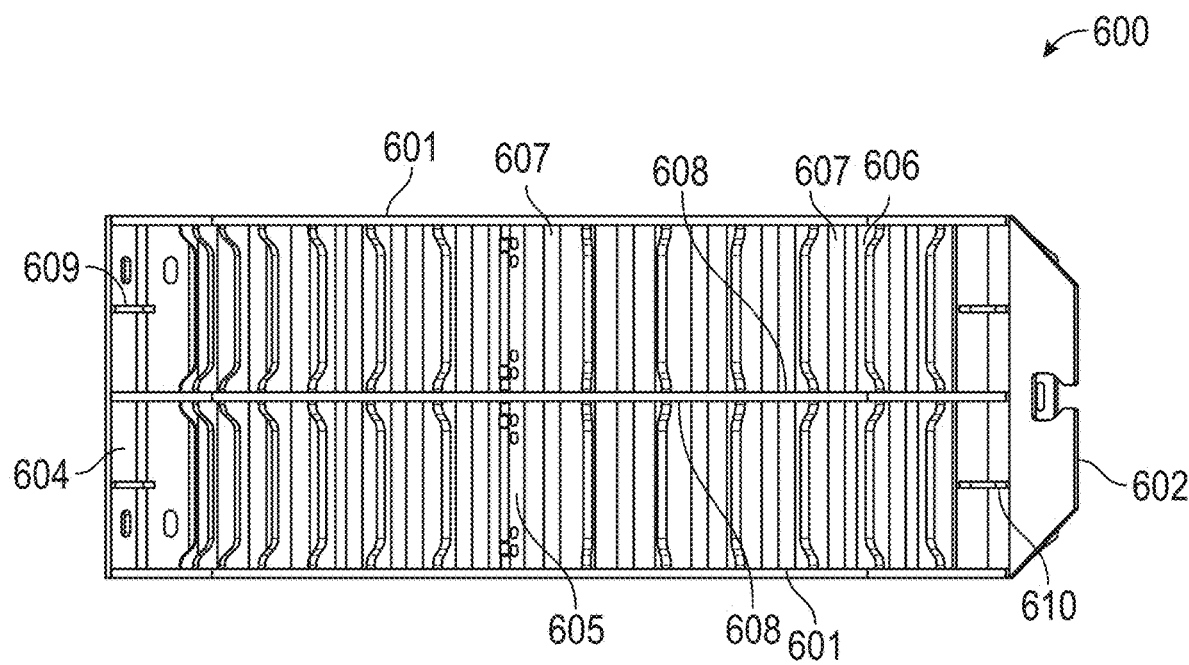
FIG. 26 shows a rear elevation view of the second embodiment of the modified MOG limiting concave assembly of FIG. 25.

A second embodiment 600 of a modified concave is shown in FIGS. 25-26. The second embodiment 600 includes an enhanced side flow rail 601, a C-clamp end 602, a first-end round bar drive 603, a second end plate 604, a quarter wrap center catch 605, 0.375 rub bars 606 with 0.125 inch prouds, 0.625 inch diameter round bars 607, an enhanced flow center rail 608, a left over-center catch 609, and a right over-center catch 610.

The side flow rails 601 are the curvilinear component that serve as the outer frame of the concave. At the C-clamp end 602 of the side flow rail 601, there exists a C-clamp that extends outwardly from a first-end round bar drive 603. At the second end there exists a second end plate 604. The C-clamp end 602 and the second end plate 604 are spaced from one another and extend generally away from one another. The C-clamp end 602 and the second end plate 604 extend transversely between and are rigidly joined to corresponding ends of the curved by way of the side flow rails 601. The C-clamp end 602 is curved in configuration for supporting the side flow rails 601, but there could exist some straight configurations for supporting the side flow rails 601 as part of the casing (not shown) below the rotor (not shown) of the combine.

The first embodiment 600 includes major central supports in the quarter wrap center catch 605 and the enhanced flow center rail 608. The quarter wrap center catch 605 is roughly equidistant between the C-clamp end 602 and the first-end round bar drive 603. The quarter wrap center catch 605 in combination with the left-over-center catch 609 and right-over-center catch 610 facilitates secure attachment to cover plates 900, 1000 and MOG limiters 1100, 1200.

The enhanced flow center rail 608 runs parallel to the side flow rails 601 and provides further support to the rub bars 606 and the round bars 607. The rub bars 606 and the round bars 607 alternate. The rub bars 606 and the round bars 607 are spaced substantially equidistantly from one another so that the gaps that form therebetween comprise a substantially similar or identical dimension.

Figure 27:
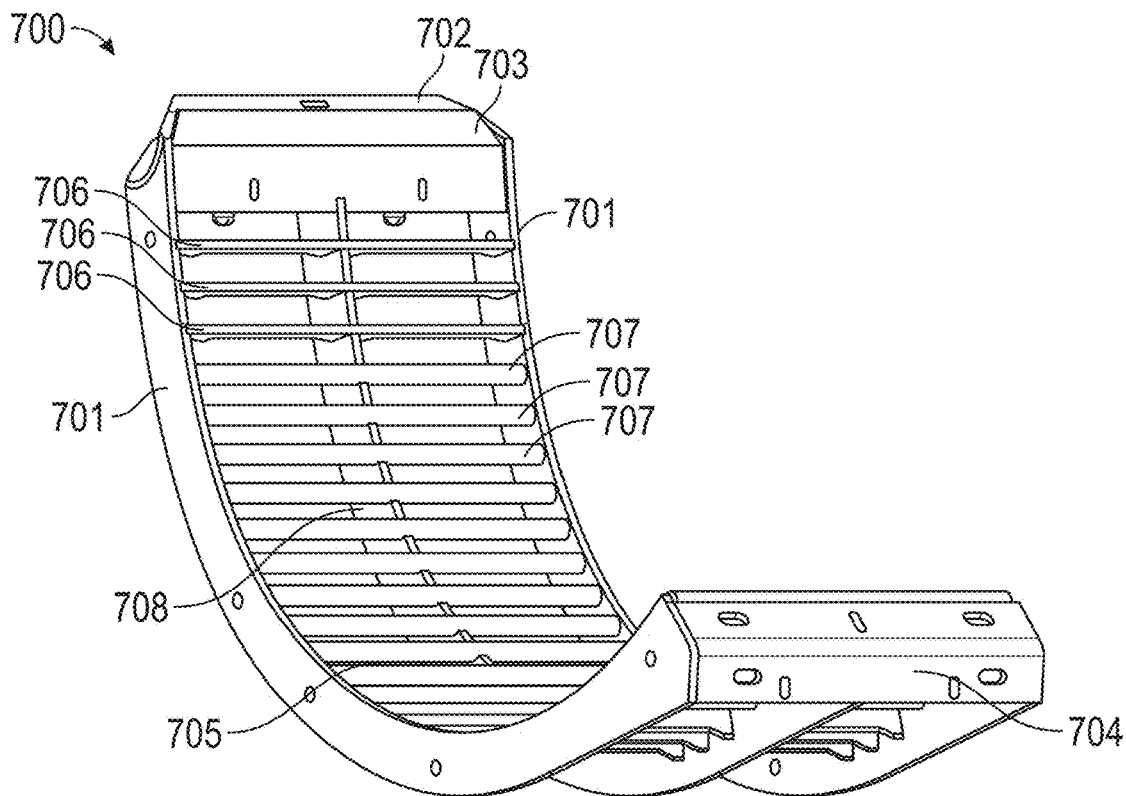
FIG. 27 shows a perspective view of a third embodiment of a modified MOG limiting concave assembly.
Figure 28:
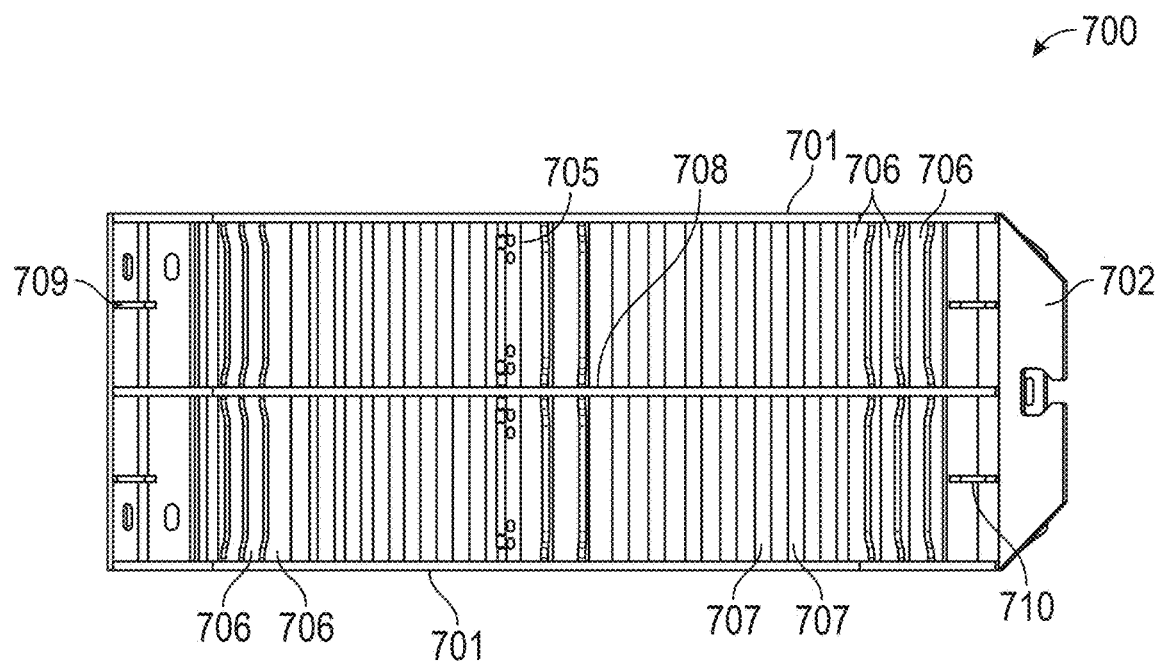
FIG. 28 shows a rear elevation view of the third embodiment of the modified MOG limiting concave assembly of FIG. 27.

A third embodiment 700 of a modified concave is shown in FIGS. 27-28. The third embodiment 700 includes an enhanced side flow rail 701, a C-clamp end 702, a first-end round bar drive 703, a second end plate 704, a quarter wrap center catch 705, 0.25 inch flat rub bars 706, 0.625 inch diameter round bars 707, an enhanced flow center rail 708, a left over-center catch 709, and a right over-center catch 710.

The side flow rails 701 are the curvilinear component that serve as the outer frame of the concave. At the C-clamp end 702 of the side flow rail 701, there exists a C-clamp that extends outwardly from a first-end round bar drive 703. At the second end there exists a second end plate 704. The C-clamp end 702 and the second end plate 704 are spaced from one another and extend generally away from one another. The C-clamp end 702 and the second end plate 704 extend transversely between and are rigidly joined to corresponding ends of the curved by way of the side flow rails 701. The C-clamp end 702 is curved in configuration for supporting the side flow rails 701, but there could exist some straight configurations for supporting the side flow rails 701 as part of the casing (not shown) below the rotor (not shown) of the combine.

The first embodiment 700 includes major central supports in the quarter wrap center catch 705 and the enhanced flow center rail 708. The quarter wrap center catch 705 is roughly equidistant between the C-clamp end 702 and the first-end round bar drive 703. The quarter wrap center catch 705 in combination with the left-over-center catch 709 and right-over-center catch 710 facilitates secure attachment to cover plates 900, 1000 and MOG limiters 1100, 1200.

The enhanced flow center rail 708 runs parallel to the side flow rails 701 and provides further support to the rub bars 706 and the round bars 707. The rub bars 706 and the round bars 707 alternate. The rub bars 706 are included in triplets and the remaining bars are round bars 707. The rub bars 706 and the round bars 707 are spaced substantially equidistantly from one another so that the gaps that form therebetween comprise a substantially similar or identical dimension.

Figure 29:
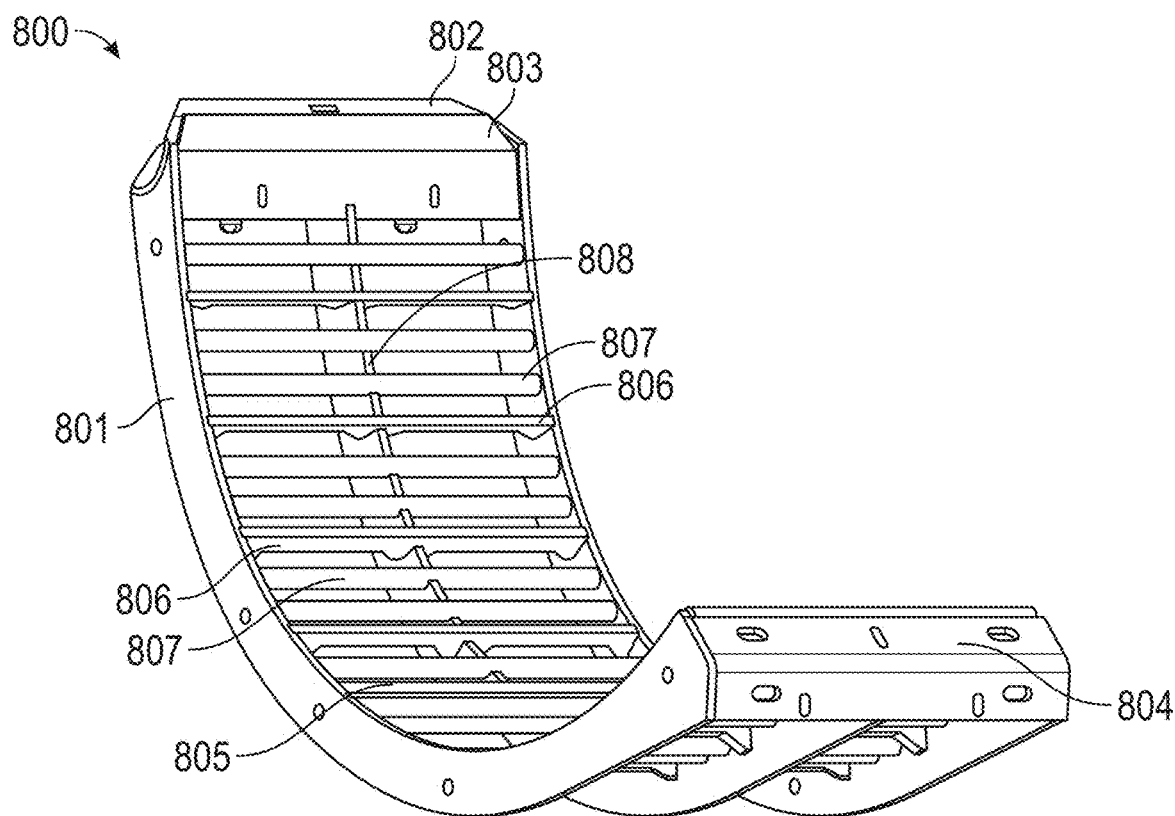
FIG. 29 shows a first perspective view of a fourth embodiment of a modified MOG limiting concave assembly.
Figure 30:
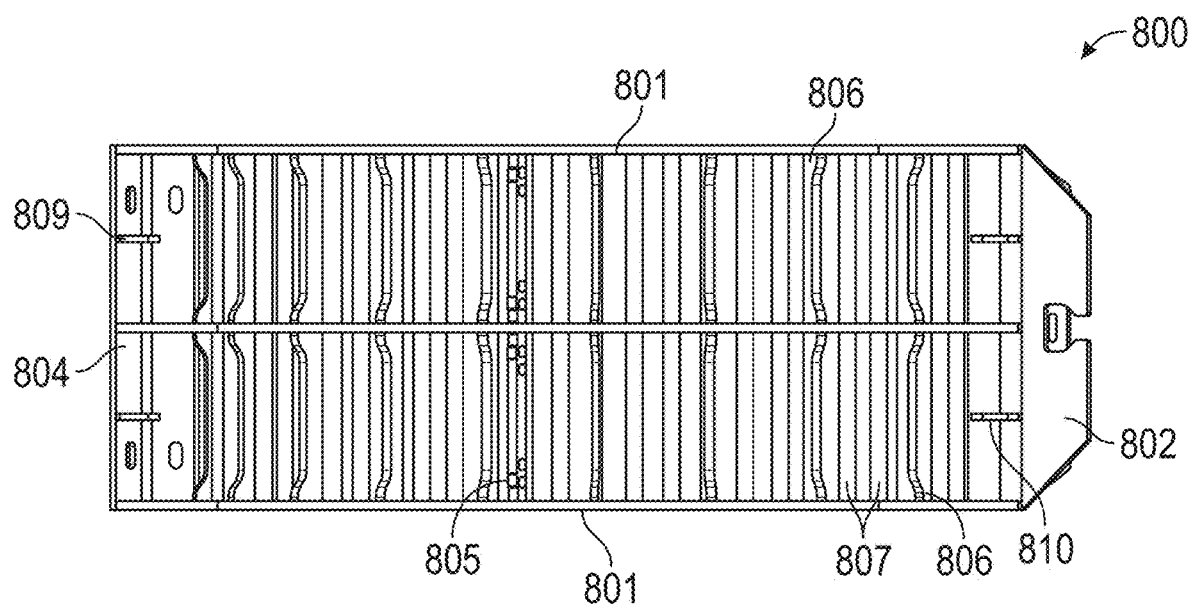
FIG. 30 shows a rear elevation view of the fourth embodiment of the modified MOG limiting concave assembly of FIG. 29.

A fourth embodiment 800 of a modified concave is shown in FIGS. 29-30. The fourth embodiment includes an enhanced side flow rail 801, a C-clamp end 802, a first-end round bar drive 803, a second end plate 804, a quarter wrap center catch 805, 0.375 inch flat rub bars 806, 0.625 inch diameter round bars 807, an enhanced flow center rail 808, a left over-center catch 809, and a right over-center catch 810.

The side flow rails 801 are the curvilinear component that serve as the outer frame of the concave. At the C-clamp end 802 of the side flow rail 801, there exists a C-clamp that extends outwardly from a first-end round bar drive 803. At the second end there exists a second end plate 804. The C-clamp end 802 and the second end plate 804 are spaced from one another and extend generally away from one another. The C-clamp end 802 and the second end plate 804 extend transversely between and are rigidly joined to corresponding ends of the curved by way of the side flow rails 801. The C-clamp end 802 is curved in configuration for supporting the side flow rails 801, but there could exist some straight configurations for supporting the side flow rails 801 as part of the casing (not shown) below the rotor (not shown) of the combine.

The first embodiment 800 includes major central supports in the quarter wrap center catch 805 and the enhanced flow center rail 808. The quarter wrap center catch 805 is roughly equidistant between the C-clamp end 802 and the first-end round bar drive 803. The quarter wrap center catch 805 in combination with the left-over-center catch 809 and right-over-center catch 810 facilitates secure attachment to cover plates 900, 1000 and MOG limiters 1100, 1200.

The enhanced flow center rail 808 runs parallel to the side flow rails 801 and provides further support to the rub bars 806 and the round bars 807. The rub bars 806 and the round bars 807 alternate. The rub bars 806 are included every third bar and the remaining bars are round bars 807. The rub bars 806 and the round bars 807 are spaced substantially equidistantly from one another so that the gaps that form therebetween comprise a substantially similar or identical dimension.

Figure 31:
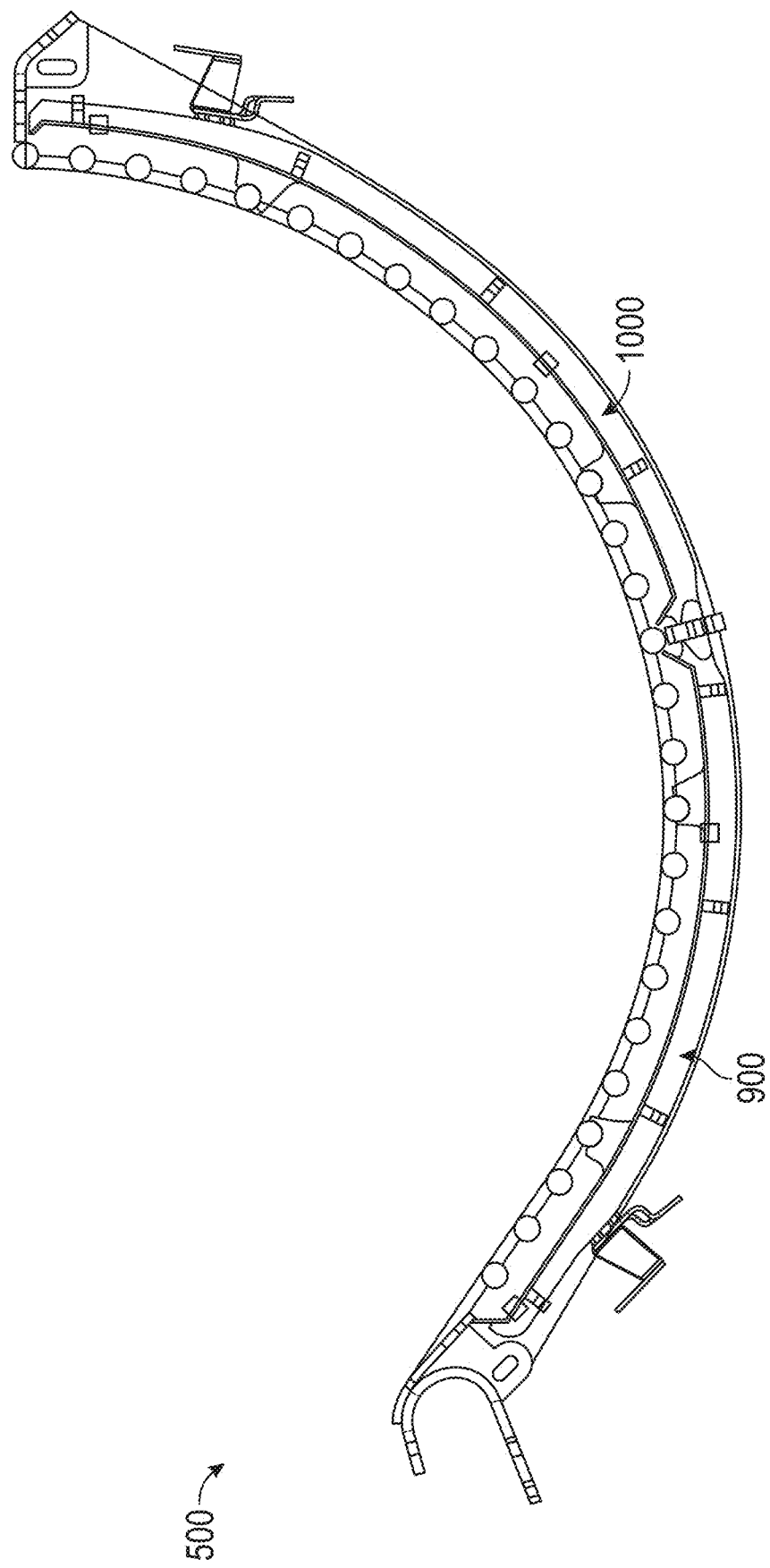
FIG. 31 shows a side elevation view of the first embodiment of the MOG limiting concave assembly of FIG. 23 equipped with cover plates.

As shown in FIG. 31, the first embodiment 500 of the MOG limiting concave assembly of FIG. 23 can be equipped with cover plates 900/1000.

Figure 32:
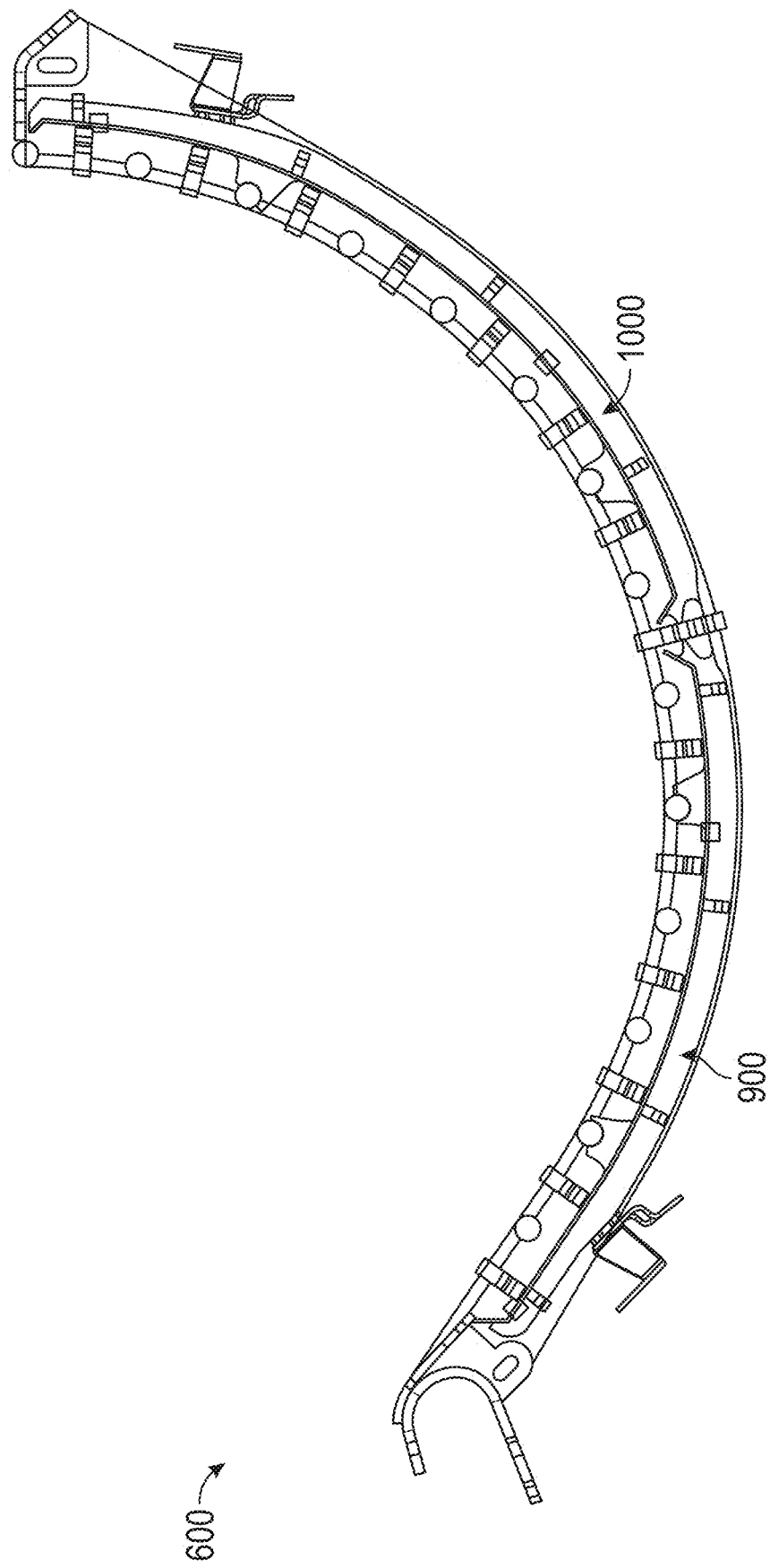
FIG. 32 shows a side elevation view of the second embodiment of the MOG limiting concave assembly of FIG. 25 equipped with cover plates.

As shown in FIG. 32, the second embodiment 600 of the MOG limiting concave assembly of FIG. 25 can be equipped with cover plates 900/1000.

Figure 33:
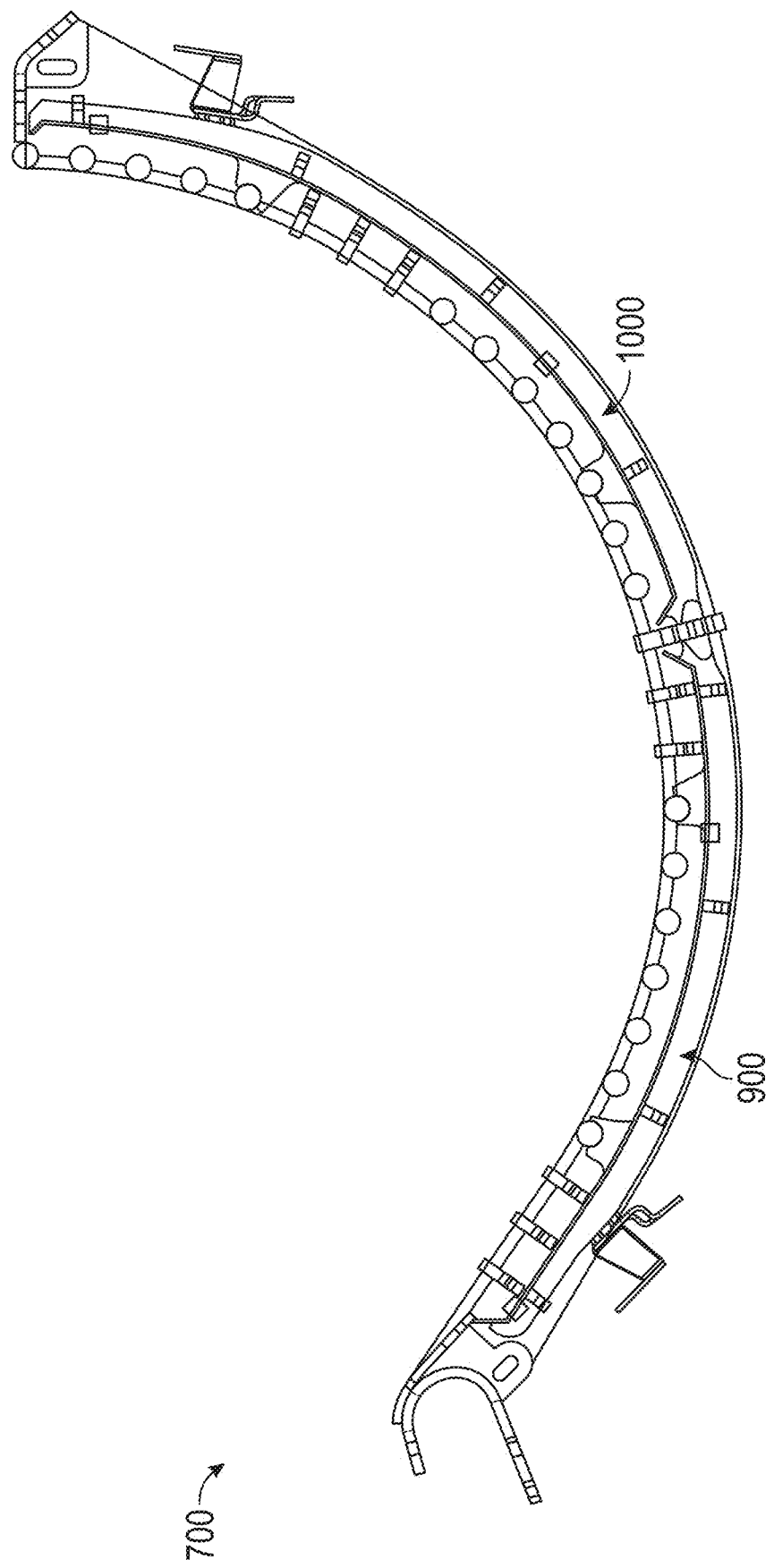
FIG. 33 shows a side elevation view of the three embodiment of the MOG limiting concave assembly of FIG. 27 equipped with cover plates.

As shown in FIG. 33, the third embodiment 700 of the MOG limiting concave assembly of FIG. 27 can be equipped with cover plates 900/1000.

Figure 34:
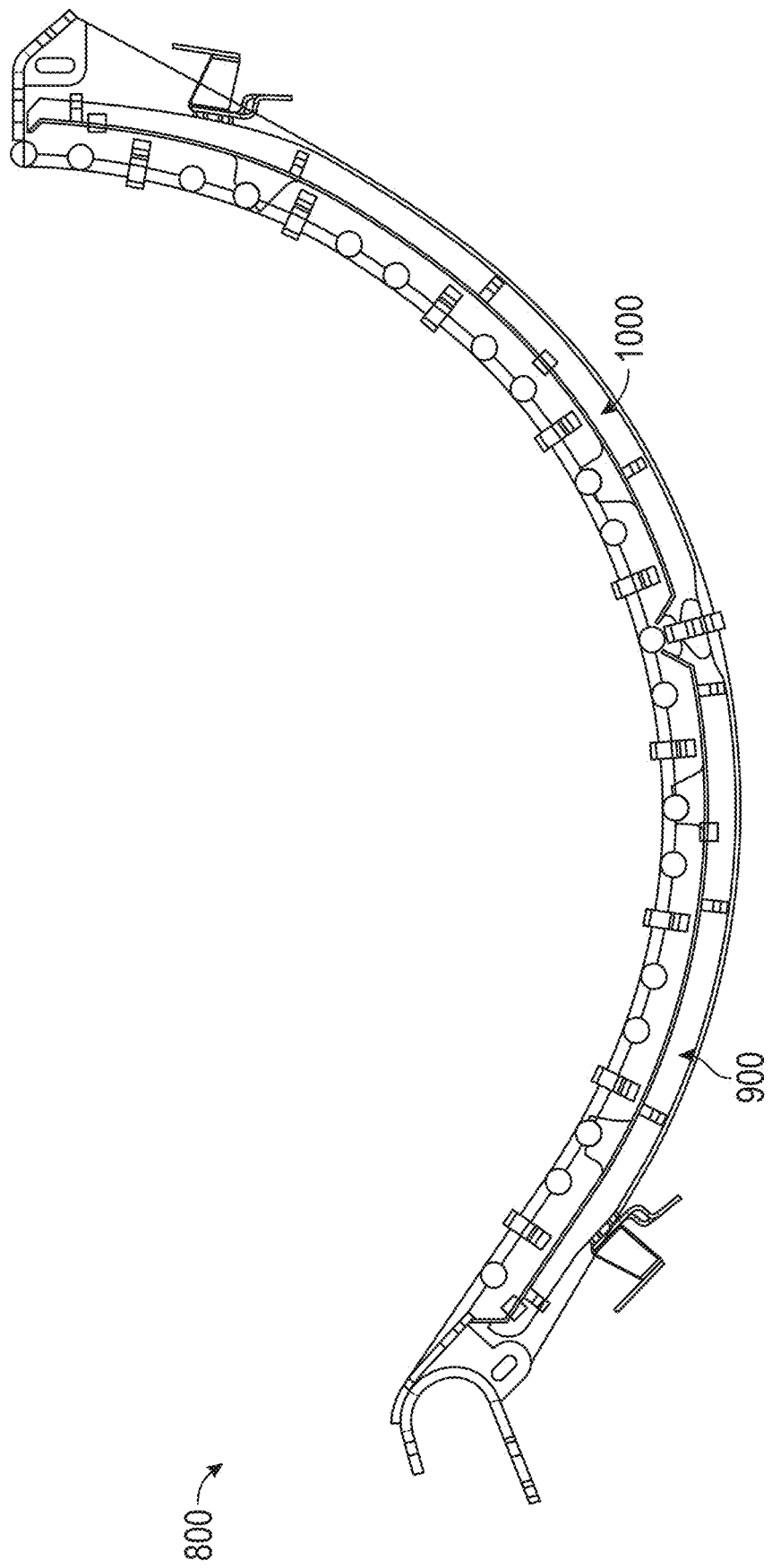
FIG. 34 shows a side elevation view of the fourth embodiment of the MOG limiting concave assembly of FIG. 29 equipped with cover plates.

As shown in FIG. 34, the fourth embodiment 800 of the MOG limiting concave assembly of FIG. 29 can be equipped with cover plate assemblies 900/1000.

Figure 35:
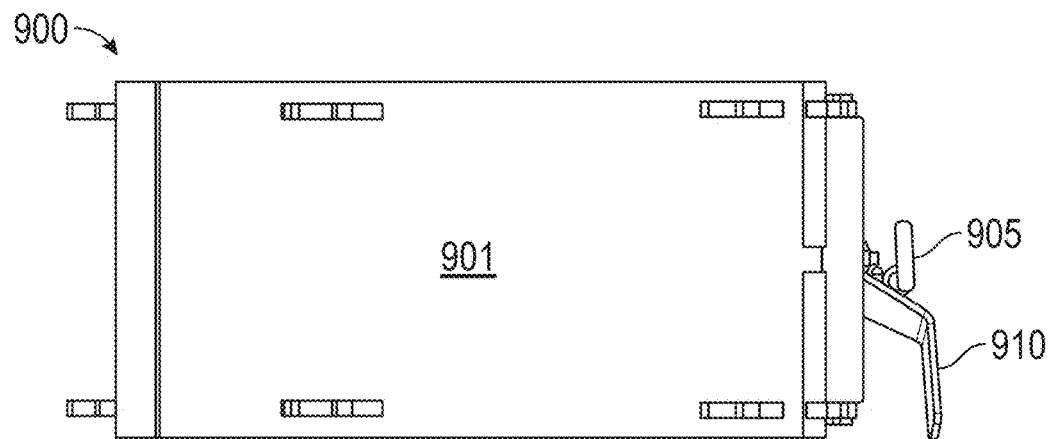
FIG. 35 shows a top plan view of left-side quarter wrap (QW) cover plate assembly.
Figure 36:
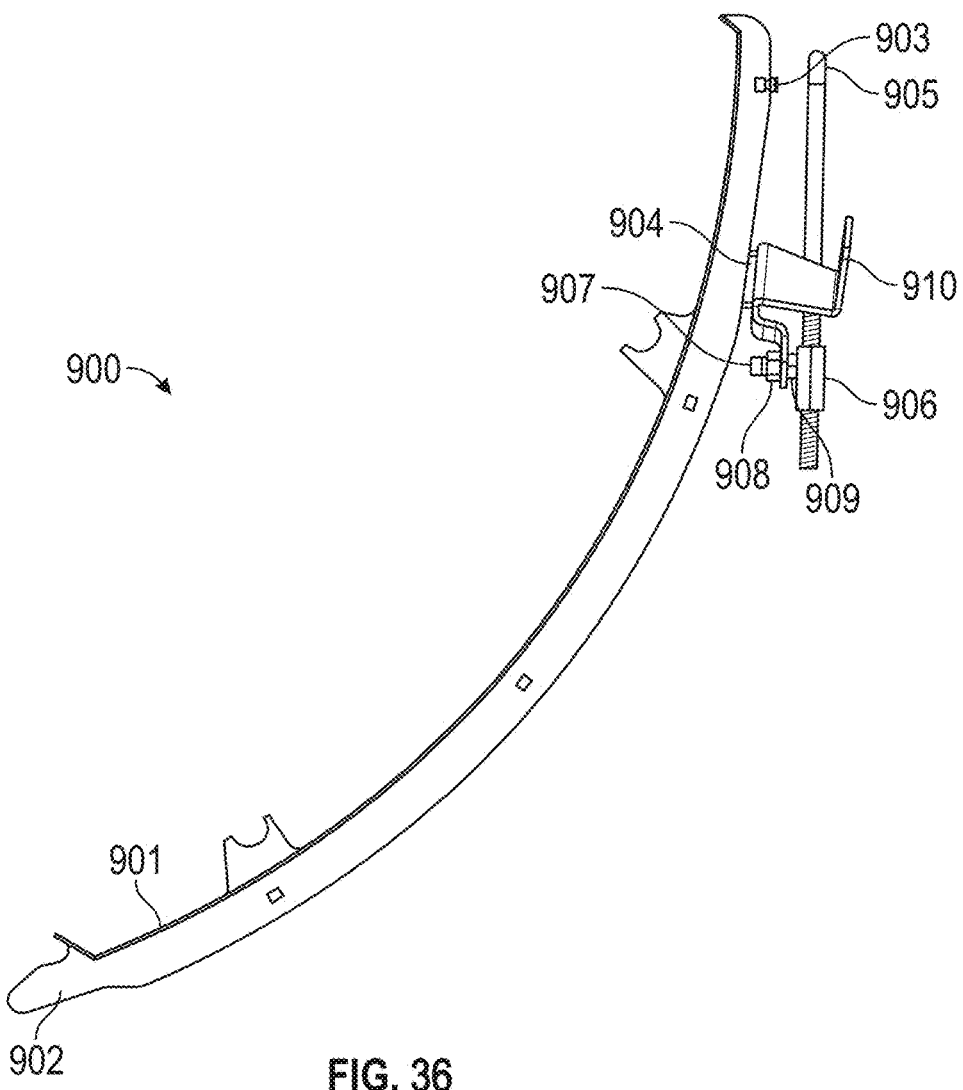
FIG. 36 shows a side elevation view of left-side quarter wrap (QW) cover plate assembly of FIG. 35.

FIGS. 35-36 show a left-side quarter wrap (QW) cover plate assembly 900. The left-side quarter wrap (QW) cover plate assembly 900 includes a left-side quarter wrap cover plate 901, a left-side quarter wrap cover plate support 902, a left-side cover plate over-center handle anchor plate 903, a left-side quarter wrap cover plate rail 904, a J-bolt 905, a 0.3125 inch 18-thread long-steel coupling nut 906, a 0.25 inch 18-thread long hex head screw 907, a 0.25 inch 18-thread nylon insert lock nut 908, a 0.25 inch steel washer 909, and a CMF over-center handle 910.

Figure 37:
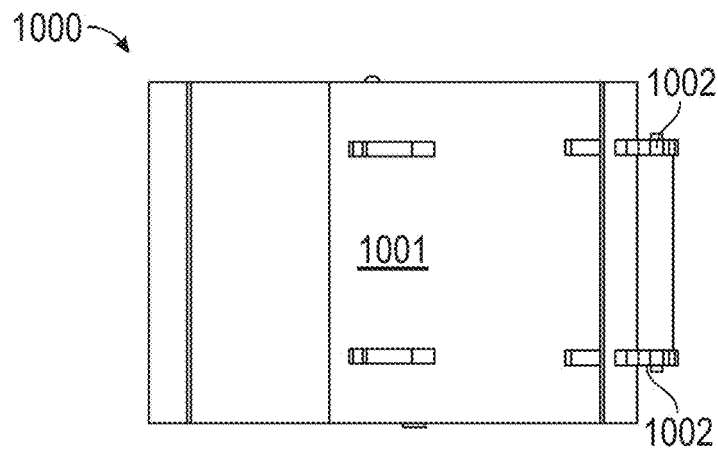
FIG. 37 shows a top plan view of right-side quarter wrap (QW) cover plate assembly.
Figure 38:
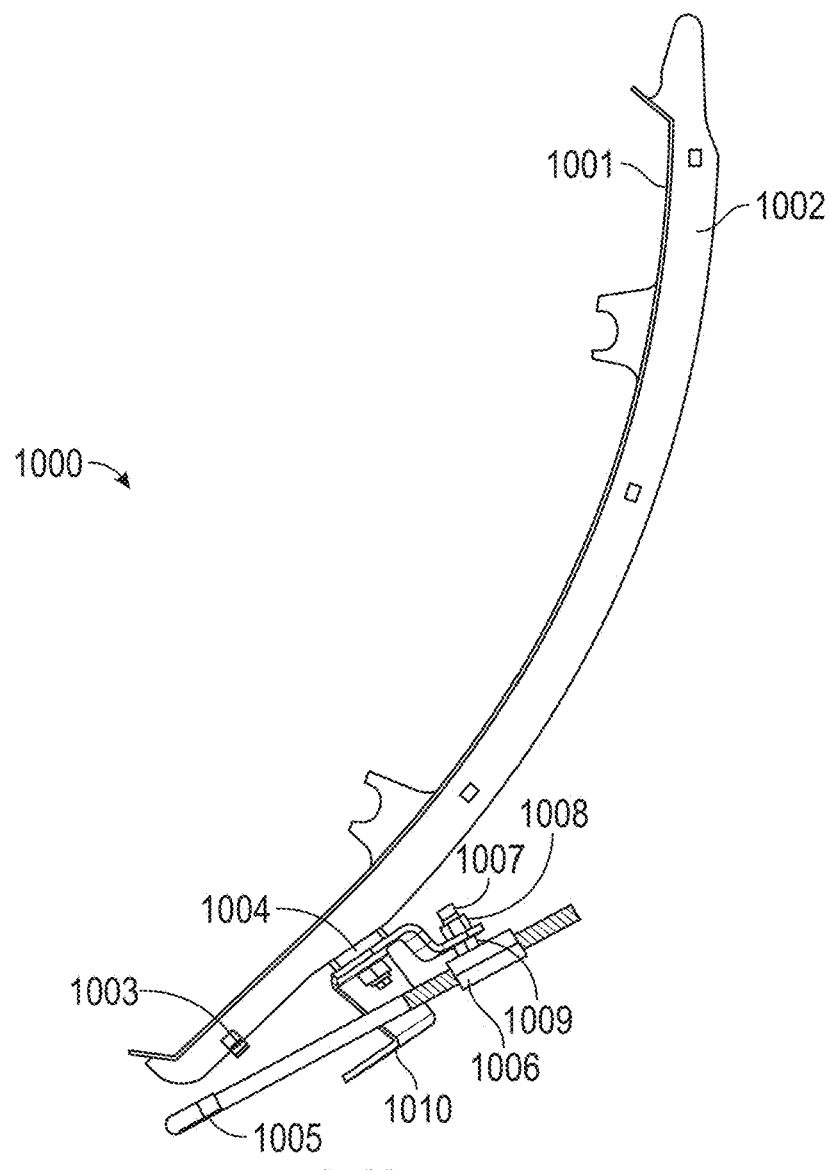
FIG. 38 shows a side elevation view of right-side quarter wrap (QW) cover plate assembly of FIG. 37.

FIGS. 37-38 show a right-side quarter wrap (QW) cover plate assembly 1000. The right-side quarter wrap (QW) cover plate assembly 1000 includes a right-side quarter wrap cover plate 1001, a right-side quarter wrap cover plate support 1002, a right-side cover plate over-center handle anchor plate 1003, a right-side quarter wrap cover plate rail 1004, a J-bolt 1005, a 0.3125 inch 18-thread long-steel coupling nut 1006, a 0.25 inch 18-thread long hex head screw 1007, a 0.25 inch 18-thread nylon insert lock nut 1008, a 0.25 inch steel washer 1009, and a CMF over-center handle 1010.

The left-side and right-side quarter wrap (QW) cover plate assemblies 900, 1000 retain plant material to fill the large openings and create a mattress-type surface. The matte of plant material provides a gentle & natural rubbing action against each other as they travel over the horizontal grain separation bars while retaining the material in chamber for enough time to complete even the tough or green pods. The left-side and right-side quarter wrap (QW) cover plate assemblies 900, 1000 also allow the operator to run the bottom sieve further open, pushing more air through the top sieve, reducing pod material in the tank. The use of natural plant materials reduces the chances of the rotor splitting soybeans over the longer duration in the chamber.

Use of the cover plates 900, 1000 allows for a more complete thresh, reduces tailings, and creates a cleaner grain sample.

Figure 39:
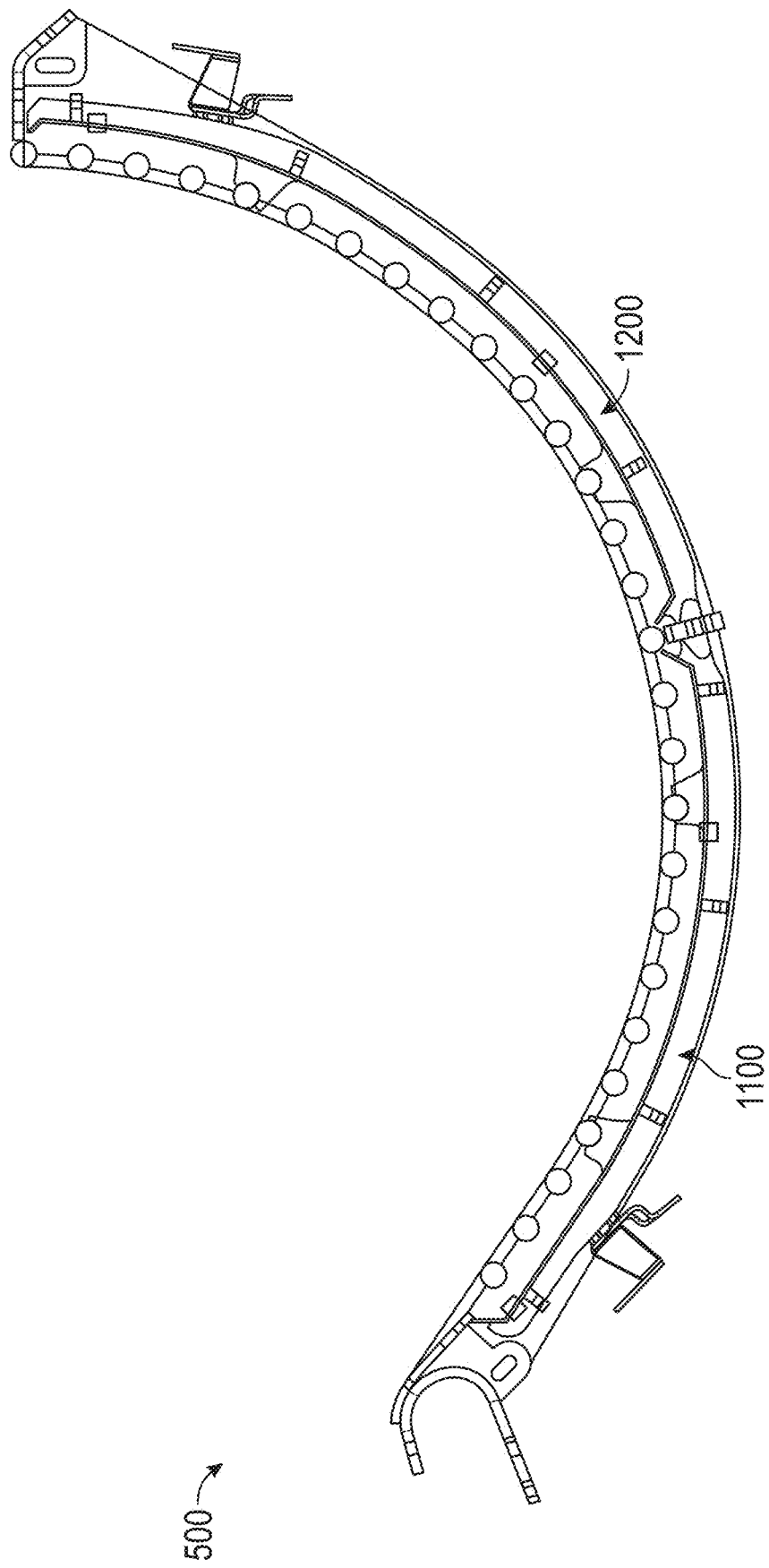
FIG. 39 shows a side elevation view of a quarter wrap (QW) MOG limiter assembly included in the MOG limiting concave assembly of FIG. 23.

As shown in FIG. 39, the first embodiment 500 of the MOG limiting concave assembly of FIG. 23 can be equipped with MOG limiter assemblies 1100/1200.

Figure 40:
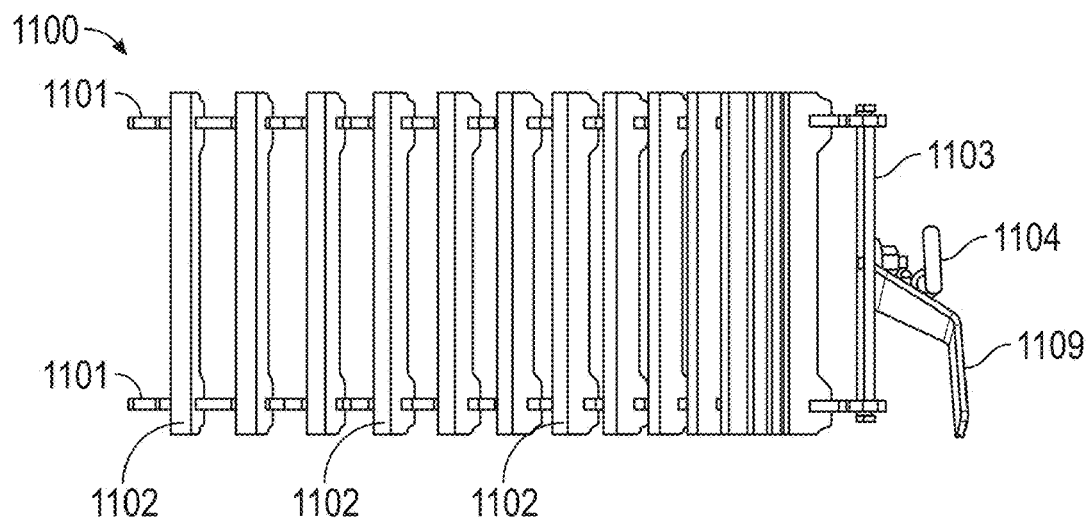
FIG. 40 shows a top plan view of left-side quarter wrap (QW) MOG limiters in the quarter wrap MOG limiter assembly seen in FIG. 39.
Figure 41:
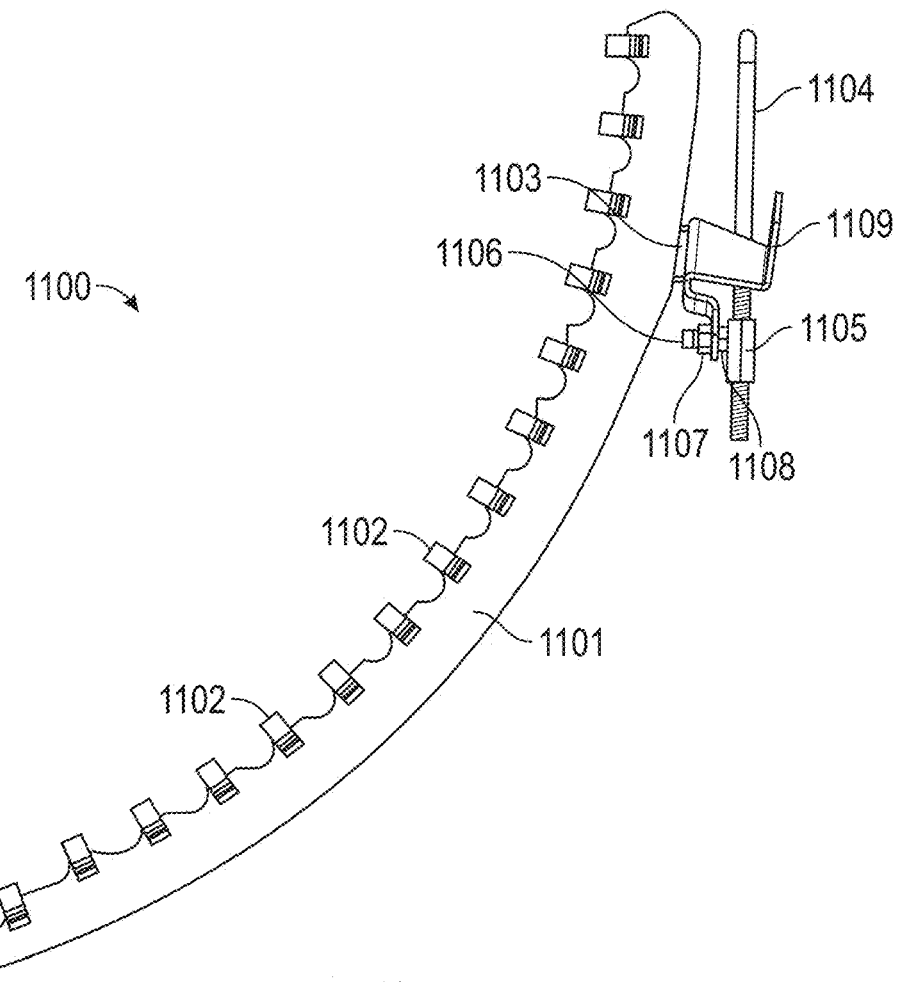
FIG. 41 shows a side elevation view of left-side quarter wrap (QW) MOG limiter assembly of FIG. 40.
Figure 42:
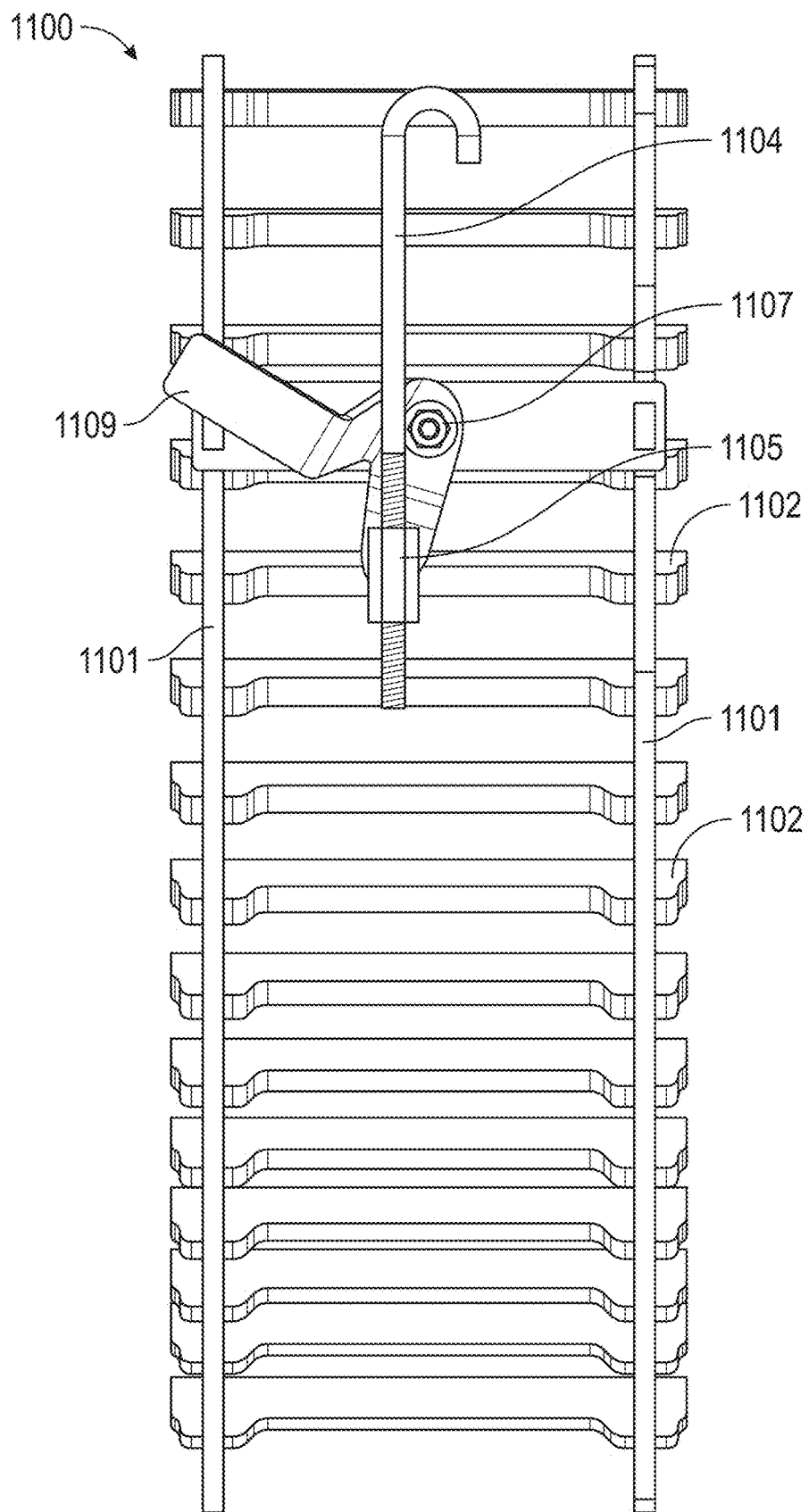
FIG. 42 shows a bottom plan view of left-side quarter wrap (QW) MOG limiter assembly of FIG. 40.

FIGS. 40-42 show a left-side quarter wrap (QW) MOG limiter assembly 1100. The left-side quarter wrap (QW) MOG limiter assembly 1100 includes a left-side quarter wrap MOG limiting rail 1101, a left-side MOG limiting rub bar 1102, a left-side ML over-center handle anchor plate 1103, a J bolt 1104, a 0.3125 inch 18-thread long-steel coupling nut 1105, a 0.25 inch 18-thread long hex head screw 1106, a 0.25 inch 18-thread nylon insert lock nut 1107, a 0.25 inch steel washer 1108, and a CMF over-center handle 1109.

Figure 43:
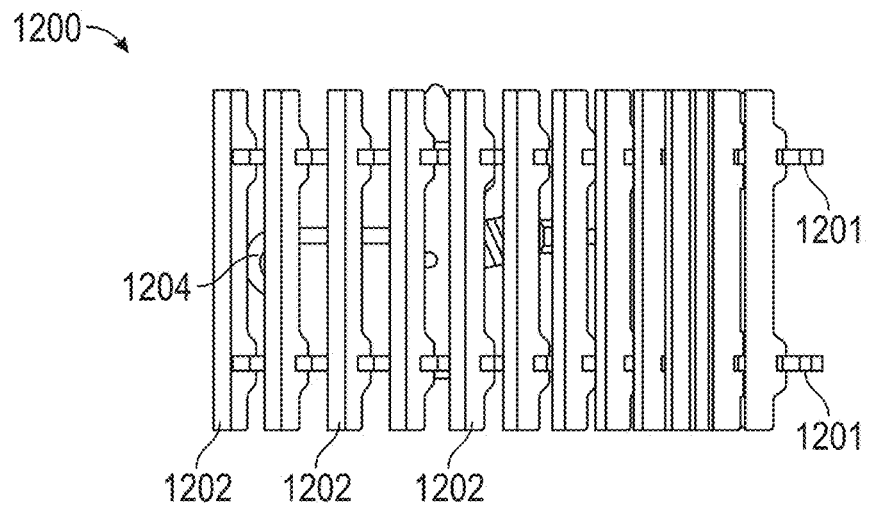
FIG. 43 shows a top plan view of right-side quarter wrap (QW) MOG limiters in the quarter wrap MOG limiter assembly seen in FIG. 39.
Figure 44:
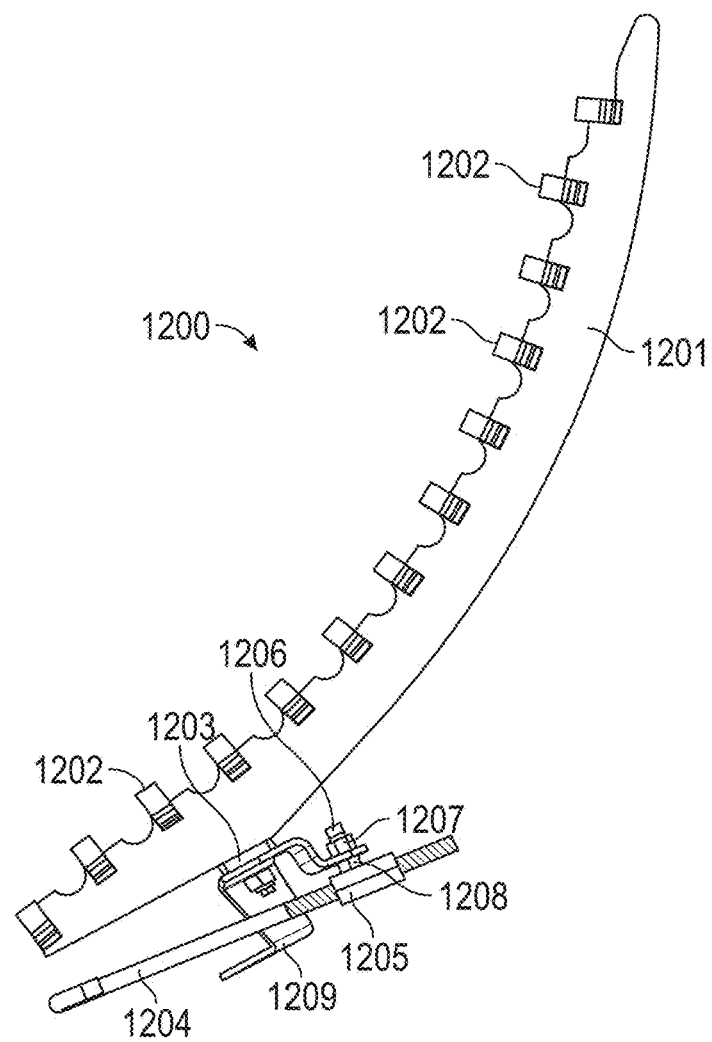
FIG. 44 shows a side elevation view of right-side quarter wrap (QW) MOG limiter assembly of FIG. 43.
Figure 45:
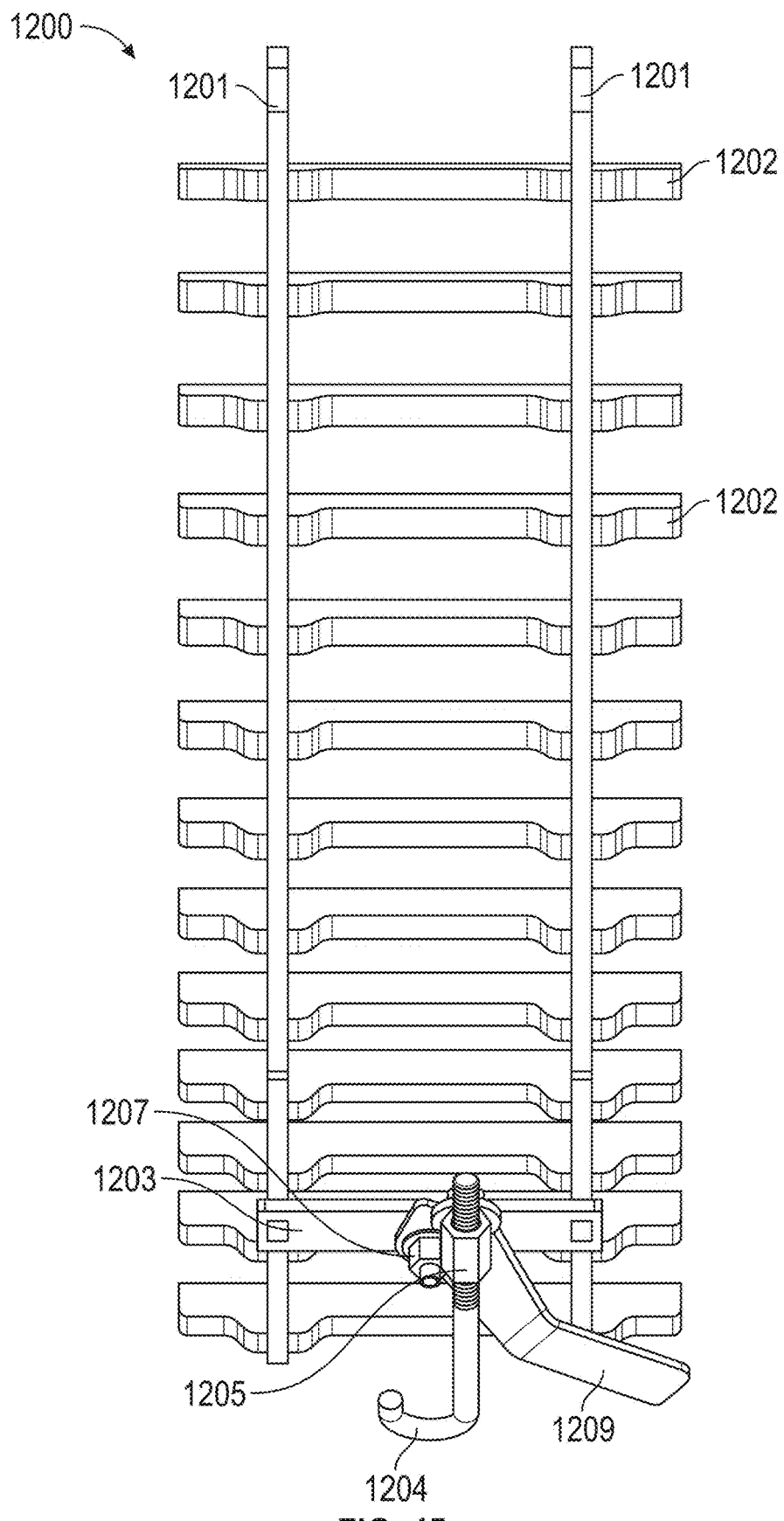
FIG. 45 shows a bottom plan view of right-side quarter wrap (QW) MOG limiter assembly of FIG. 43.
Figure 46:
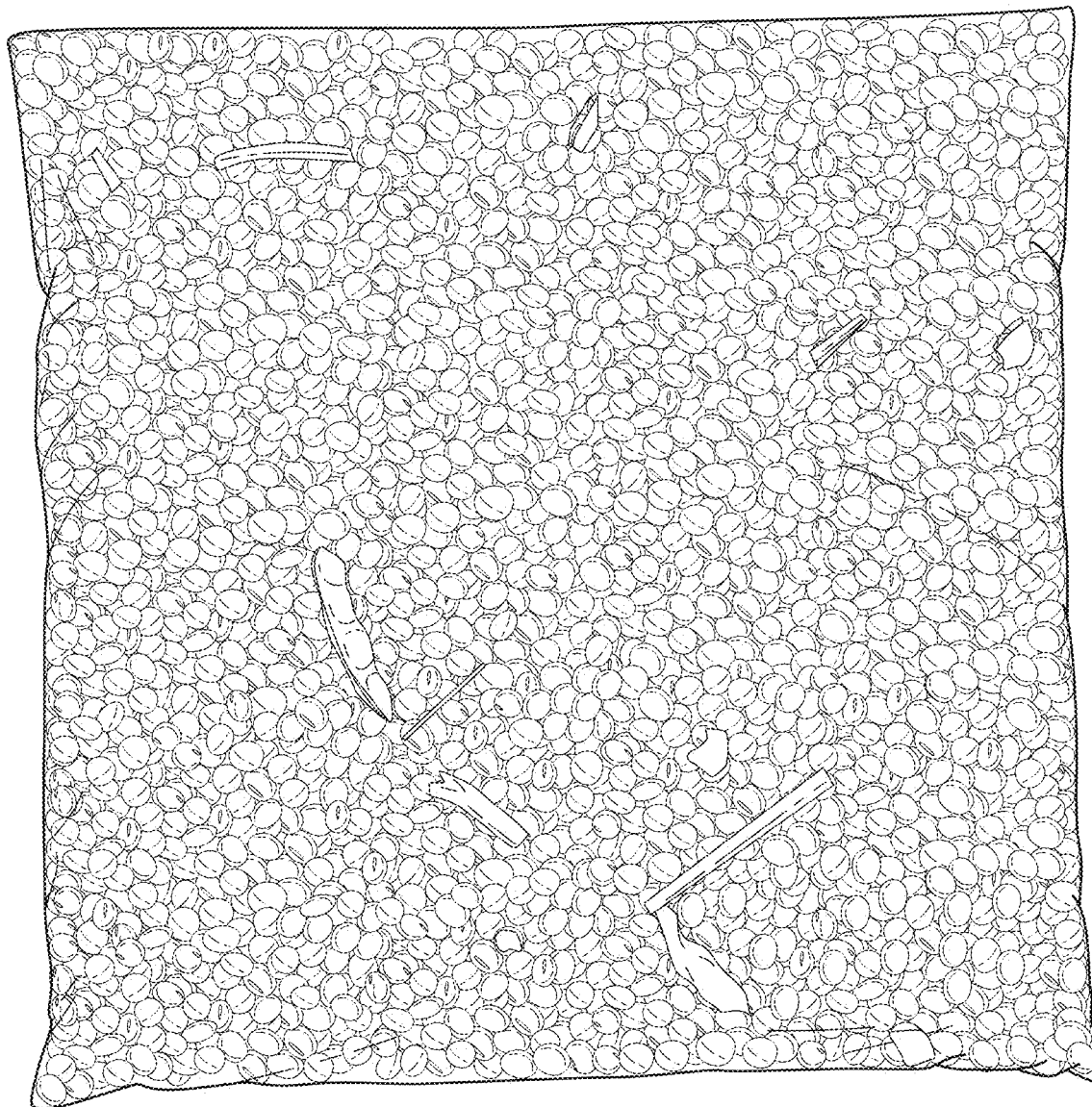
FIG. 46 shows the experimental results for the harvest of soybeans using the quarter wrap (QW) MOG limiter assemblies and/or quarter wrap (QW) cover plate assemblies described above.

FIGS. 43-45 show a right-side quarter wrap (QW) MOG limiter assembly 1200. The right-side quarter wrap (QW) MOG limiter assembly 1200 includes a right-side quarter wrap MOG limiting rail 1201, a right-side MOG limiting rub bar 1202, a right-side ML over-center handle anchor plate 1203, a J bolt 1204, a 0.3125 inch 18-thread long-steel coupling nut 1205, a 0.25 inch 18-thread long hex head screw 1206, a 0.25 inch 18-thread nylon insert lock nut 1207, a 0.25 inch steel washer 1208, a CMF over-center handle 1209.

The QW wrap MOG limiter assemblies 1100, 1200 can reduce the size of the openings between bars between 30% and 50%, more preferably between 35% and 45%, and most preferably, by approximately 42%. This limits the flow of excessive MOG leaving the rotor chamber and falling into the auger bed. Because the auger bed now contains a higher percentage of grain and a lower amount of MOG, less air will be required to separate the MOG from the grain on the top sieve. Consistent results in all soybean harvesting moisture and field conditions with lower sieve loss. Ultimately, fewer soybeans are walked out the back of the combine as sieve loss.

The QW wrap MOG limiter assemblies 1100, 1200 match a custom plate built into the mid-point of the concave's arc which allows for a one man install. The QW wrap MOG limiter assemblies 1100, 1200 are easily installed midday to harvest soybeans and can later be removed quickly for a switch back to corn. The modified concaves 500, 600, 700, 800 address the needs of busy farmers who need proof of performance in hundreds of hours of lab and field testing. After installing the QW wrap MOG limiter assemblies 1100, 1200, a cleaner sample and lower sieve loss is achieved when harvesting soybeans and small grains.

FIGS. 47A-49B show variations of an over-center latch assembly 1300, 1400 which may each be categorized into right over-center latch assemblies 1300R, 1400R and left over-center latch assemblies 1300L, 1400L. The over-center latch assembly 1300, 1400 includes a base plate 1301, 1401, a handle 1302, 1402, a lock hole 1303, 1403, a lever 1304, 1404, a loop 1305, 1405, a center pin 1306, 1406, a center pin 1307, 1407, a slot 1308, 1408, holes 1309, 1409, nylon threaded locknuts 1310, 1410, a subbase 1311, 1411, and a locking mechanism 1412.

To assemble the over-center latch assembly 1300, 1400, the base plate 1301, 1401 acts as a base to which the subbase 1311, 1411 may attach to via the holes 1309, 1409. The holes 1309, 1409 may be threaded so as to receive screws, threaded rods, etc. to insert into the subbase 1311, 1411. Additionally, the base plate 1301, 1401 may be attached to the subbase 1311, 1411 via weld such as via plug weld through the holes 1309, 1409 to fasten to the subbase 1311, 1411. Alternatively, the subbase 1311, 1411 may be entirely removed such that components of the over-center latch assembly 1300, 1400 extend from the base plate 1301, 1401 itself.

The subbase 1311, 1411 includes cars 1307, 1407 that extend therefrom for attaching to the handle 1302, 1402. Additionally, the subbase 1311, 1411 includes the lock hole 1303, 1403 extending away from the subbase 1311, 1411 in generally a same direction as the cars 1307, 1407. The cars 1307, 1407 and the locking hole 1303, 1403 are configured to extend from the subbase 1311, 1411 in such a way that the handle 1302, 1402 may pivotably attach at two or more of the cars 1307, 1407 acting as a fulcrum for the handle 1302, 1402 and wherein the locking hole 1303, 1403 extends past the handle when a distal end of the handle is positioned nearest the base plate 1301, 1401 so as to be capable of receiving the locking mechanism 1412 through the locking hole 1303, 1403 in such a way that it retains the distal end of the handle 1302, 1402 adjacent the base plate 1301, 1401 (note that the over-latch assembly 1300 may also include the locking mechanism 1412 even though one is not shown in the figures). As mentioned above, the subbase 1311, 1411 may be removed in its entirety, in which case the cars 1307, 1407 and the locking hole 1303, 1403 would extend directly from the base plate 1301, 1401.

As mentioned above, the handle 1302, 1402 connects at its base to the cars 1307, 1407 and as such forms a pivotable connection at the cars 1307, 1407. A connection joint can be seen in FIGS. 48A-50C in which a fastener extends through both the cars 1407 and the handle 1402 which can especially be seen in FIG. 50A. This connection joint is not shown in FIGS. 47A-47B with the over-center latch assembly 1300 such that apertures within the cars 1307 and the handle 1302 can be seen. As understood by those of ordinary skill in the art, this does not preclude the over-latch assembly 1300 from including the connection joint shown in FIGS. 48A-50C to extend through the cars 1307 and the handle 1302. Moreover, the handle 1302, 1402 includes an angled distal end to assist with unlocking the over-center latch assembly when grabbing the distal end of the handle 1302, 1402.

The handle 1302, 1402 includes a connection section for the center pin 1306, 1406 to attach to. The connection section is positioned on the handle 1302, 1402 at a point between the fulcrum of the handle 1302, 1402 (connecting to the cars 1307, 1407) and the distal end of the handle 1302, 1402. The center pin 1306, 1406 is secured at the connection section so as to be in rotational communication with the handle 1302, 1402 to act as a fulcrum for the lever 1304, 1404 and loop 1305, 1405. A base portion of the lever 1304, 1404 may extend through the center pin 1306, 1406 (be fixedly attached via weld, press-fit, etc., or be adjustably attached via threaded connection), wherein the lever 1304, 1404 extends from the center pin 1306, 1407 to include the loop 1305, 1405 at a distal end of the lever 1304, 1404. As will be described herein, the loop 1305, 1405 when assembled together with a concave will connect to the catches 1501, 1502, 1551, 1552, wherein the handle 1302, 1402 can be lifted away from the base plate 1301, 1401 to loosen a connection between the loop 1305, 1405 and the catches 1501, 1502, 1551, 1552, or the handle 1302, 1402 can be rotated towards the base plate 1301, 1401 so as to tighten a connection and/or lock the over-center latch assembly 1300, 1400 to the catches 1501, 1502, 1551, 1552.

Should the over-center latch assembly 1300, 1400 include a threaded connection on the lever 1304, 1404 as shown in FIGS. 48A-50C, the over-center latch assembly 1300, 1400 may include a locking nut with a nylon insert 1410 so as to increase a holding capacity of the locking nut to stay in place and not loosen or tighten due to vibrations of the combine when in use.

Further, the over-center latch assembly 1300, 1400 may include the locking mechanism 1412 which in FIGS. 48A-50C is shown as a linchpin. The linchpin is a strong holding mechanism which is given by way of example and not of limitation. Other such examples given by way of example and not of limitation include a padlock, a hairpin, a hitch pin, a spring clip, a snap ring, a wing nut assembly, etc.

FIGS. 50A-50D show an over-center latch 1450 without being attached to the base plate 1300, 1400. It is worth noting that the over-center latch 1450 uses the same numbers as those shown in FIGS. 48A-49B because they are the same components shown in those figures. However, unlike the variations shown in FIGS. 48A-49B, the over-center latch 1450 shown in FIGS. 50A-50D does not include any numbering including an "R" or an "L" at the end thereof. Throughout FIGS. 48A-65, numbering that includes the "R" indicates that the specific element being called out is side-specific to being placed on a right side of the concave when being placed on the concave. Similarly, numbering that includes the "L" indicates that the specific element being called out is side-specific to being placed on a left side of the concave when being placed on the concave. This is not limiting as to "R" must always be on a right side of the concave (or "L" always being on the left), rather this identifying of components is for simplification of understanding how the elements fit together during assembly and instead signifies that the "R" components go on a same side as one another and the "L" components go on a same side as one another, which for simplification purposes can be identified as right and left sides of the concave as described throughout this disclosure. Thus, the over-center latch 1450 does not includes any elements that are side-specific and can be used on either side on the concave depending on which base plate 1301R, 1301L, 1401R, 1401L the over-center latch 1450 is placed.

Figure 49A:
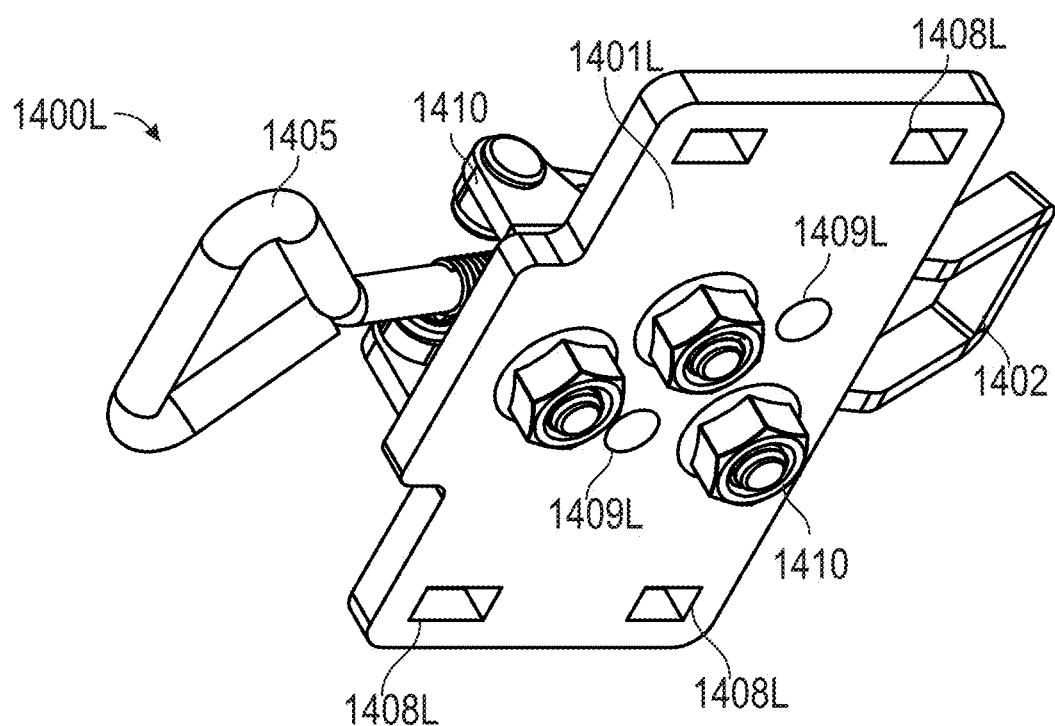
FIG. 49A shows a perspective view of an over-center latch assembly with rectangular base for a left-side MOG limiter or cover plate, according to some aspects of the present disclosure.
Figure 49B:
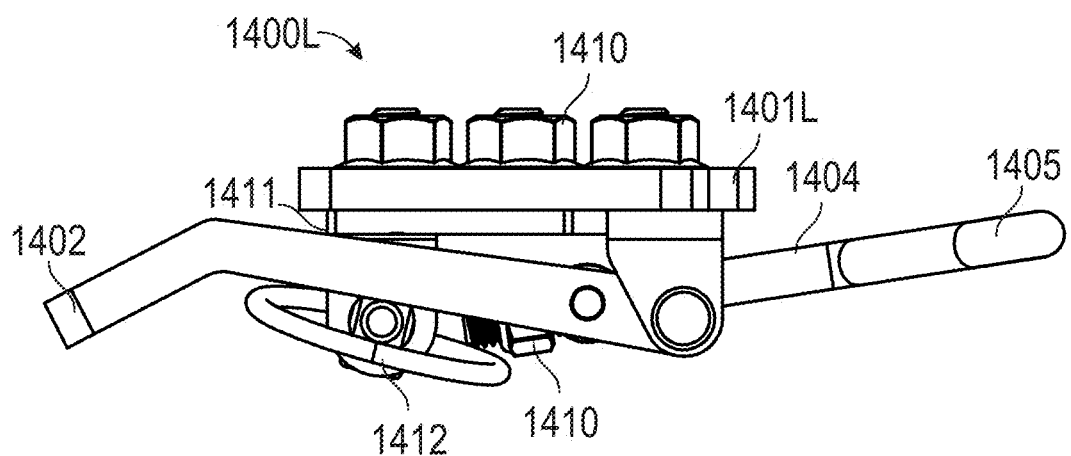
FIG. 49B shows a side elevation view of the over-center latch assembly of FIG. 49A
Figure 56A:
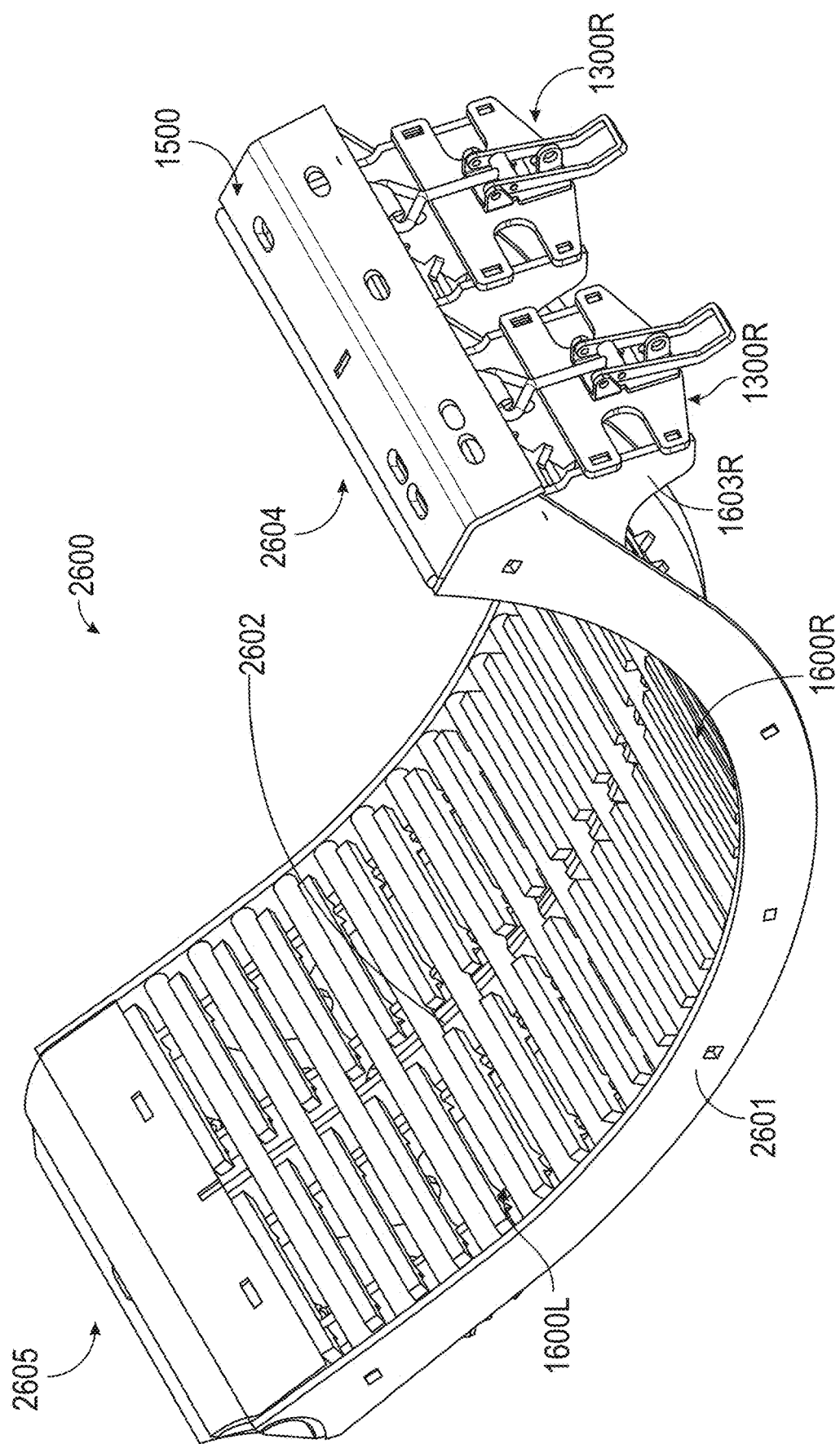
FIG. 56A shows a first perspective view of over-center latch assemblies securing two pairs of left-side and right-side MOG limiter assemblies to a concave.
Figure 56B:
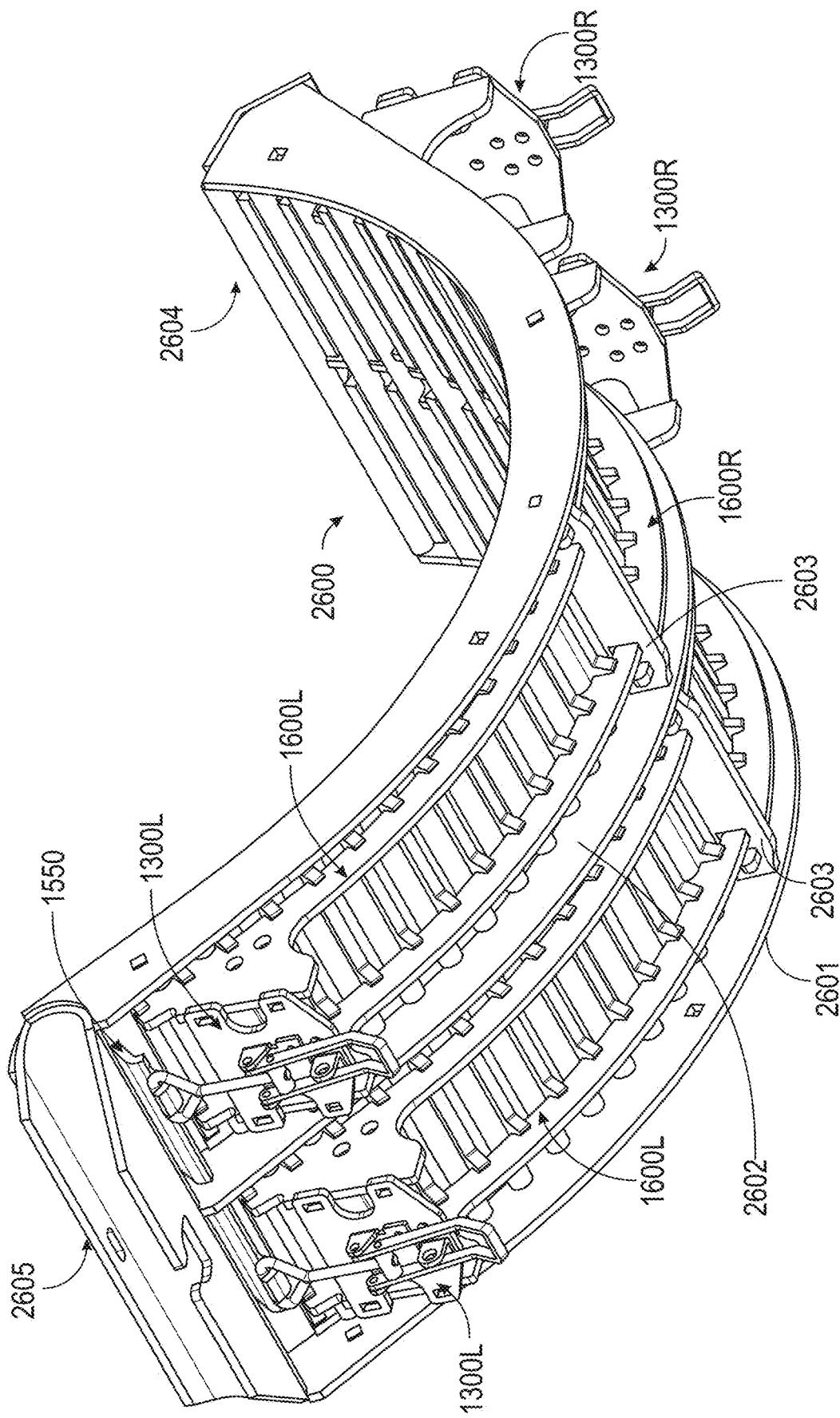
FIG. 56B shows a second perspective view thereof.

Further, as shown in the FIGS. 47A-49B, the over-center latch assembly 1300 does not include "R" or "L" designations while the over-center latch assembly 1400 docs. As can be seen in later figures, (e.g., FIGS. 56A, 56B, 57A, and 57B make this abundantly clear), the "R" designations include the over-center latch assemblies that go on a right side of a concave, the MOG limiter assemblies that go on the right side of the concave, and include railings along the MOG limiter that are wider apart from one another than the MOG limiter assemblies that go on a left side of the concave which include an "L" designation. Thus, while FIGS. 48A-48B show the base plate 1401R and FIGS. 49A-49B show the base plate 1401L as different, in reality the only difference is that the base plate 1401R is wider than the base plate 1401L so as to accommodate the MOG limiter railings to which the base plates will be attached (which is most easily seen in FIG. 57C). As such, while FIGS. 47A-47B only include the base plate 1301, the only difference between the over-center latch assembly 1300R and the over-center latch assembly 1300L shown in FIGS. 56A-56B is that the base plate 1301R is wider than the base plate 1301L because the MOG limiter 1350L has railings that are narrower than the MOG limiter 1350R which each attach to the cross frame of the concave. As such, it should be readily understood that a particular shape of the base plate 1301R, 1301L, 1401R, 1401L need not be specifically a pentagonal shape, a square shape, or a rectangular shape, but can include any shape that allows for connecting the over-center latch 1450 to the railings of either the MOG limiter or the cover plate and can be (given by way of example and not of limitation) a circular shape, an oval, a triangle, a rhombus, a stadium, a X-shape, etc. The variations of the base plate shown in the figures are those chosen for either of manufacturing simplicity or weight-reduction while retaining strength. Given the intended use of the base plate for the given concave, other shapes may be preferable.

Furthermore, the over-center latch 1450 is shown separately from the base plates in FIGS. 50A-50D to emphasize what may alternate positions on the base plates 1301R, 1301L, 1401R, 1401L. Depending on how many holes 1309, 1409 exists on the base plates 1301R, 1301L, 1401R, 1401L the over-center latch 1450 may be positioned on either of a first end of the over-center latch assembly 1300, 1400, or a second end, or anywhere therebetween. Moreover as previously explained the over-center latch 1450 may have the subbase 1311, 1411 removed entirely such that elements of the over-center latch 1450 extend directly from the base plate 1301, 1401. In the configurations shown in which the subbase 1311, 1411 is included, This allows for simplicity in replacement of parts after wear or damage of the base plate 1301, 1401. In this regard, the over-center latch 1450 may be removed and placed on a new base plate with ease.

Figure 52A:
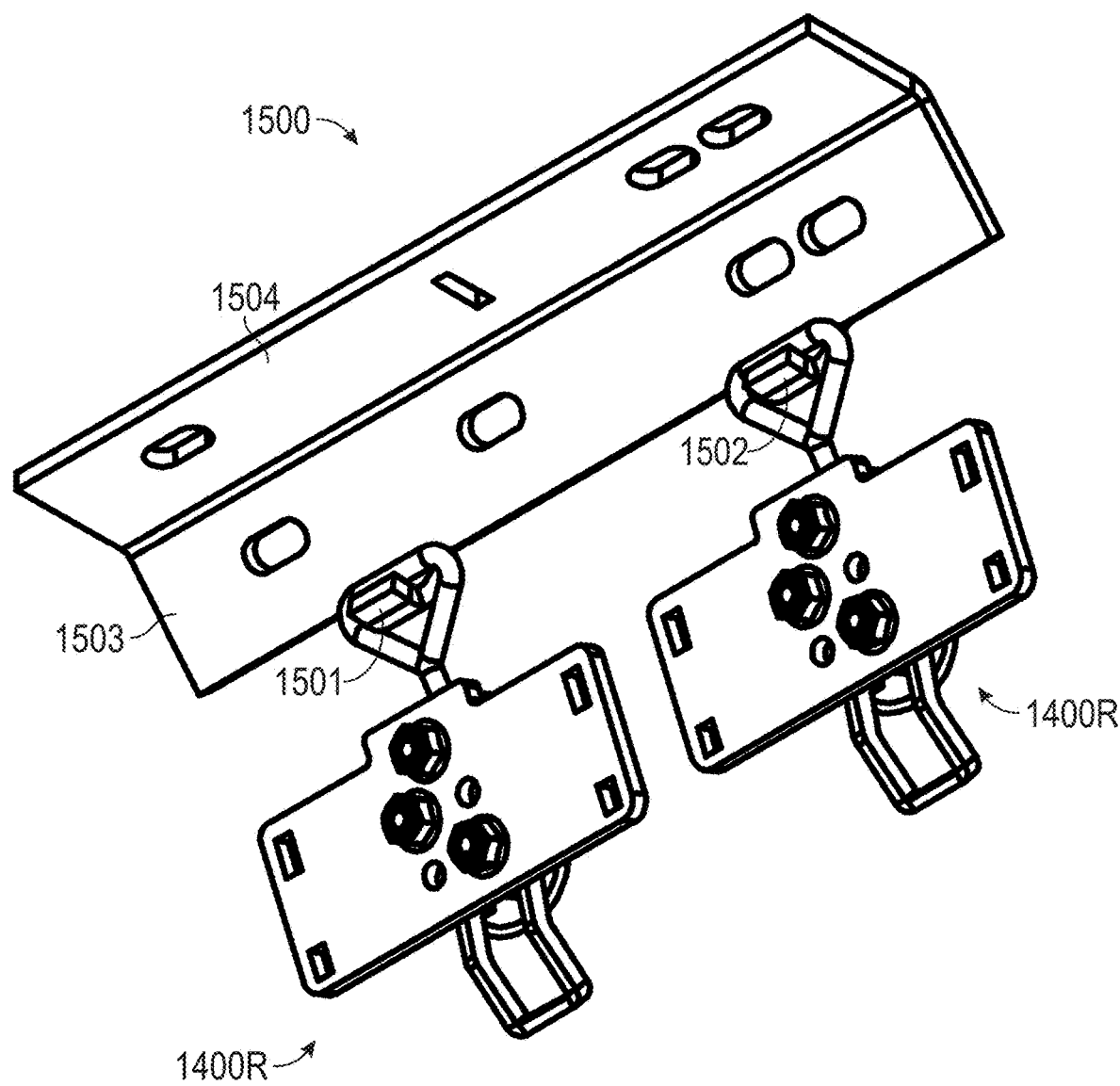
FIG. 52A shows a first perspective view of an attaching assembly for securing the over-center latch assemblies to concave(s) including the over-center latch assembly of FIG. 48A.
Figure 52B:
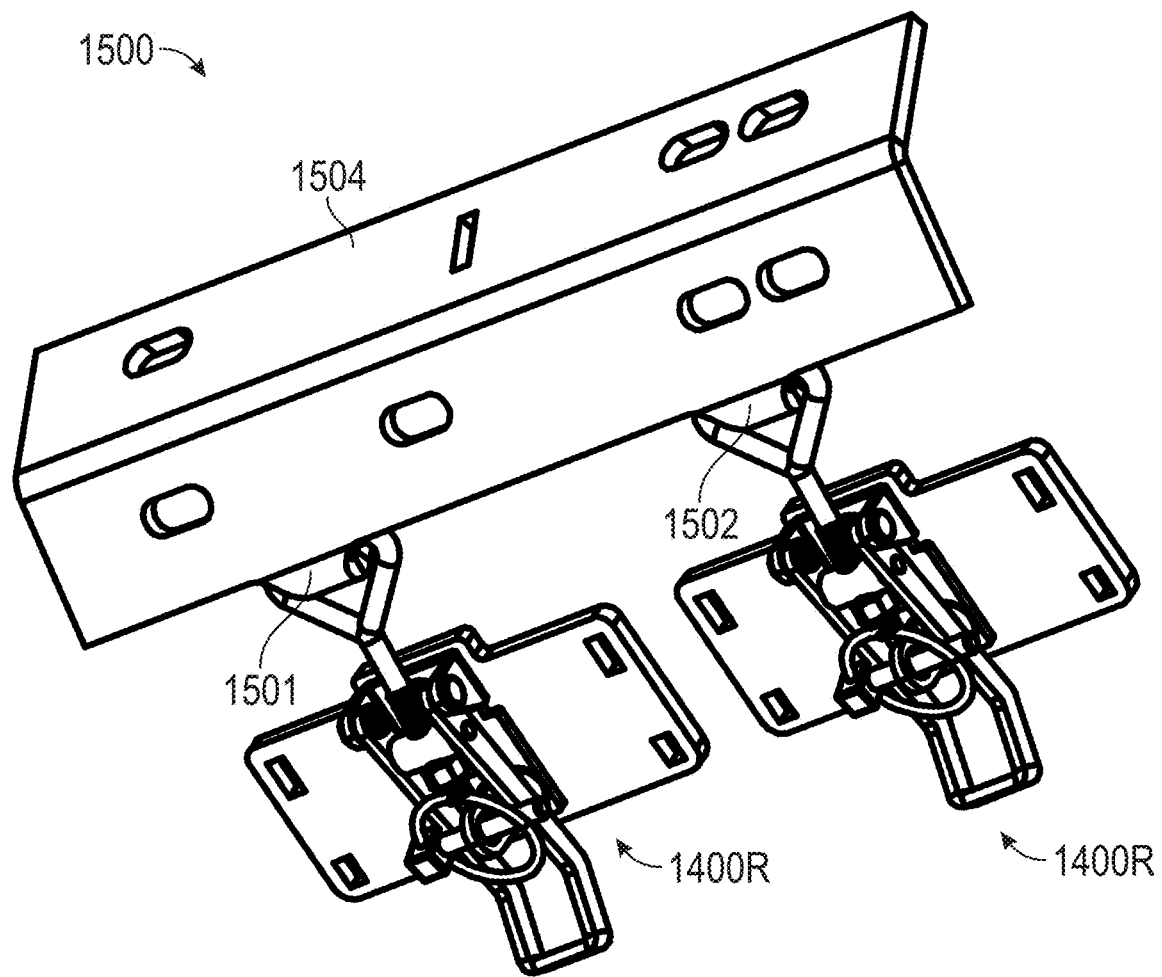
FIG. 52B shows a second perspective view of the assembly of FIG. 52A.

FIGS. 51A-52B show the first mounting assembly 1500 and the second mounting assembly 1550 connecting to various over-center latch assemblies 1300R, 1300L, 1400R. In particular, FIGS. 51A and 52A each show a front view of the first mounting assembly 1500 while FIG. 52B shows a back view of the first mounting assembly 1500, and FIG. 51B shows the second mounting assembly 1550. The first mounting assembly 1500 includes a first catch 1501, a second catch 1502, an adjacent plate 1503, and an end plate 1504. The second mounting assembly 1550 includes a first catch 1551, a second catch 1552, and an end plate 1554. As can be seen in later figures (e.g., FIGS. 56A-57C), the first mounting assembly 1500 is attached to a right end of the concave, and the second mounting assembly 1550 is attached to a left end of the concave. The first mounting assembly 1500 and the second mounting assembly 1550 are configured to provide a structure for the over-center latch assembly 1300, 1400 to secure itself to. Namely, extending from the end plates 1504, 1554 are the catches 1501, 1502, 1551, 1552 to which the loops 1305, 1405 attach. Once the loop 1305, 1405 is attached to the catch 1501, 1502, 1551, 1552, the handle 1302, 1402 may be pressed towards the base plate 1301, 1401 and the locking mechanism 1412 inserted into the locking hole 1303, 1403 so as to firmly hold the assembly together.

Figure 47A:
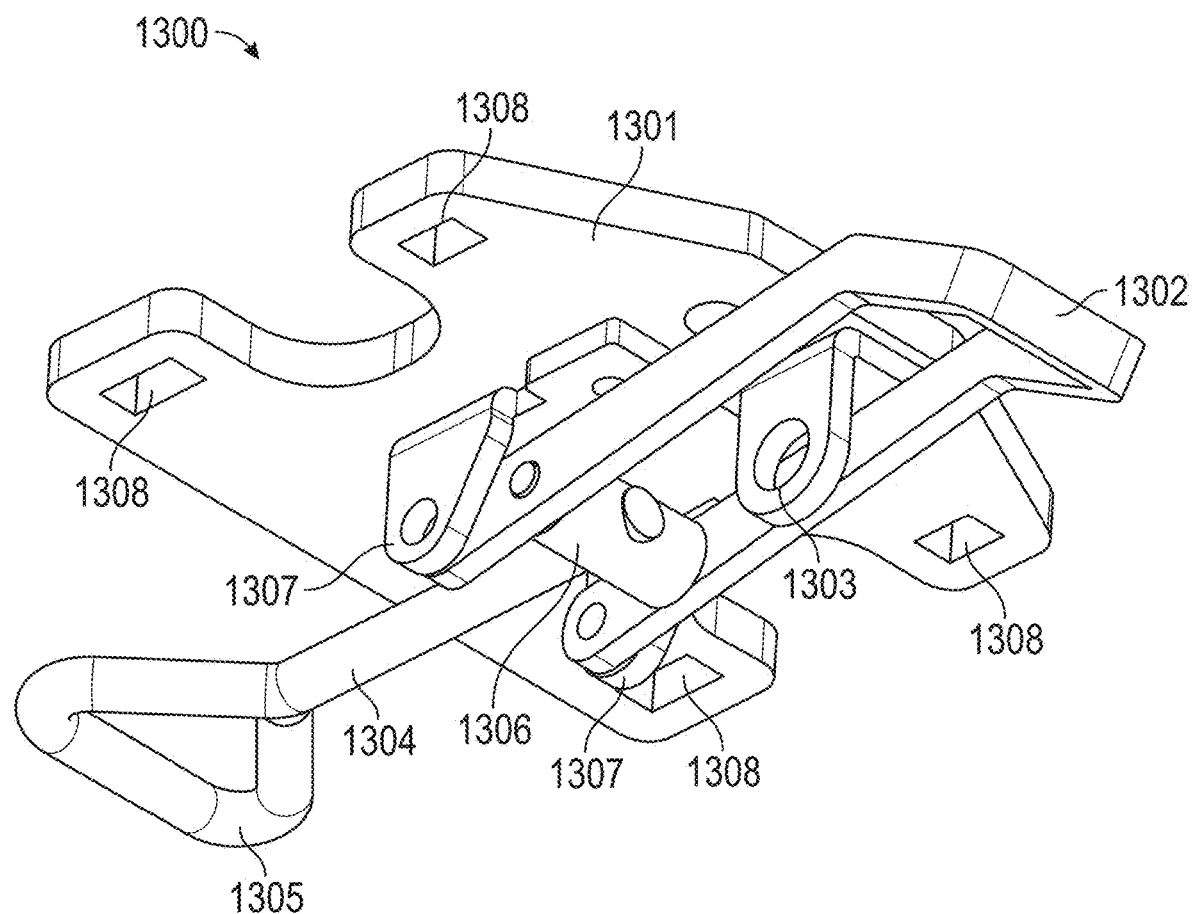
FIG. 47A shows a first perspective view over-center latch assembly with a pentagonal base, according to some aspects of the present disclosure.
Figure 47B:
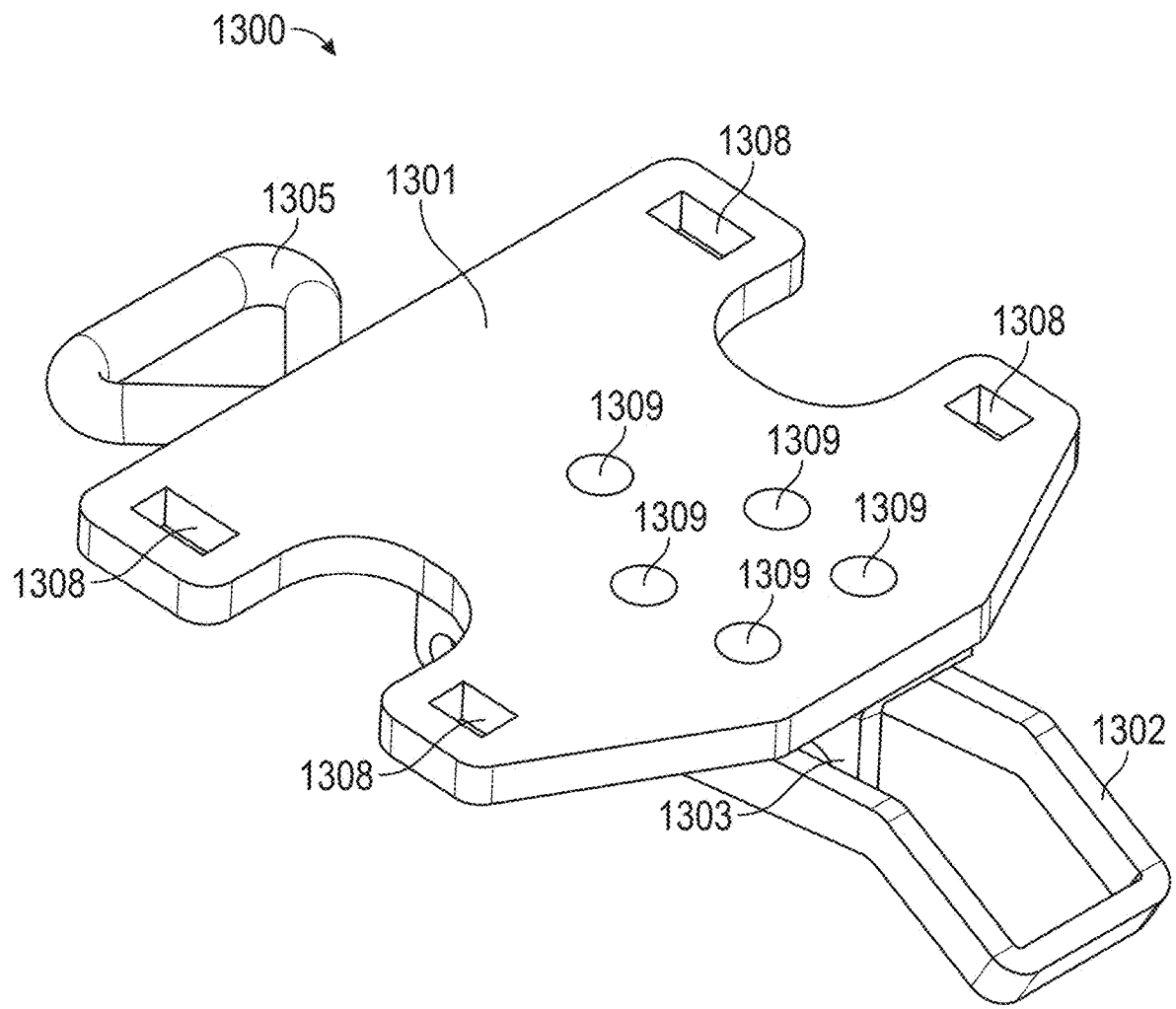
FIG. 47B shows a second perspective view of the over-center latch assembly of FIG. 47A.
Figure 48A:
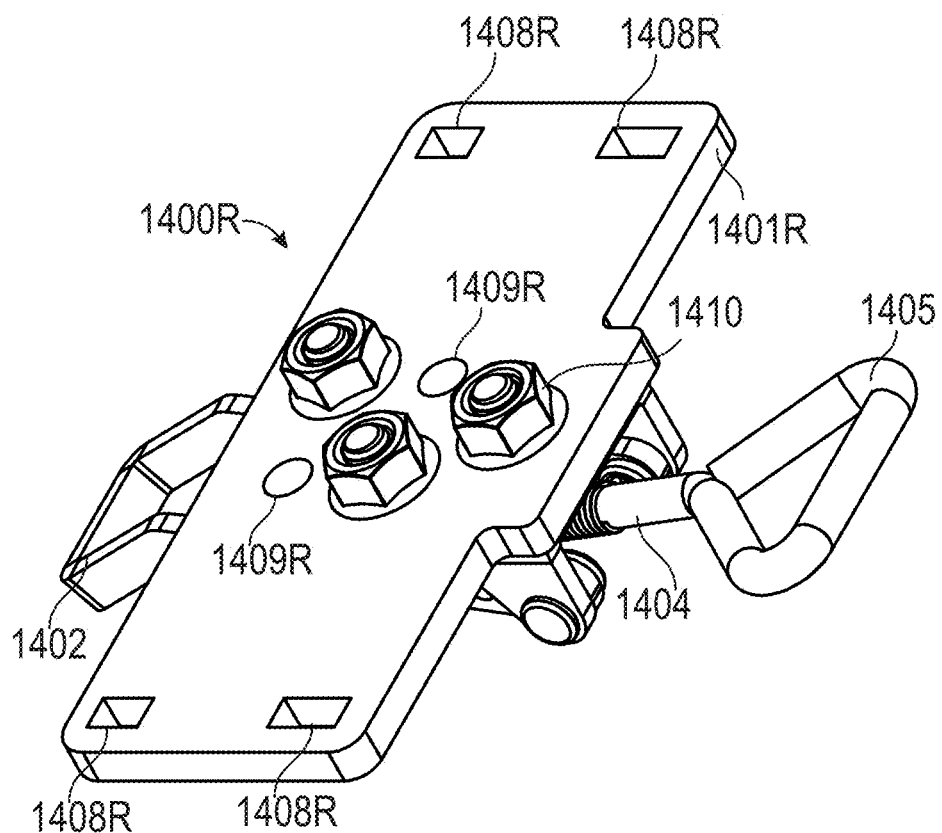
FIG. 48A shows a perspective view of an over-center latch assembly with rectangular base for a right-side MOG limiter or cover plate, according to some aspects of the present disclosure.
Figure 48B:
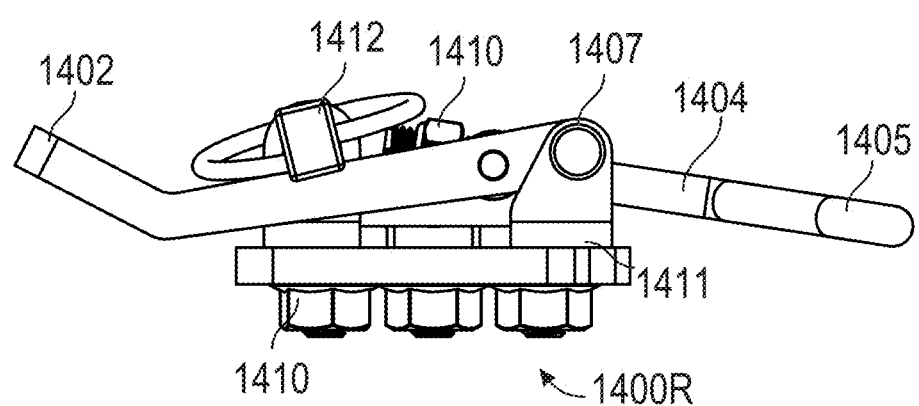
FIG. 48B shows a side elevation view of the over-center latch assembly of FIG. 48A.

As previously stated, FIGS. 47A-47B show an over-center latch assembly 1300 that can be used to help secure the left-side and right-side quarter wrap (QW) cover plate assemblies 900, 1000 (with extended mounting portions thereon to receive the over-center latch assembly 1300) and the QW wrap MOG limiter assemblies 1100, 1200 (with extended mounting portions thereon to receive the over-center latch assembly 1300) to the concaves/concave assemblies 101, 500, 600, 700, 800. The over-center latch assembly 1300 joins the MOG limiter and concave or the cover plate and the concave while allowing separation when unlocked. The over-center latch assembly 1300 engages another piece of hardware on another mounting surface, such as one or more of the first over-center catch 1501, second over-center catch 1502 (see, e.g., FIGS. 51A-51B), solid, extended mounting portion 1603R (see, e.g., FIG. 53A), solid, extended mounting portion 1703R (see, e.g., FIG. 58A), and solid, extended mounting portion 1703L (see, e.g., FIG. 58C). Depending on their design and type, catches 1501, 1502 may also be known as strikes.

The main components of the over-center latch assembly 1300 are the base plate 1301 with lever 1304 and attached loop 1305 and the handle 1302. Tension is created once the loop 1305 is hooked onto the catches 1501, 1502 of the mounting assembly 1500 when the lever 1304 and the handle 1302 are clamped down. Tension is released when the handle 1302 and/or the lever 1304 are pulled up into the vertical position.

Because agricultural applications can result in the latches being damaged, the base plate 1301 should be constructed from a material of sufficient strength, such as mild steel, zinc coated steel and stainless steel (good for corrosive environments). The material used will affect the latches strength and durability.

The over-center latch assembly 1300 includes the ability to be locked using a padlock, linchpin, or a safety catch etc. via the locking hole 1303. This will further prevent the over-center latch assembly 1300 from accidently opening during operation.

Figure 50A:
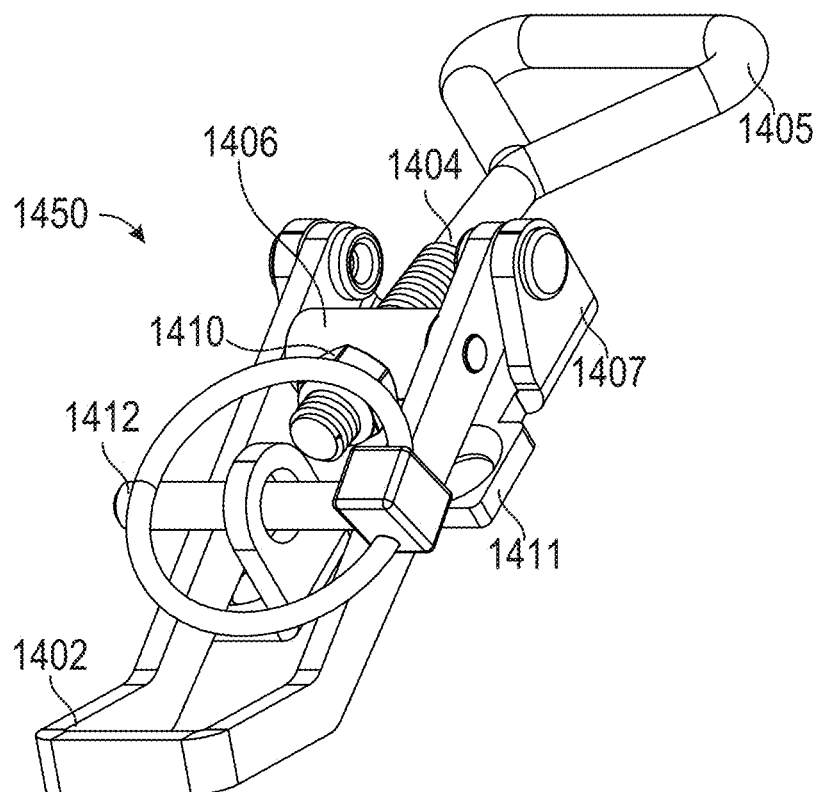
FIG. 50A shows a first perspective view of an over-center latch with a linchpin with an adjustable loop.
Figure 50B:
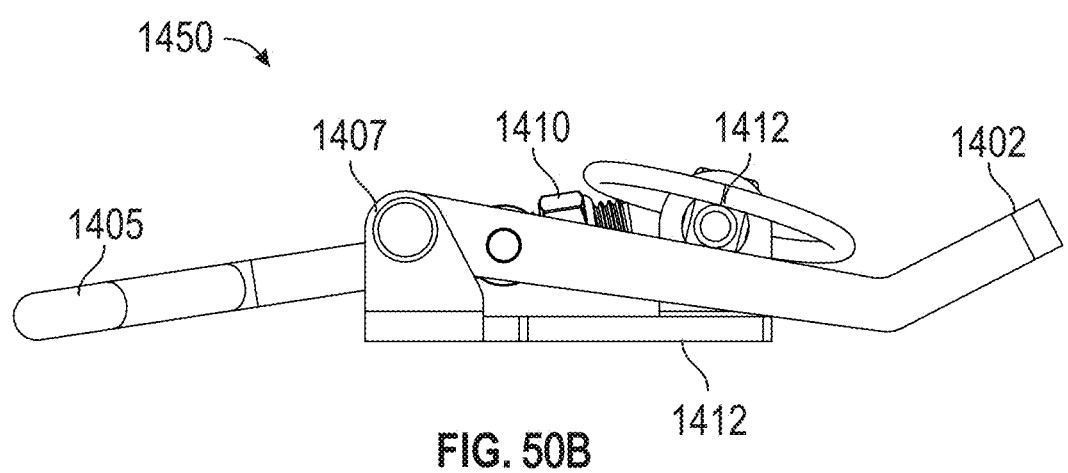
FIG. 50B shows a side elevation view of the over-center latch of FIG. 50A.
Figure 50C:
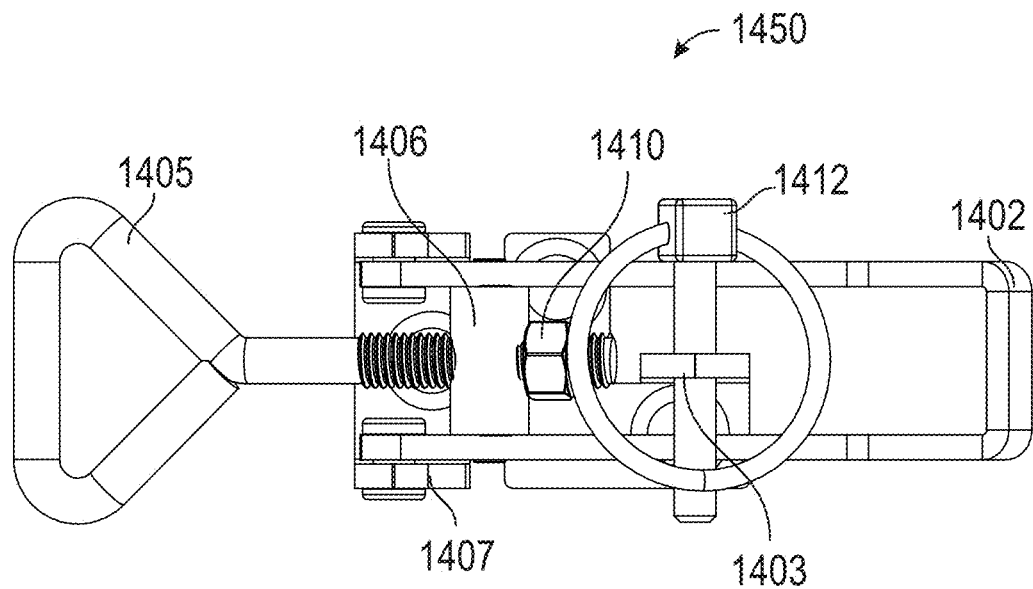
FIG. 50C shows a top plan view of the over-center latch of FIG. 50A.
Figure 50D:
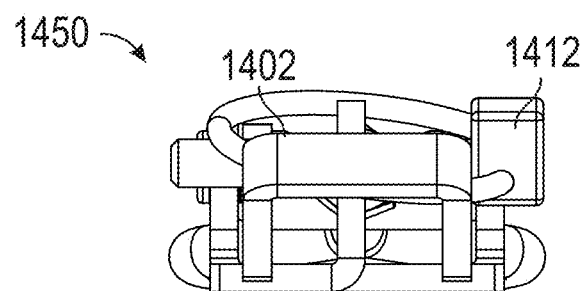
FIG. 50D shows a second side elevation view of the over-center latch of FIG. 50A.
Figure 51A:
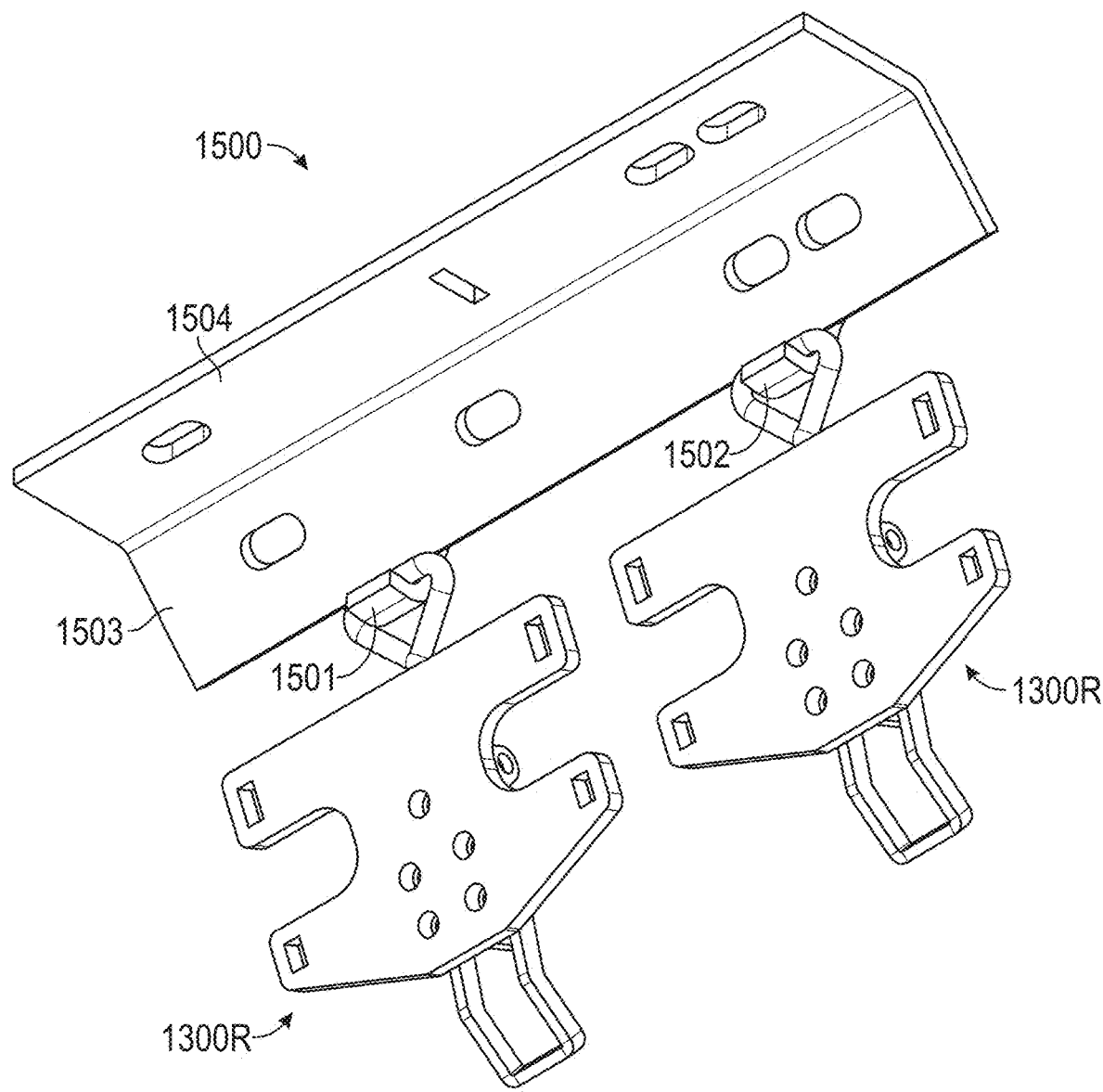
FIG. 51A shows a first perspective view of an attaching assembly for securing the over-center latch assemblies of FIG. 47A to concave(s).
Figure 51B:
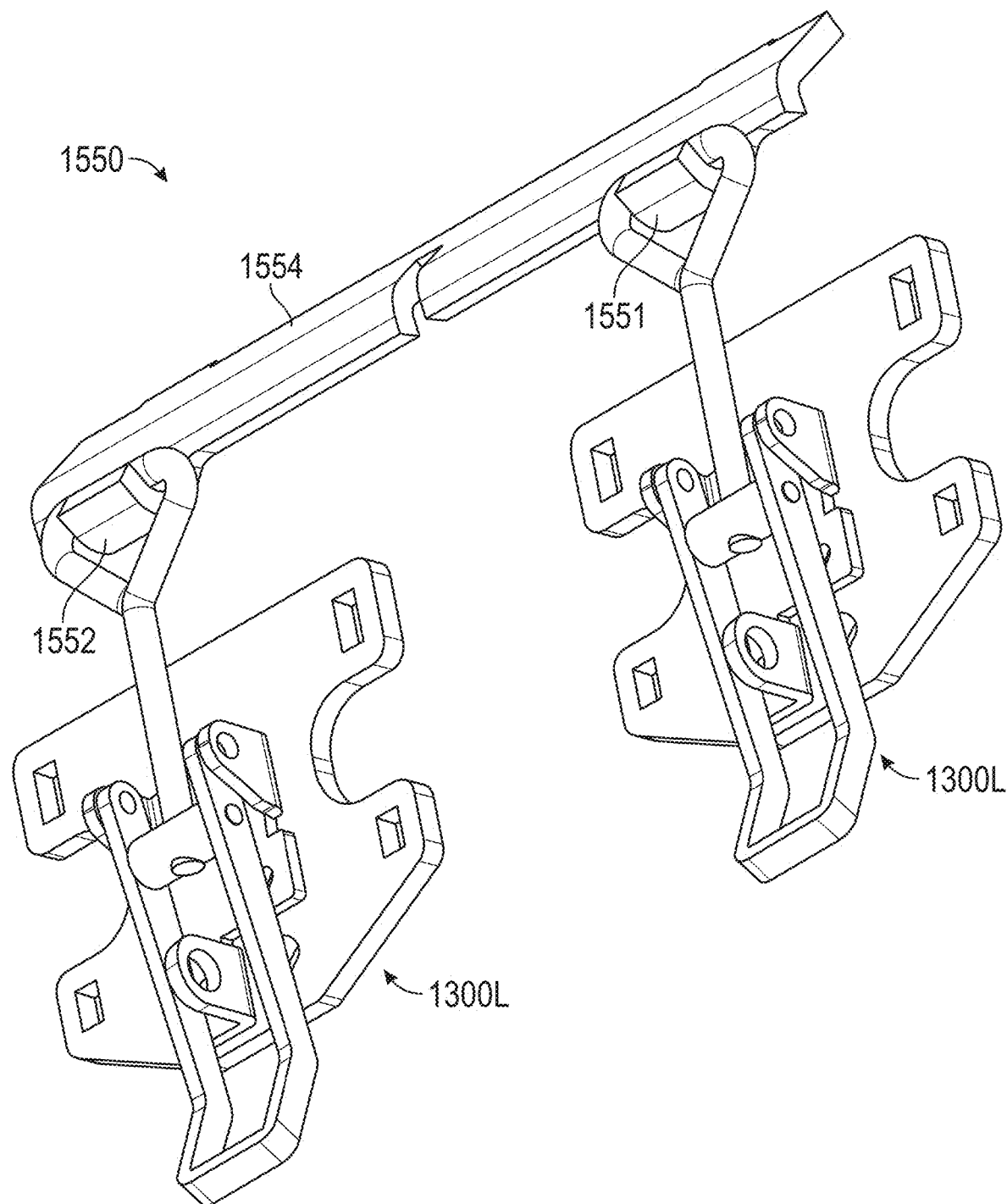
FIG. 51B shows a second perspective view of the attaching assembly of FIG. 51A.

The over-center latch assembly 1300 can be adjustable in length if a threaded screw is included in the lever 1304 (see, e.g., FIGS. 50A-50C). The threaded screw can be attached to the center pin 1306. A locking nut can be ensure the threaded screw remains securely in place with respect to the center pin 1306. For applications where the over-center latch assembly 1300 is likely to vibrate or be left in an unlocked position, a nylon friction ring can be added instead of a locking nut so that the screw loop will remain in its initial position.

The loop 1305 can be an eye loop, triangle screw loop, or a hinged triangle screw loop which can be used with a variety of different catch plates. Alternatively, instead of a loop 1305, it is to be appreciated that a T-screw, a bent T-screw, a canopy hook, clutch lever, flat hook screw, hook screw, rubber loop, or bend clamp could be utilized.

The center pin 1306 include a centrally located aperture, which allows for connection to the lever 1304. The cars 1307 extending outwardly from the base plate 1301 also include holes that allow for fasteners to be placed therethrough to form a pivoting point for the handle 1302. The cars 1307 may in the alternative extend from a subbase 1311 (as shown) instead of directly from the base plate 1301. In case of the cars 1307 extending from the subbase 1311, the subbase 1311 may include apertures to align with holes 1309 to attach thereto and secure the cars 1307 to the base plate 1301. The base plate 1301 may include a plurality of holes 1309 placed at varying distances along the base plate 1301 so as to allow for varying placement of the subbase 1311 (and thus the cars 1307) along the base plate 1301 so as to accommodate varying distances to the catches 1501, 1502.

The base plate 1301 can include slots 1308 to mount the base plate 1301 to a component of the left-side and right-side quarter wrap (QW) cover plate assemblies 900, 1000 and the QW wrap MOG limiter assemblies 1100, 1200 via a plug weld through the slot 1308. Alternatively, the slots 1308 may be circular in shape and be threaded internally so as to allow for threaded connection to the cover plates or MOG limiters.

As explained above, the base plate 1301 can include holes 1309 to attach to the subbase 1311, but further the holes 1309 may be included at varying positions along the base plate 1301 to help balance, distribute, or even reduce the weight of said base plate 1301.

Each of the concaves/concave assemblies 101, 500, 600, 700, 800 can be fitted with a mounting assembly 1500, which can include the first over-center catch 1501, second over-center catch 1502, adjacent plate 1503, and an end plate 1504. The adjacent plate 1503 and the end plate 1504 are offset an acute angle.

FIGS. 53A-55D show MOG limiter assemblies 1600R, 1600L, 1650R, 1650L (1600, 1650). The MOG limiter assemblies 1600, 1650 include rub bars 1601, 1651, rails 1602, 1652, extended mounting portions 1603R, 1603L, 1653R, 1653L, and hinge points 1604, 1654.

The MOG limiter assembly 1600, 1650 is formed by coupling two rails 1602, 1652 to another via a plurality of spaced rub bars 1601, 1651 attached therebetween. The rails 1602, 1652 are substantially parallel to one another, and the rub bars 1601, 1651 are substantially parallel to each other. As shown, the rails 1602, 1652 follow a substantially curvilinear path so as to conform to an outer side of a concave within a combine. Moreover, the plurality of rub bars 1601, 1651 are spaced from another such that they will fit in between axial bars of a concave. At a first end of the MOG limiter assembly 1600, 1650 is the hinge points 1604, 1654. Each of the hinge points 1604 (for the MOG limiter assembly 1600) and the hinge points 1654 (for the MOG limiter assembly 1650) form an end of the rails (1602 and 1652 respectively) by tapering off so as to be easily insertable into apertures within cross bars of a concave as can be seen in later figures (see, e.g., FIGS. 56B, 57C).

At an end opposite the hinges points 1654 are the extended mounting portions 1603R, 1603L, 1653R, 1653L. As shown, the extended mounting portions 1603R, 1603L, 1653R, 1653L can vary in shape, weight, and size, but are each configured to provide a mounting place for the over-center latch assemblies 1300R, 1300L, 1400R, 1400L. A surface of each of the extended mounting portions 1603R, 1603L, 1653R, 1653L to which the over-center latch assemblies 1300, 1400 attach is angled to allow for connection to catches on the concave in such a way that will provide tension of the MOG limiter assemblies 1600, 1650 against an underside of the concave. A preferred method of attaching the over-center latch assemblies 1300, 1400 to the extended mounting portions 1603R, 1603L, 1653R, 1653L is via plug weld in the slots 1308, 1408.

Figure 53B:
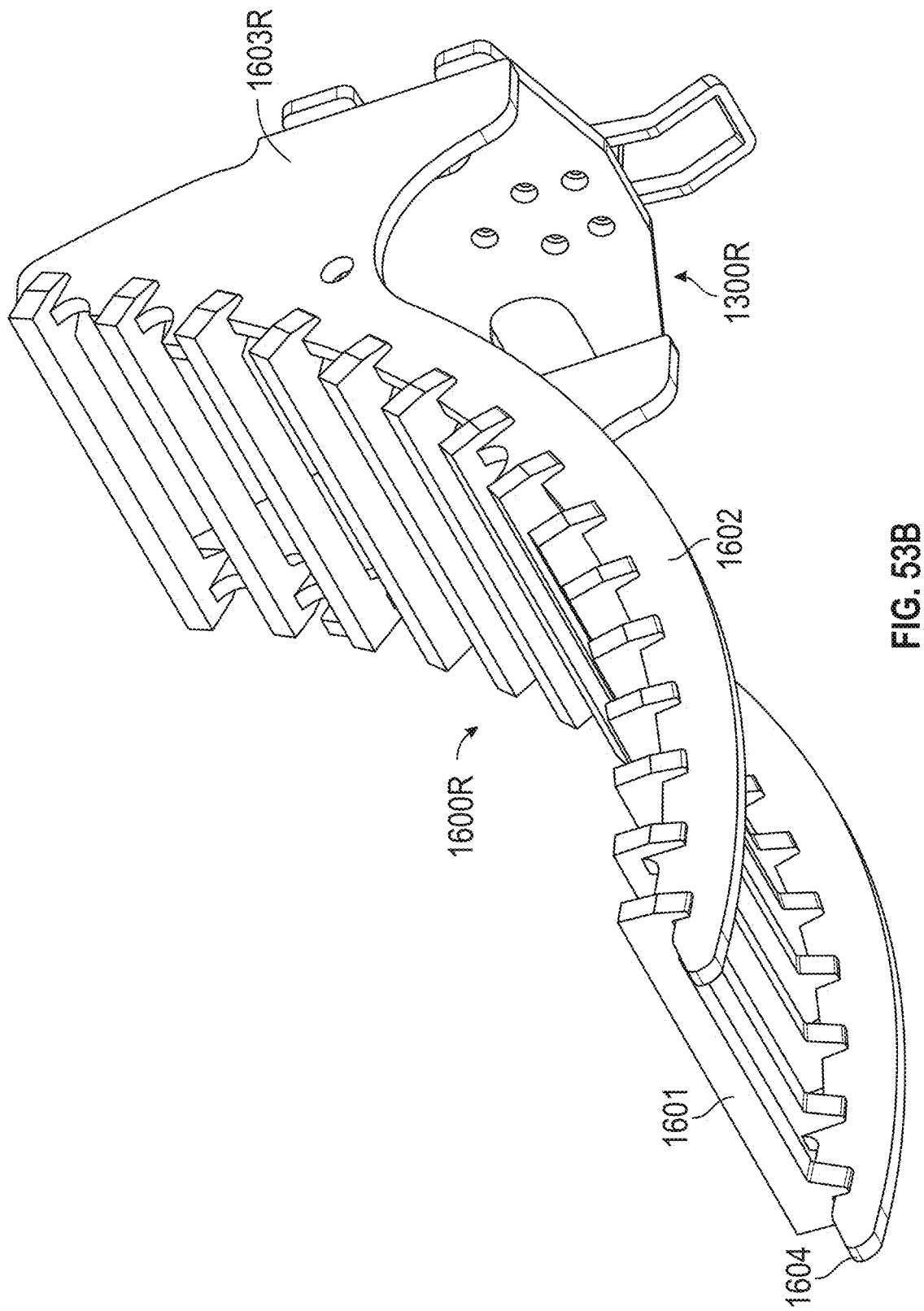
FIG. 53B shows a second perspective view thereof.

In a first example shown in FIGS. 53A-53B, a right-side quarter wrap (QW) MOG limiter assembly 1600R includes solid, extended mounting portions 1603R that extend from the rails 1602. The mounting portions 1603R each have an edge intended to align with the slots 1308 in each side of the base plate 1301 of the over-center latch assembly 1300.

Figure 53C:
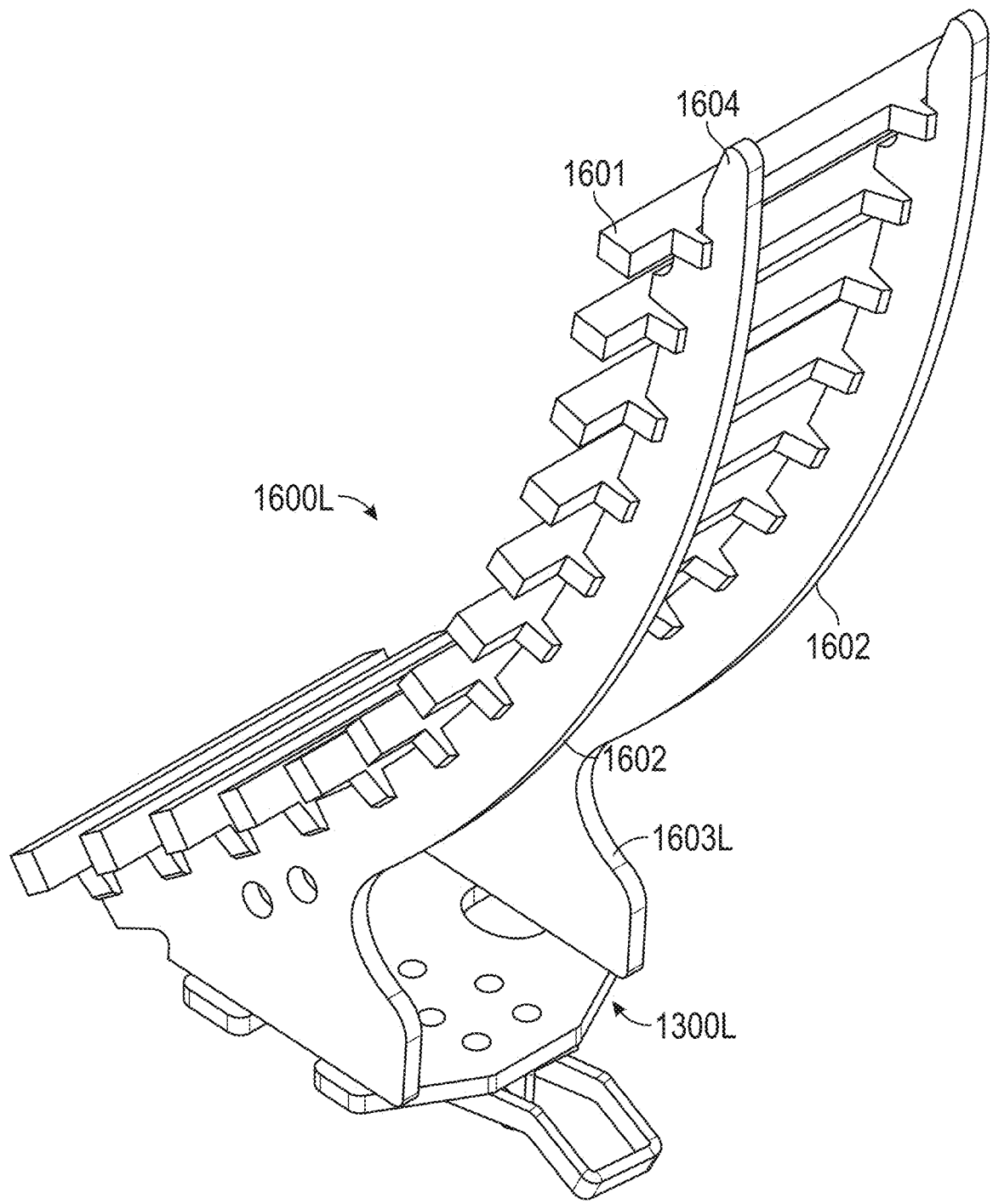
FIG. 53C shows a first perspective view of the over-center latch assembly of FIG. 47A mounted to a solid, extended mounting portion that is included in a left-side quarter wrap (QW) MOG limiter assembly.
Figure 53D:
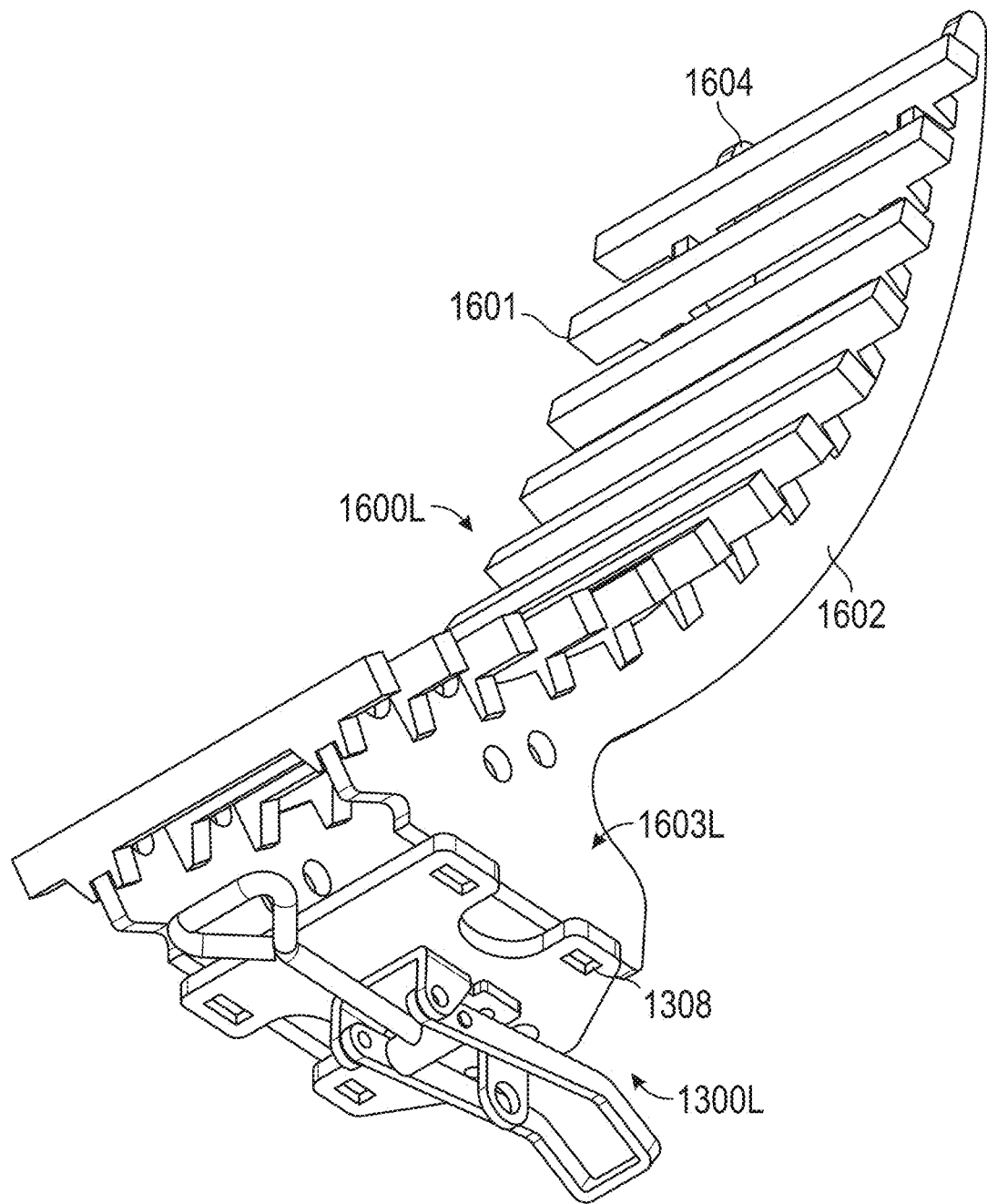
FIG. 53D shows a second perspective view thereof.
Figure 54A:
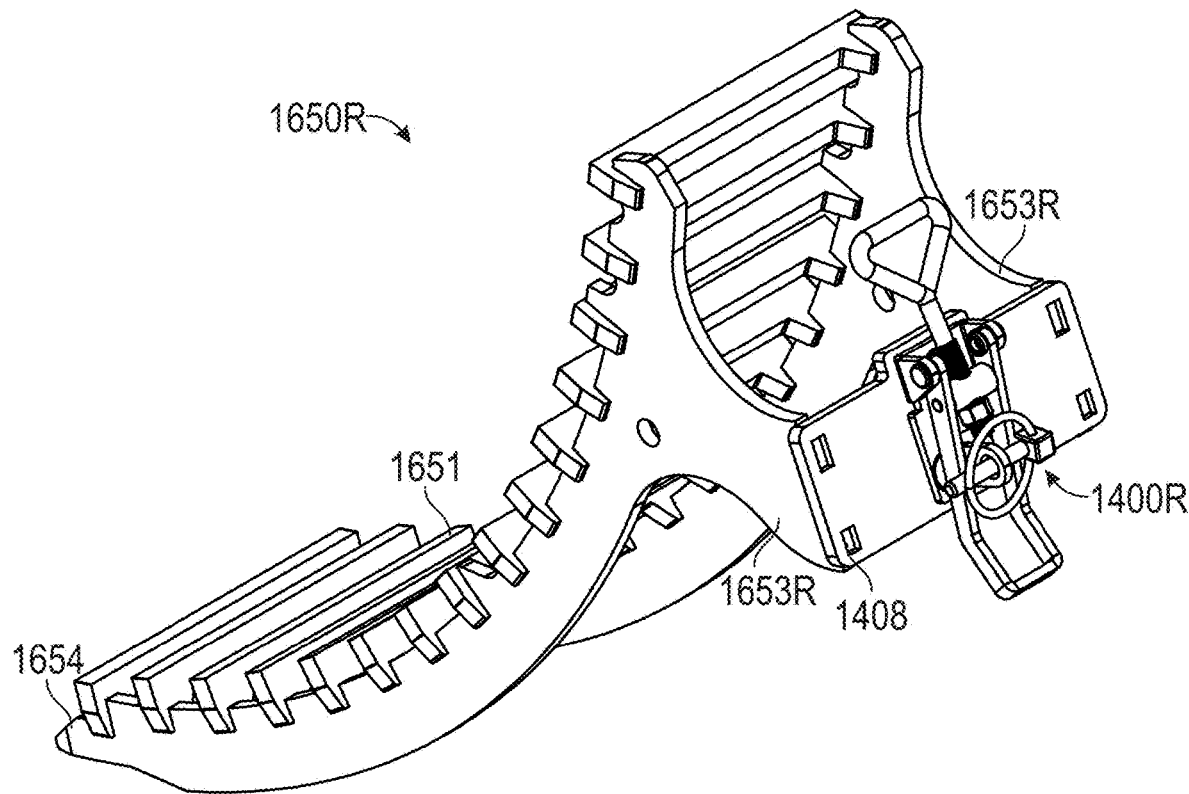
FIG. 54A shows a perspective view of a right-side MOG limiter including the over-center latch assembly of FIG. 48A.
Figure 54B:
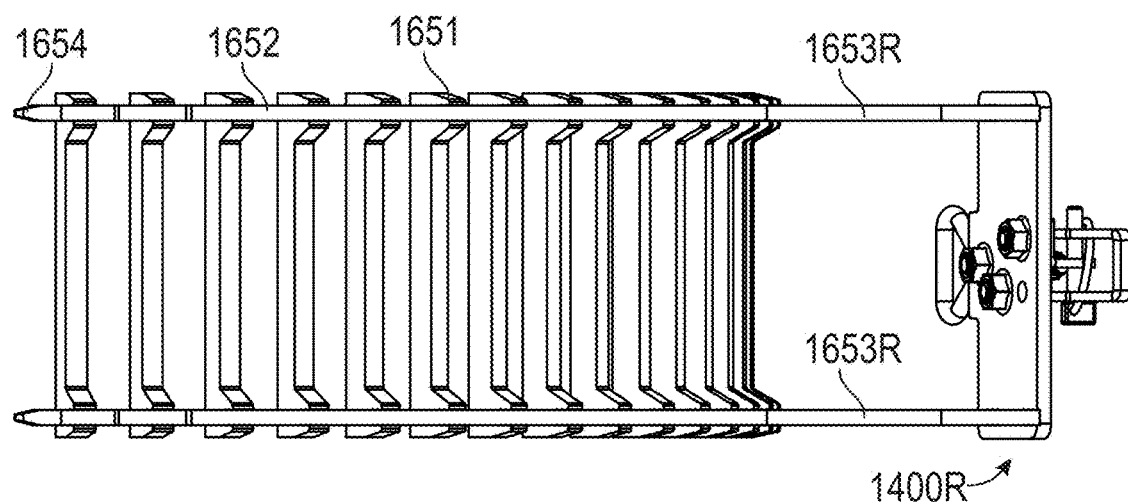
FIG. 54B shows a back elevation view of the MOG limiter of FIG. 54A.
Figure 54C:
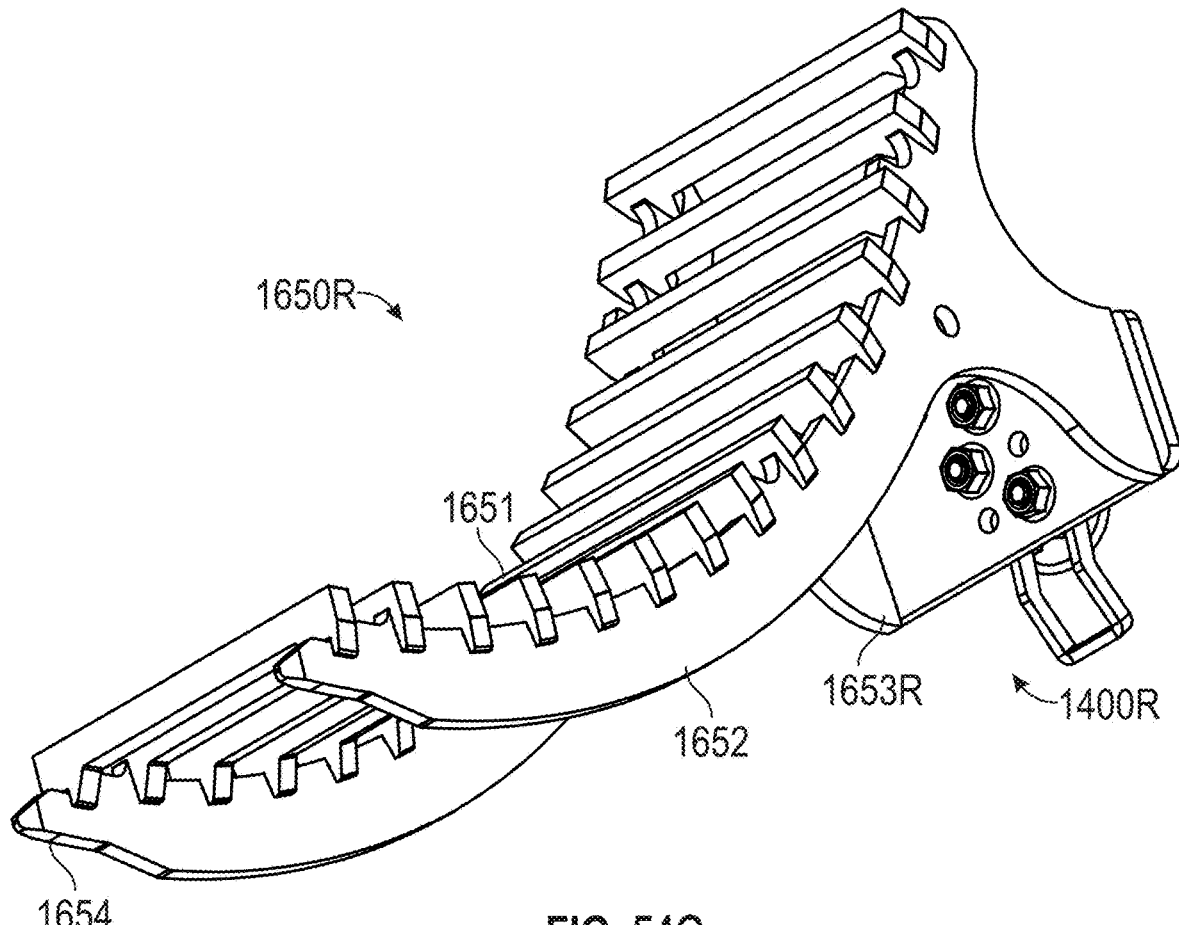
FIG. 54C shows an additional perspective view of the MOG limiter of FIG. 54A.
Figure 54D:
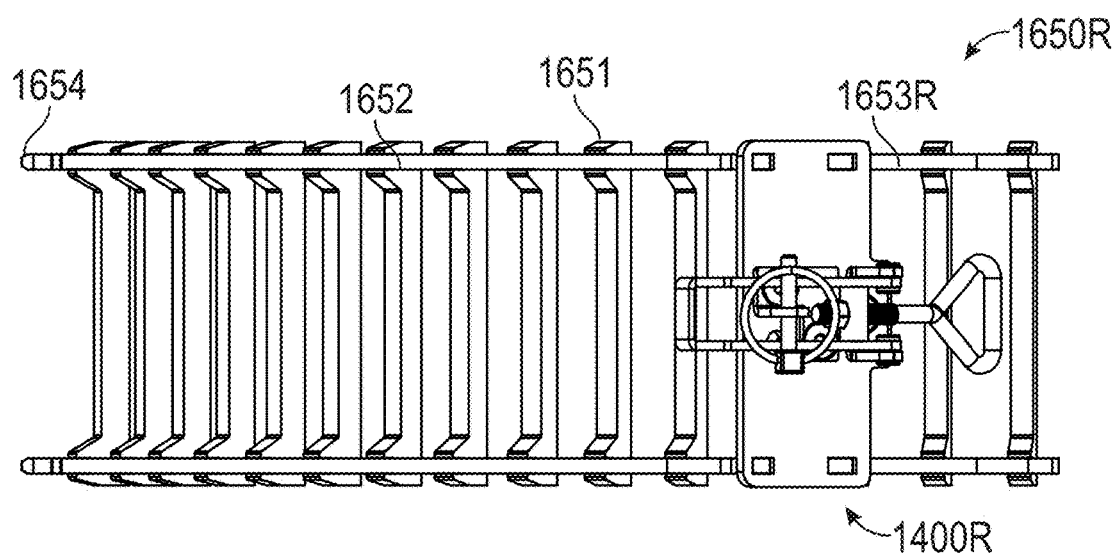
FIG. 54D shows a bottom plan view of the MOG limiter of FIG. 54A.
Figure 55A:
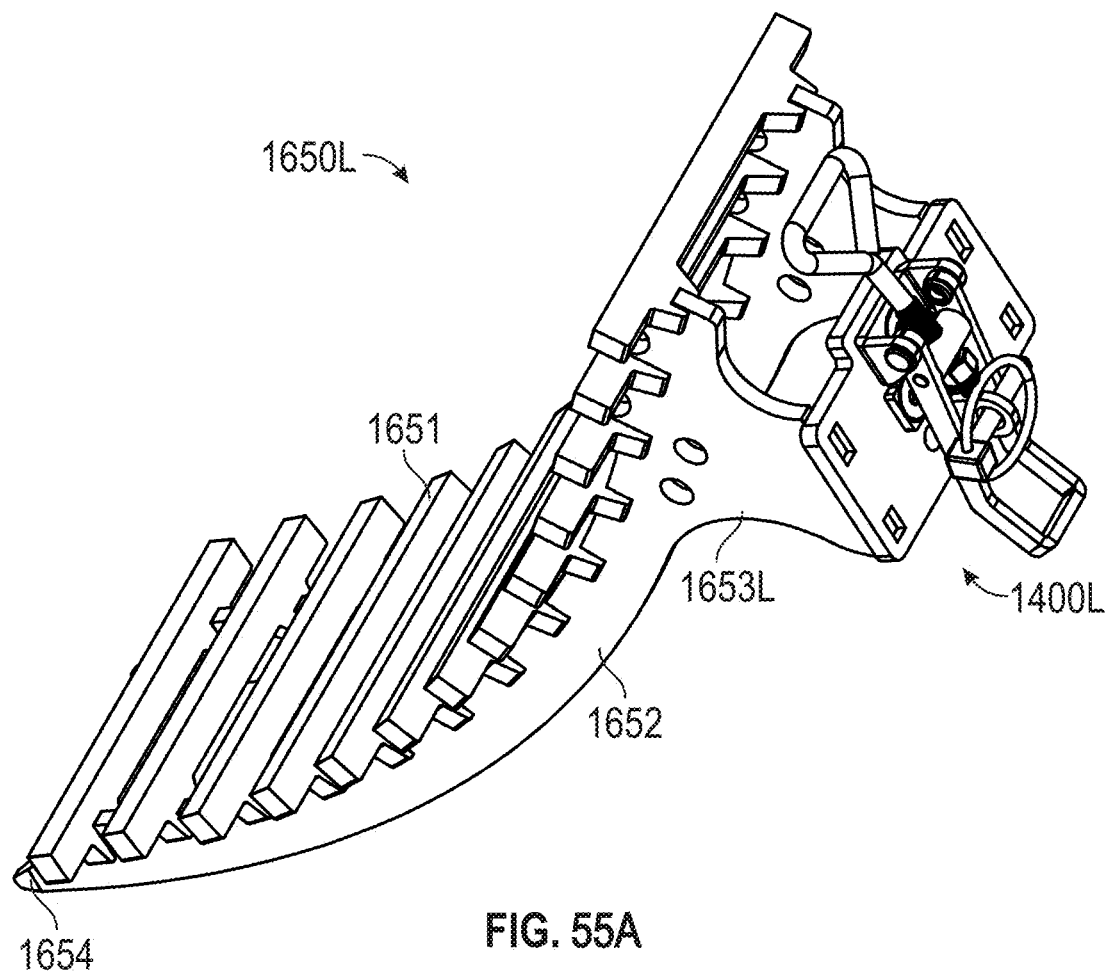
FIG. 55A shows a perspective view of a left-side MOG limiter including the over-center latch assembly of FIG. 49A.
Figure 55B:
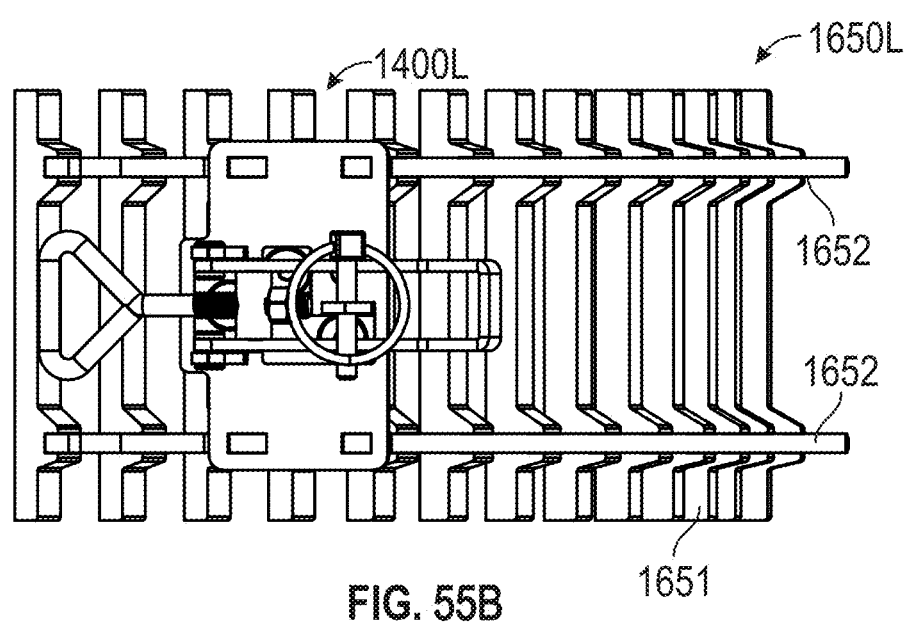
FIG. 55B shows a bottom view of the MOG limiter of FIG. 55A.
Figure 55C:
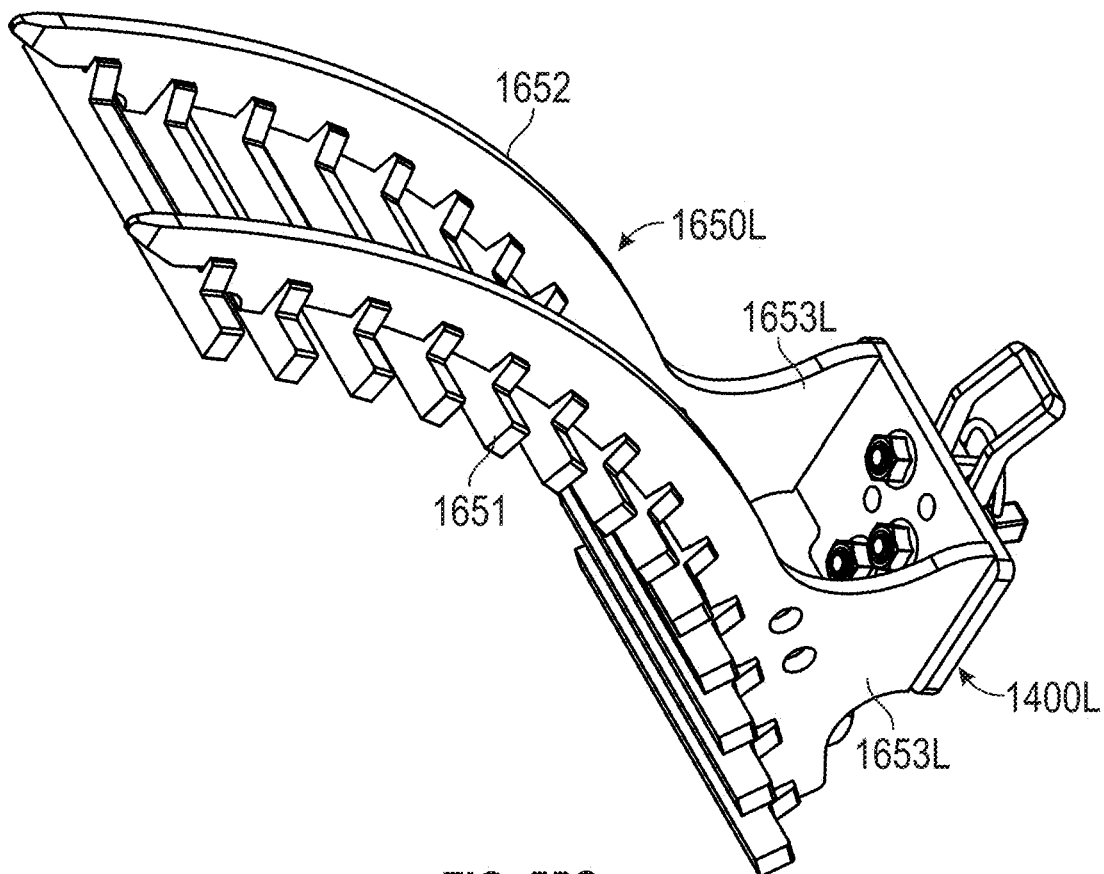
FIG. 55C shows an additional perspective view of the MOG limiter of FIG. 55A.
Figure 55D:
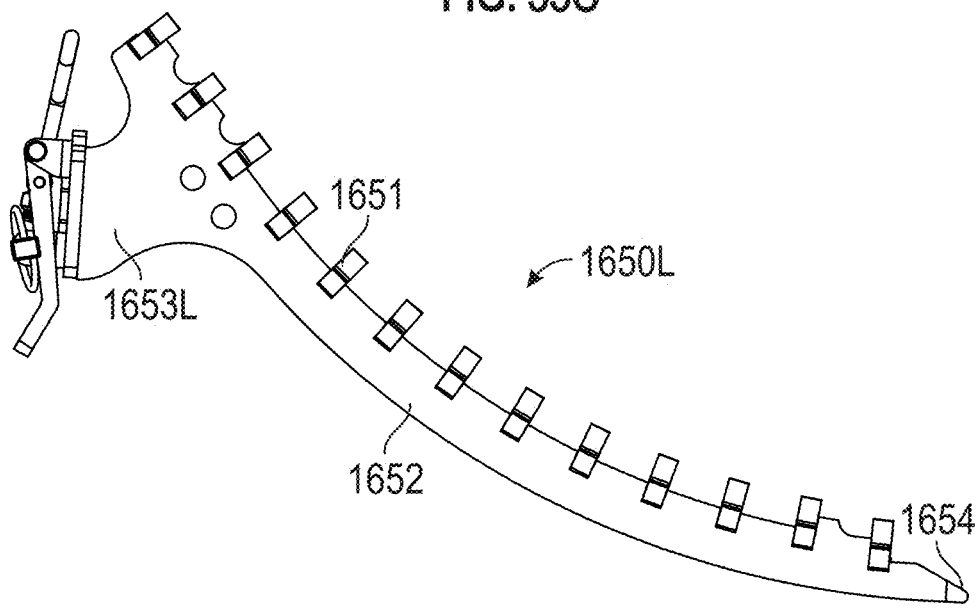
FIG. 55D shows a side elevation view of the MOG limiter of FIG. 55A.

Similarly, in a second example shown in FIGS. 53C-53D, a left-side quarter wrap (QW) MOG limiter assembly 1600L can similarly include the solid, extended mounting portions 1603L that extend downward from the rails 1602. The mounting portions 1603L each have an edge intended to align with the slots 1308 in each side of the base plate 1301 of the over-center latch assembly 1300.

In a third example shown in FIGS. 54A-54D, a right-side quarter wrap (QW) MOG limiter assembly 1650R includes solid, extended mounting portions 1653R that extend from the rails 1652. The mounting portions 1653R each have an edge intended to align with the slots 1408 in each side of the base plate 1401 of the over-center latch assembly 1400.

Similarly, in a fourth example shown in FIGS. 55A-55D, a left-side quarter wrap (QW) MOG limiter assembly 1650L can similarly include the solid, extended mounting portions 1653L that extend downward from the rails 1652. The mounting portions 1653L each have an edge intended to align with the slots 1408 in each side of the base plate 1401 of the over-center latch assembly 1400.

FIGS. 56A-57C show a concave assembly 2600, 2650. The concave assembly 2600, 2650 includes side rails 2601, 2651, a center rail 2602, 2652, cross bars 2603, 2653, a first end 2604, 2654, a second end 2605, 2655, and a wire lock clevis pin 2656.

The side rails 2601, 2651 form sides of the concave assembly 2600, 2650 each concluding at both of the first end 2604, 2654 and the second end 2605, 2655. Extending down a center of the concave assembly 2600, 2650 is the center rail 2602, 2652 substantially parallel to each of the side rails 2601, 2651. The concave assembly 2600, 2650 further includes the cross bar 2603, 2653 which may be a single cross bar 2603, 2653 or two cross bars 2603, 2653. The side rails 2601, 2651 may includes apertures along a length of the side rails 2601, 2651 so as to allow for varying placement of the cross bar 2603, 2653 depending on a size of MOG limiters or cover plates positioned therebetween. The cross bar 2603, 2653 includes apertures therein to receive the hinge points 1604, 1654, 1704, 1754 described herein. The first end 2604, 2654 of the concave assembly 2600, 2650 generally corresponds to the right side of the concave and the second end 2605, 2655 generally corresponds to the left side of the concave. As shown, the second end 2605, 2655 may include a c-clamp portion for affixing the concave assembly 2600, 2650 within the threshing chamber of the combine. The first end 2604, 2654 is configured to secure to the first mounting assembly 1500 and the second end 2605, 2655 is configured to secure to the second mounting assembly 1550.

The concave assembly 2600 further includes MOG limiter assemblies 1600 positioned at an underside of the concave with MOG limiter assemblies 1600R at a right side of the concave assembly 2600 and MOG limiter assemblies 1600L positioned at a left side of the concave assembly 2600. As shown, this correlates to using the over-latch assembly 1300R and 1300L respectively. The concave assembly 2650 further includes MOG limiter assemblies 1650 positioned at an underside of the concave with MOG limiter assemblies 1650R at a right side of the concave assembly 2650 and MOG limiter assemblies 1650L positioned at a left side of the concave assembly 2650. As shown, this correlates to using the over-latch assembly 1300R and 1300L respectively.

Figure 57A:
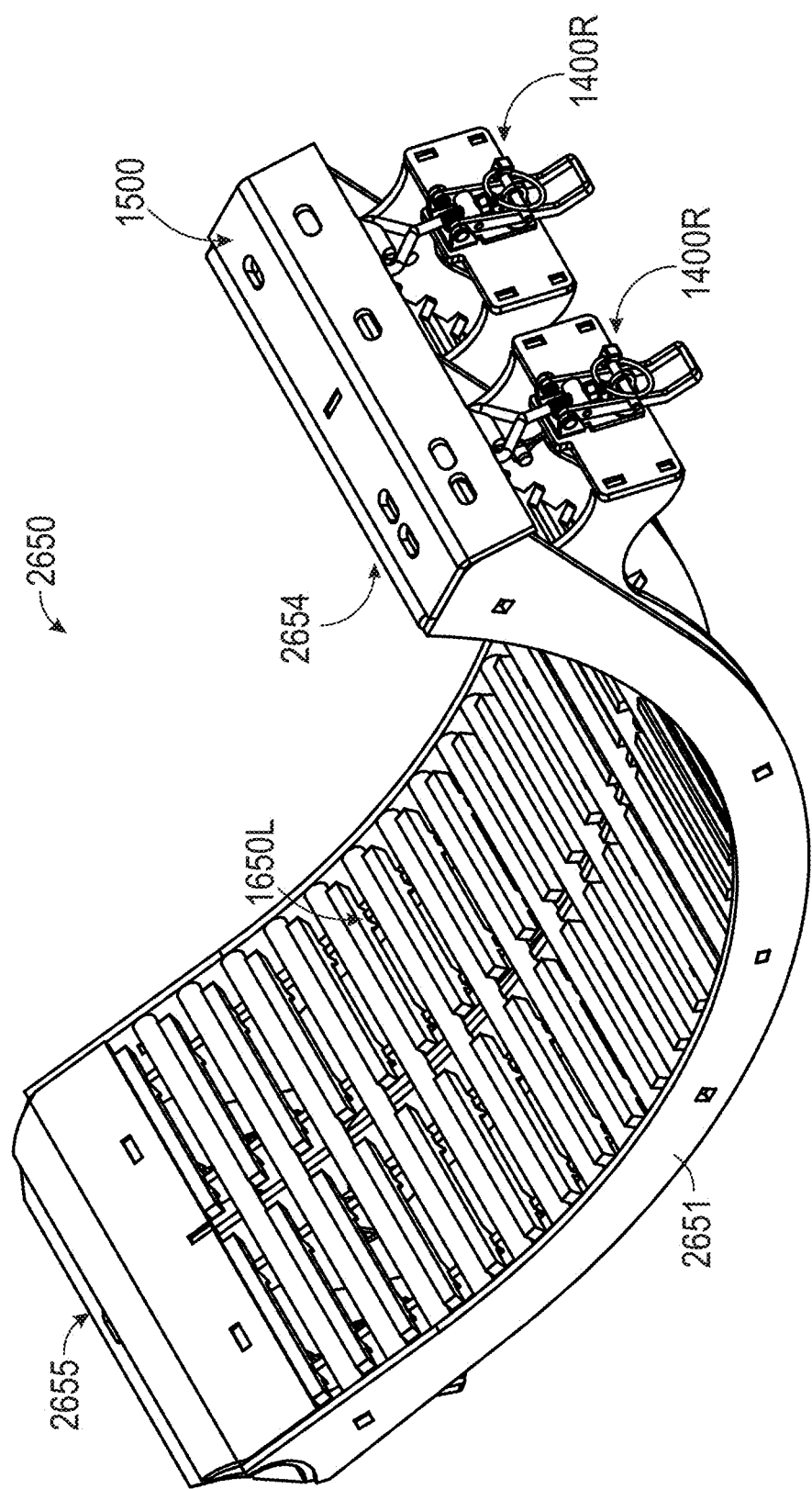
FIG. 57A shows a first perspective view of a concave with over-center latch assemblies securing the MOG limiters of FIGS. 54A and 55A.
Figure 57B:
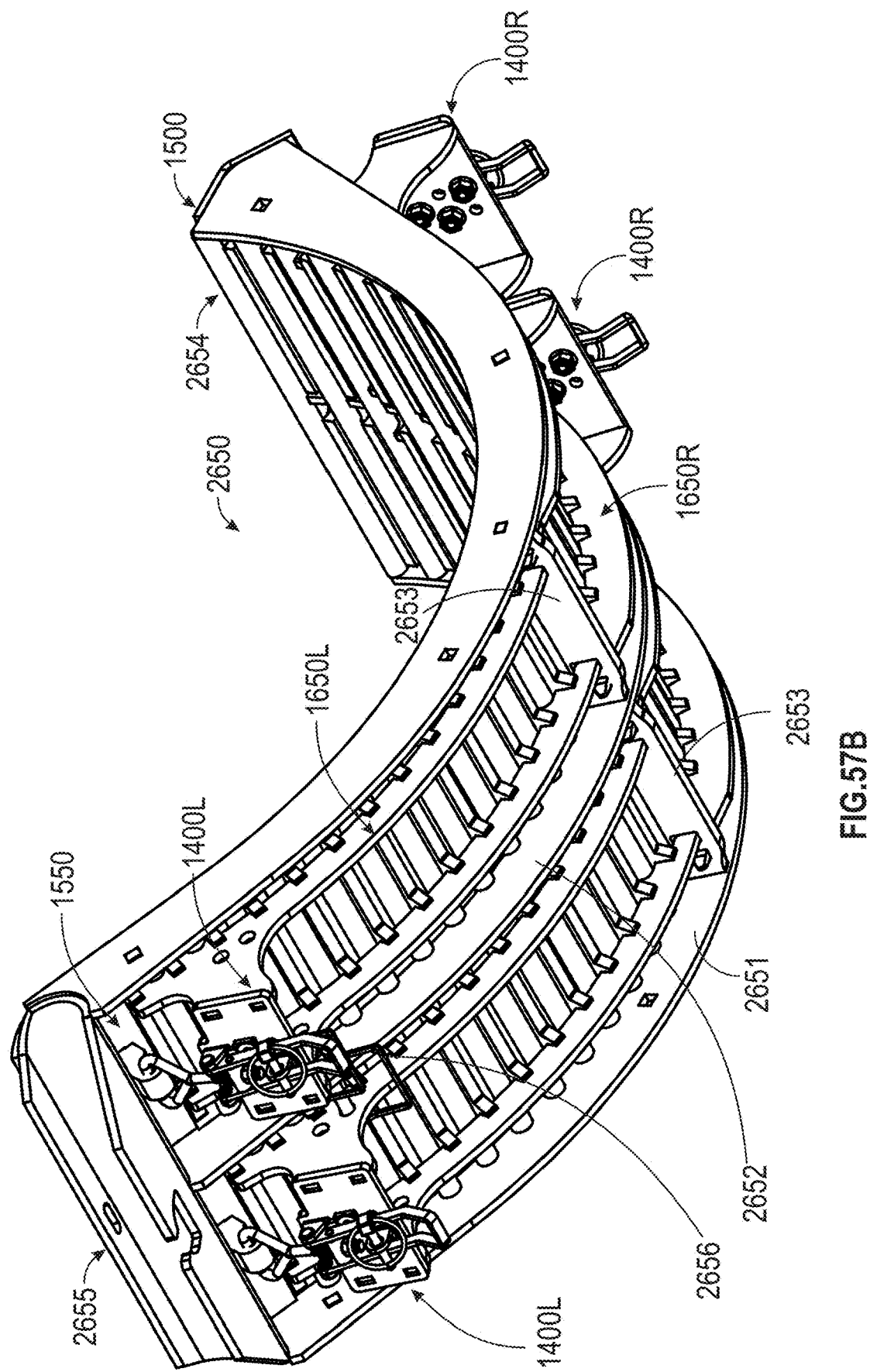
FIG. 57B shows an additional perspective view of the concave of FIG. 57A.
Figure 57C:
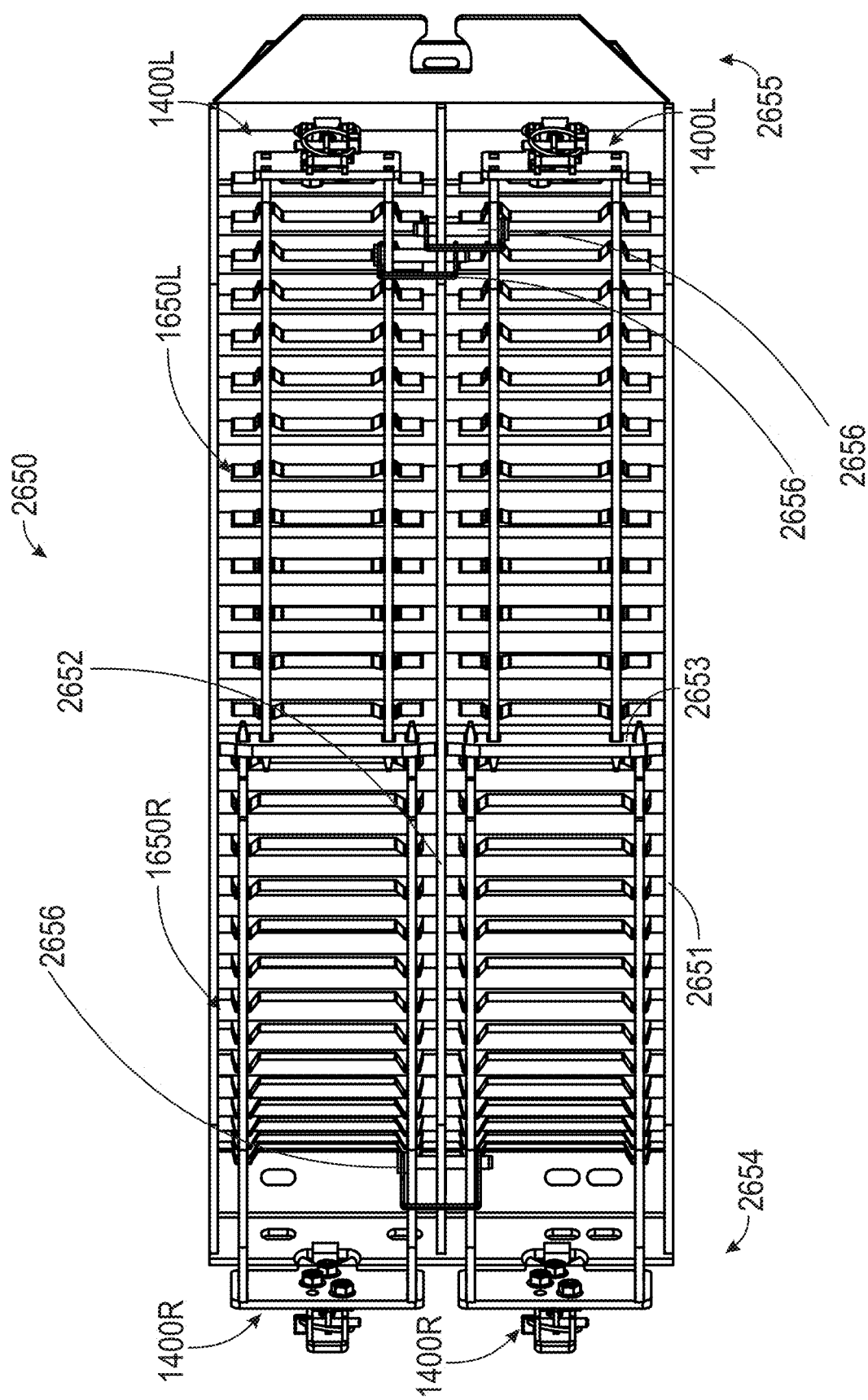
FIG. 57C shows a bottom plan view of the concave of FIG. 57A.
Figure 58B:
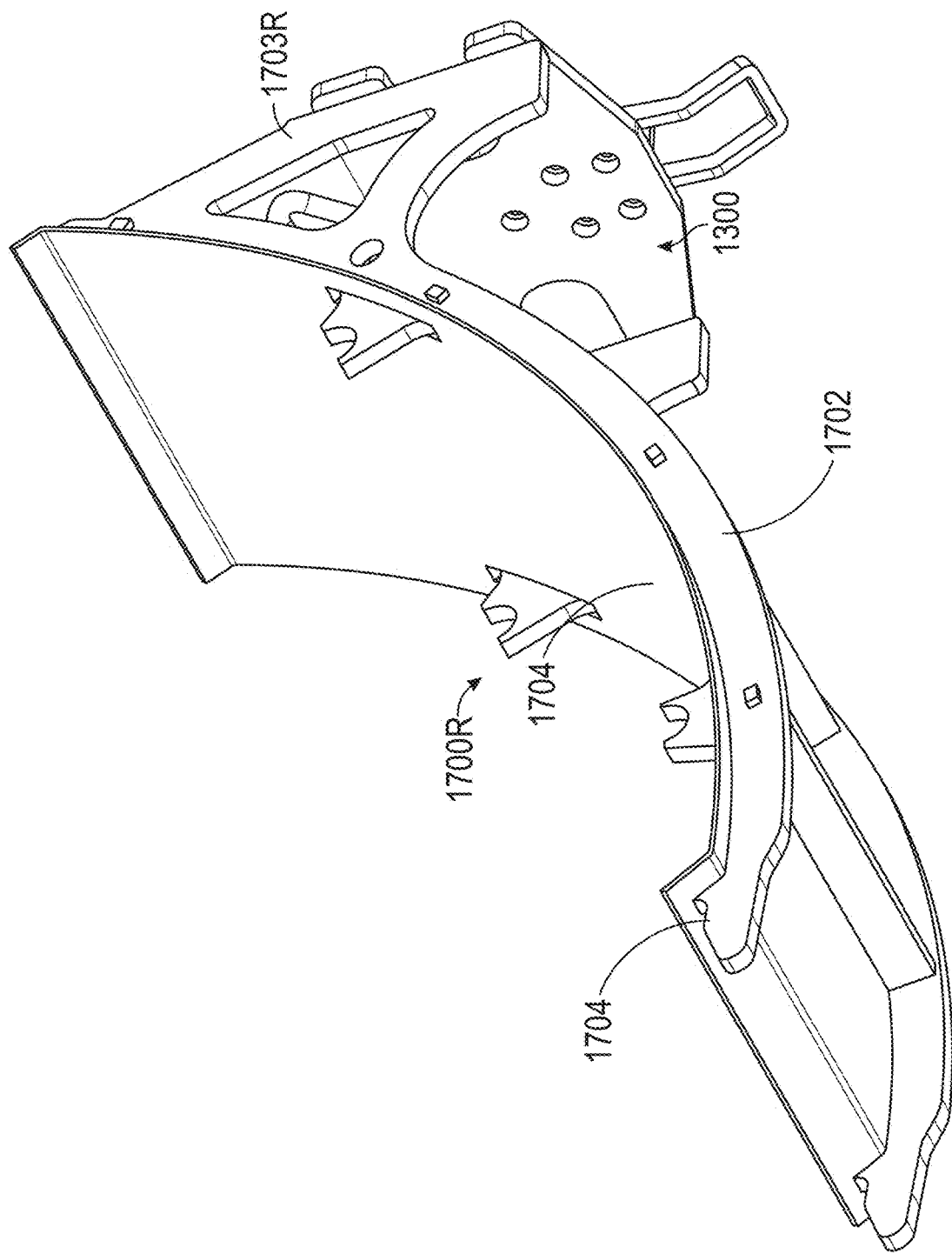
FIG. 58B shows a second perspective view thereof.
Figure 58C:
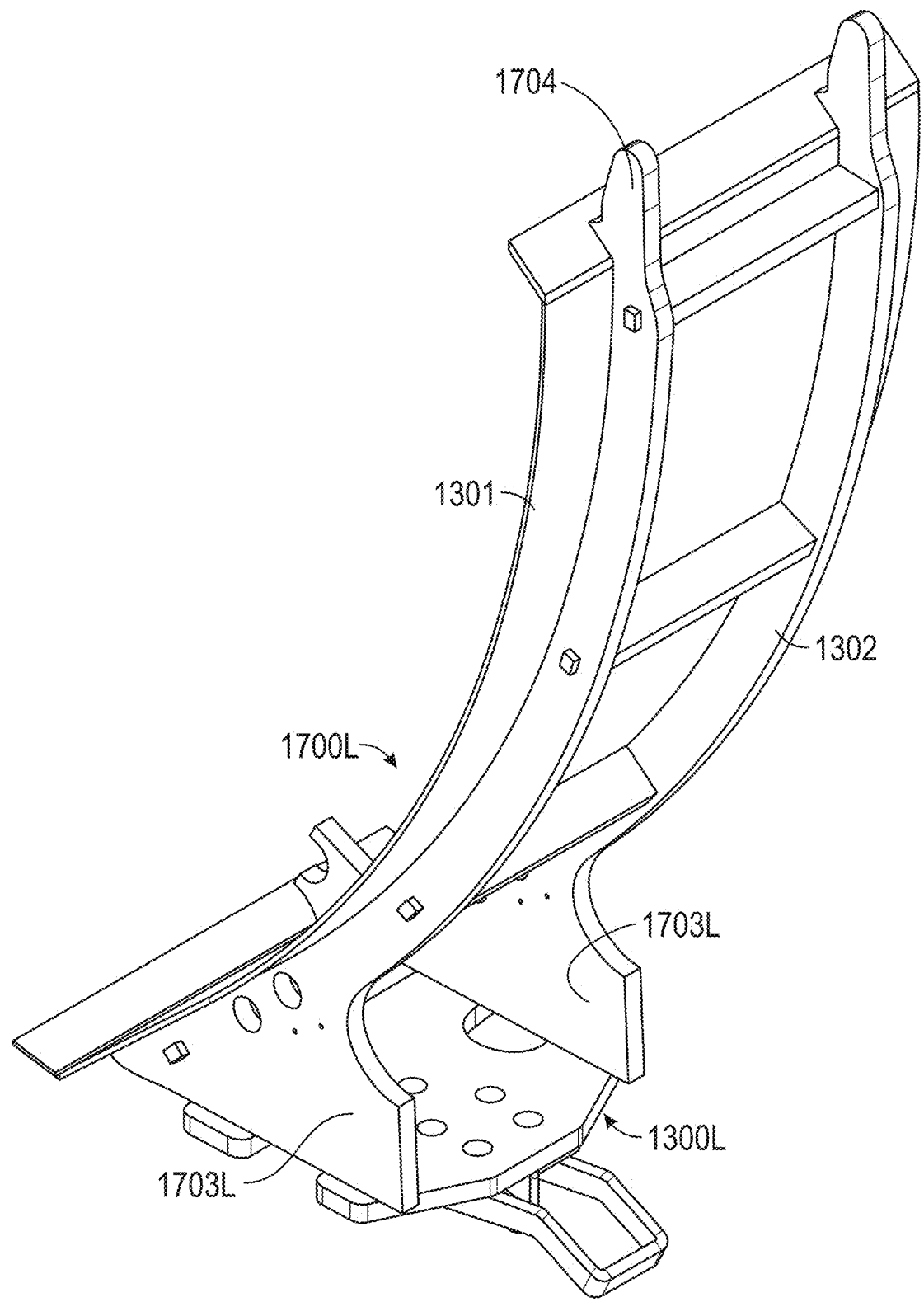
FIG. 58C shows a first perspective view of the over-center latch assembly of FIG. 47A mounted to a solid, extended mounting portion that is included in a right-side quarter wrap (QW) cover plate assembly.
Figure 58D:
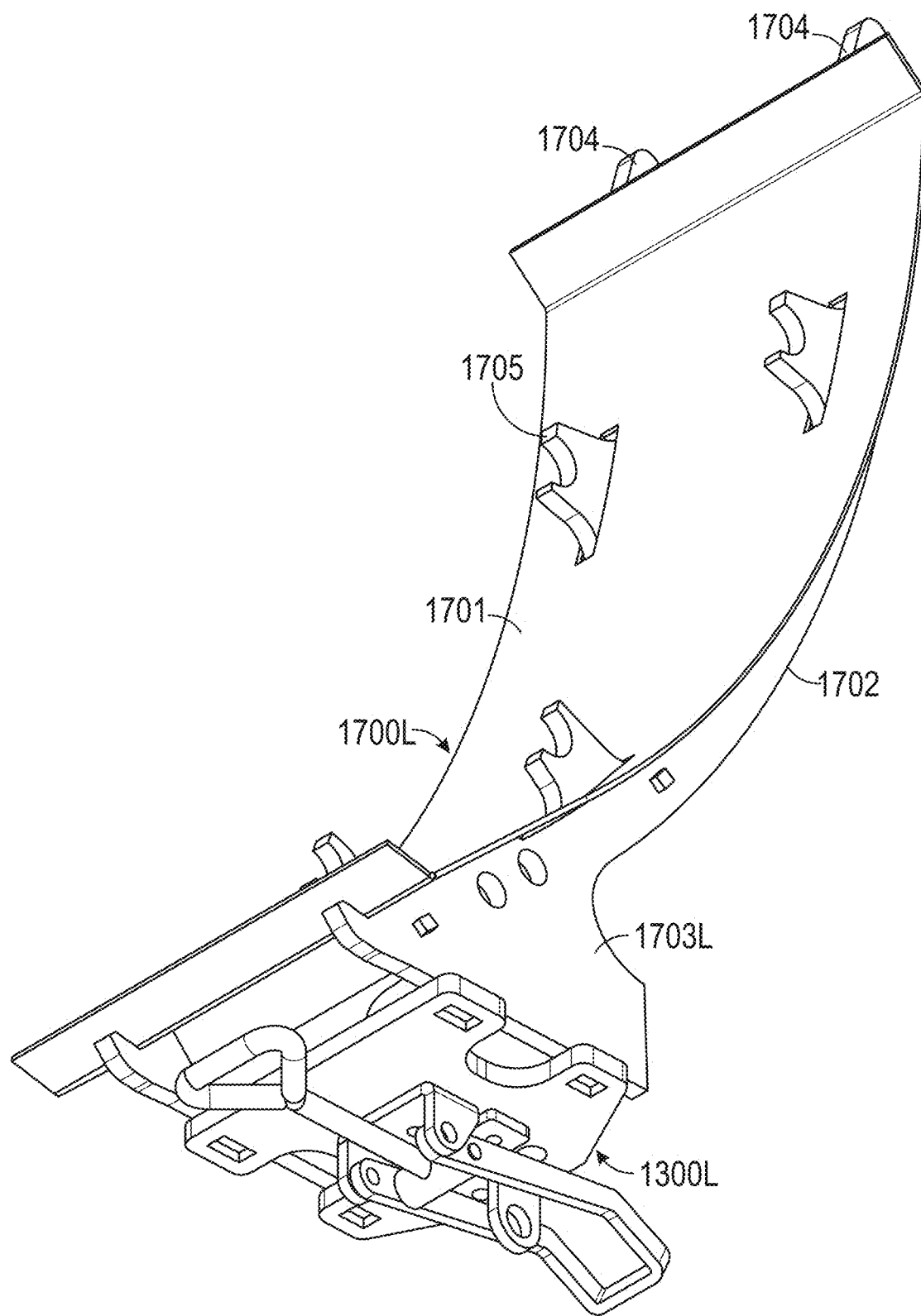
FIG. 58D shows a second perspective view thereof.
Figure 59A:
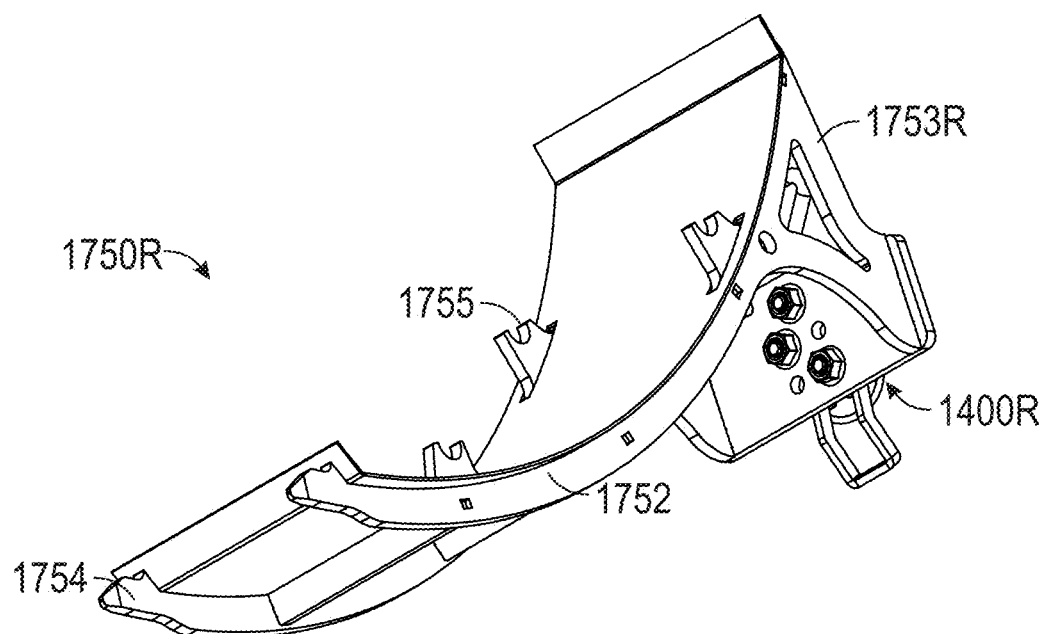
FIG. 59A shows a first perspective view of the over-center latch assembly of FIG. 48A mounted to a solid, extended mounting portion that is included in a right-side quarter wrap (QW) cover plate assembly.
Figure 59B:
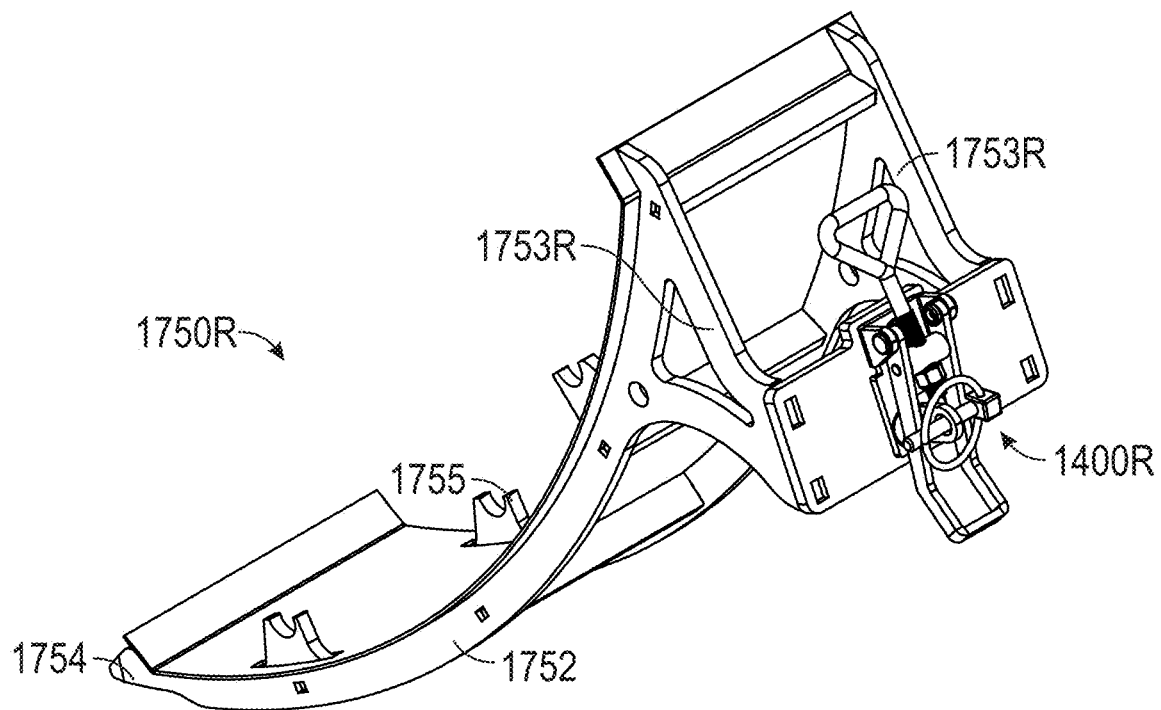
FIG. 59B shows a second perspective view thereof.
Figure 59C:
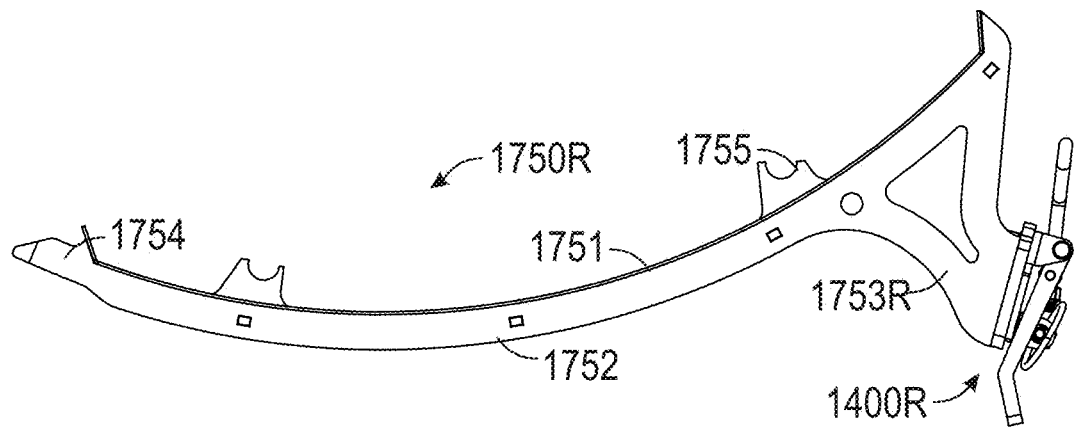
FIG. 59C shows a side elevation view thereof.
Figure 59D:
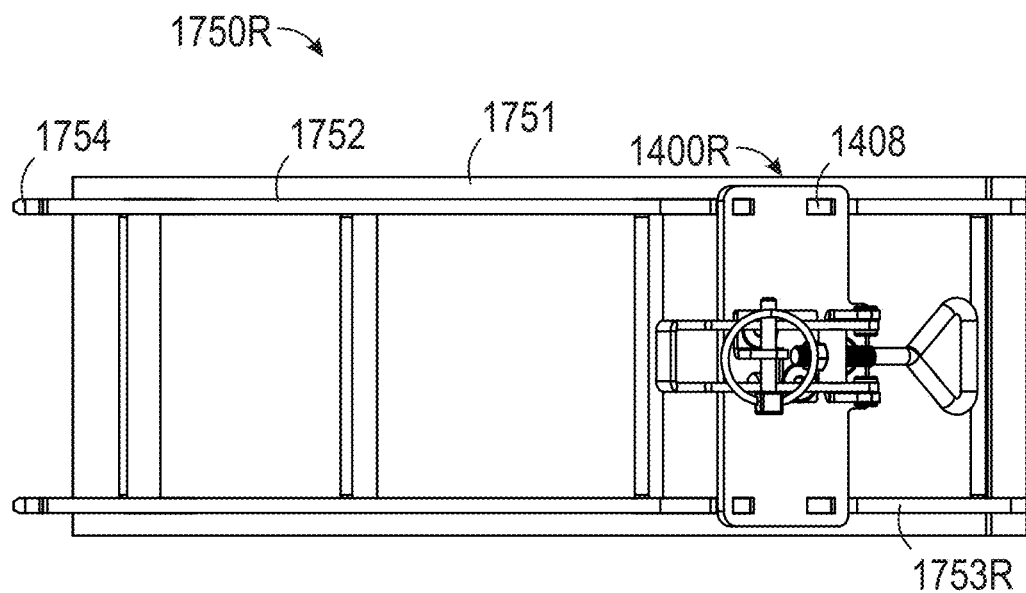
FIG. 59D shows a bottom plan view thereof.
Figure 60A:
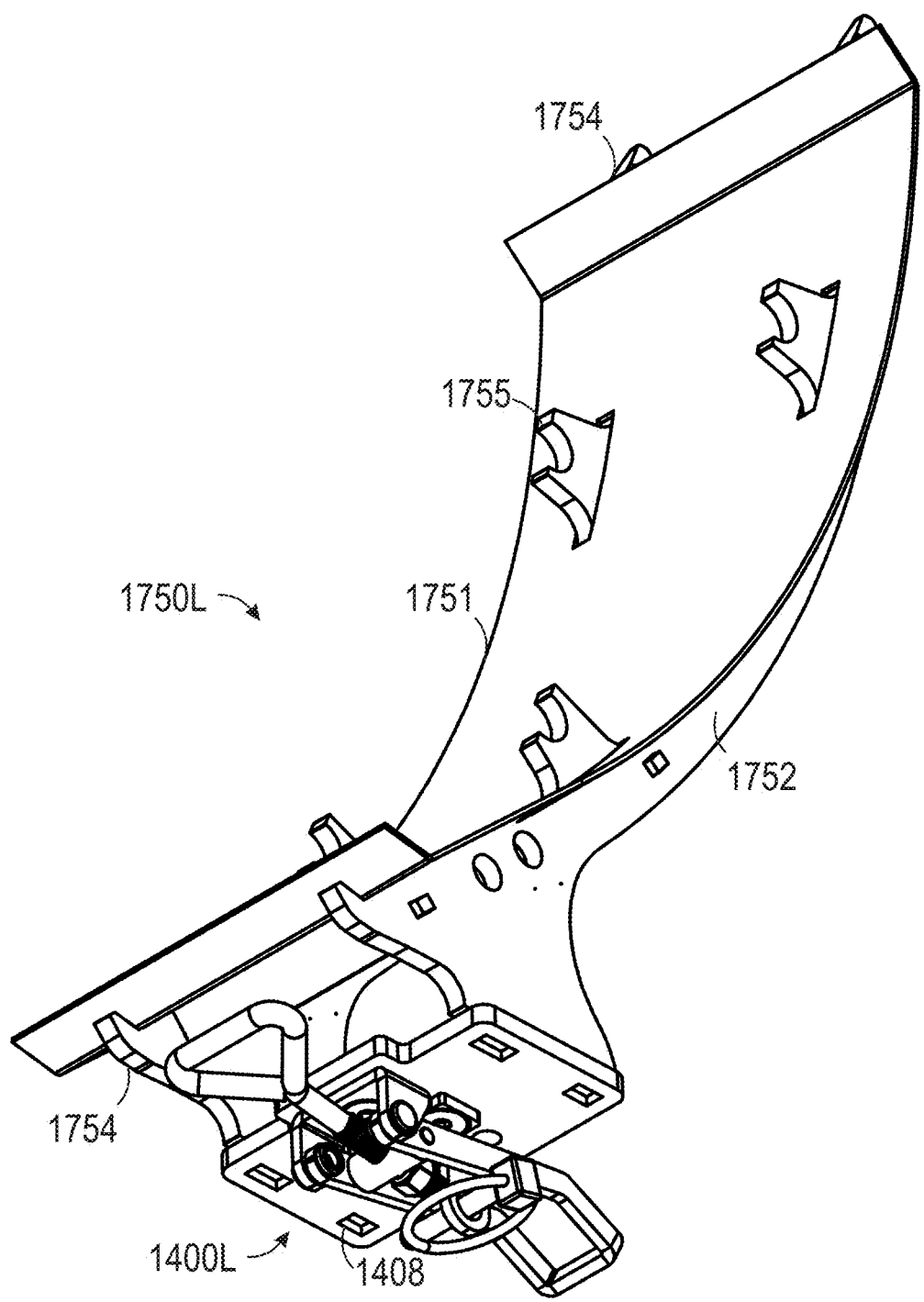
FIG. 60A shows a first perspective view of the over-center latch assembly of FIG. 49A mounted to a solid, extended mounting portion that is included in a left-side quarter wrap (QW) cover plate assembly.
Figure 60B:
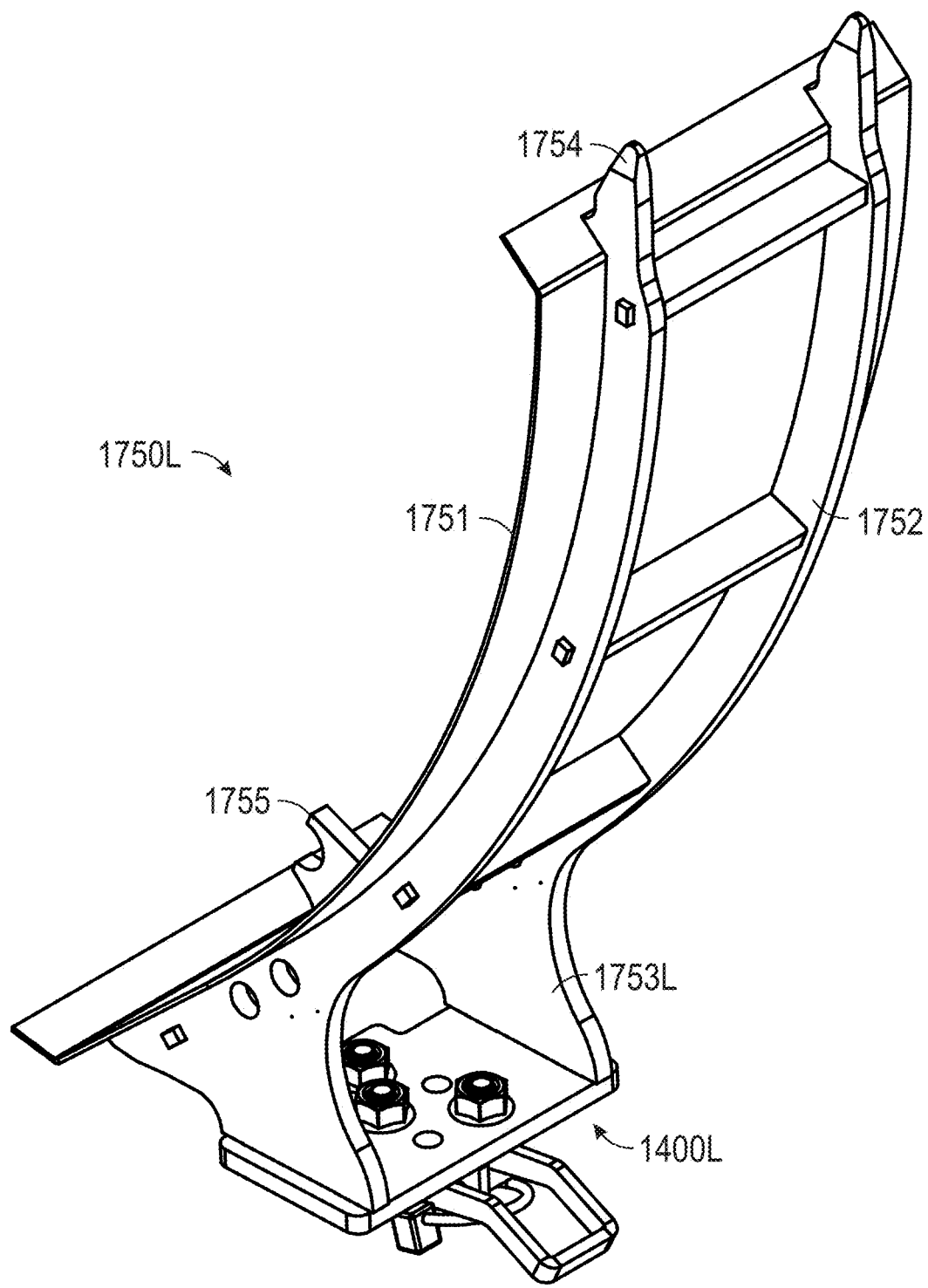
FIG. 60B shows a second perspective view thereof.
Figure 60C:
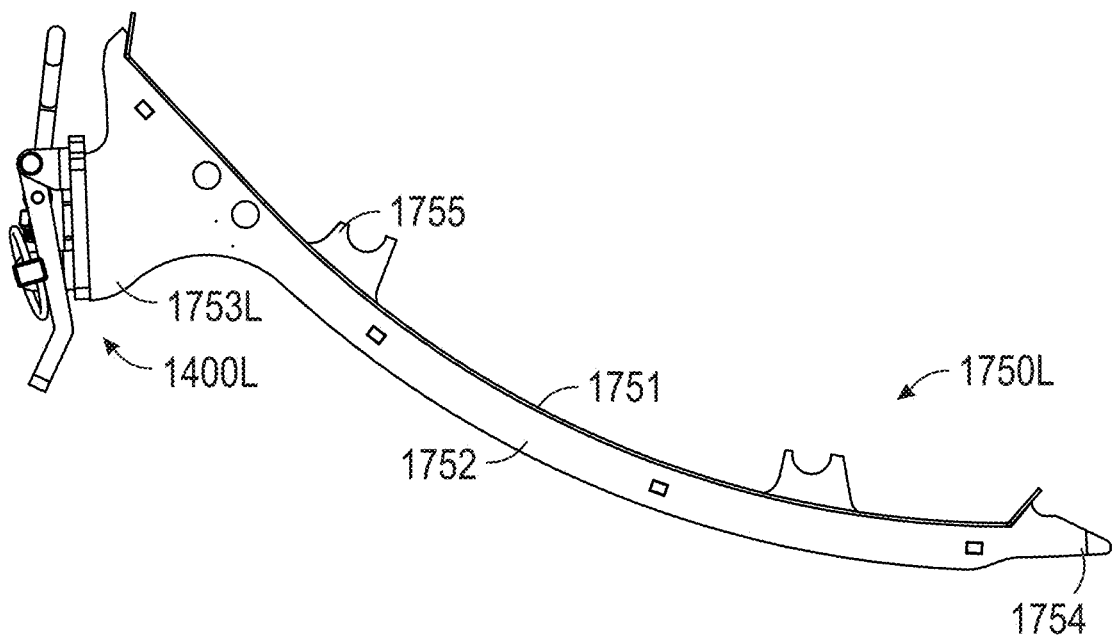
FIG. 60C shows a side elevation view thereof.
Figure 60D:
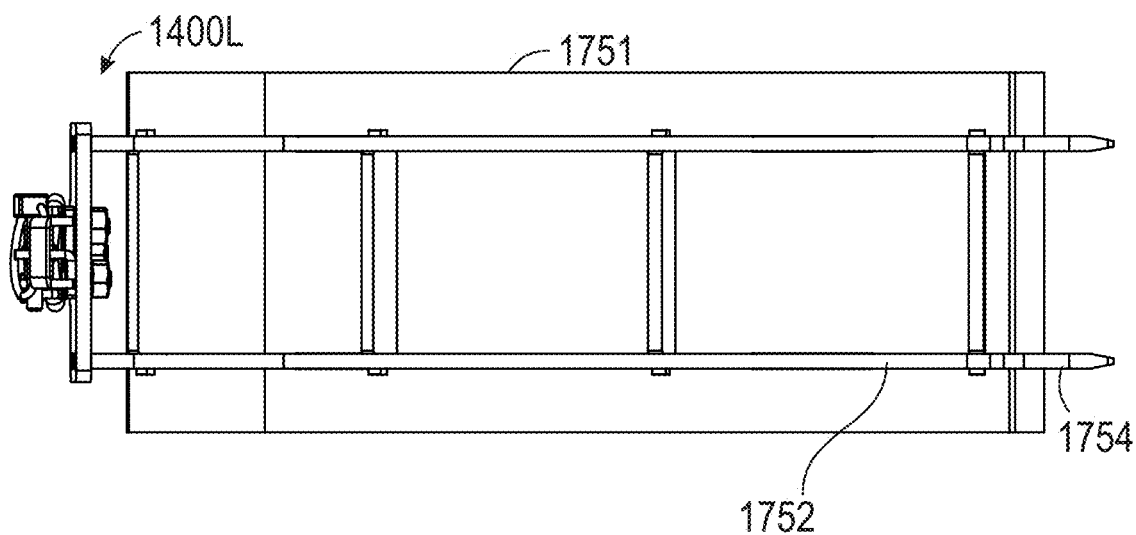
FIG. 60D shows a bottom elevation view thereof.

As shown in the concave assembly 2650 in FIG. 57B-57C, the concave assembly 2650 further includes the wire lock clevis pin 2656 for further locking in place the MOG limiter assemblies 1600 to the concave. The wire lock clevis pin 2656 may be any locking mechanism suitable for extending through the center rail 2652 and the rail 1652 of the MOG limiter assembly 1600 (apertures can be seen throughout the figures of apertures existing on a portion of the MOG limiter assembly that transitions from the rail 1602, 1652 to the extended mounting portion 1603, 1653, and one such visual of the pin 2656 extending through these apertures can be seen in FIG. 57B). As can be seen in FIG. 57C, two wire lock clevis pins 2656 are included on the left side of the concave assembly 2650 whereas only one wire lock clevis pin 2656 is included on the right side of the concave assembly 2650. This is because of a wider stance of the rails 1652 on the MOG limiter assembly 1600R as opposed to the narrower stance of the rails 1652 on the MOG limiter assembly 1600L. As shown with previous embodiments, the MOG limiter assembly can be configured to alternate (see, e.g., FIG. 5) as opposed to adopting wider and narrower stance rails 1652. Although not shown in the figures, nothing precludes the wire lock clevis pin 2656 from being incorporated into the concave assembly 2600.

When fully assembled, the MOG limiter assemblies 1600, 1650 will be held in place against the concave 2600 via insertion of the hinge points 1604, 1654 into apertures of the cross bar 2603, 2653, and latching down of the over-center latch assemblies 1300, 1400 via the loops 1305, 1405 attaching to the catches 1501, 1502, 1551, 1552 and the converging of the handles 1302, 1402 towards the base plates 1301, 1401, and further via inclusion of the wire lock clevis pins 2656.

FIGS. 58A-60D show cover plate assemblies 1700R, 1700L, 1750R, 1750L (1700, 1750). The cover plate assemblies 1700, 1750 include a curvilinear plate 1701, 1751, rails 1702, 1752, extended mounting portions 1703R, 1703L, 1753R, 1753L, hinge points 1704, 1754, and contact protrusions 1705, 1755.

The cover plate assembly 1700, 1750 is formed by coupling two rails 1702, 1752 to another via the curvilinear plate 1701, 1751 attached therebetween. The rails 1702, 1752 are substantially parallel to one another. As shown, the rails 1702, 1752 follow a substantially curvilinear path along the curvilinear plate 1701, 1751 so as to conform to an outer side of a concave within a combine. At a first end of the MOG limiter assembly 1700, 1750 is the hinge points 1704, 1754. Each of the hinge points 1704 (for the MOG limiter assembly 1700) and the hinge points 1754 (for the MOG limiter assembly 1750) form an end of the rails (1702 and 1752 respectively) by tapering off so as to be easily insertable into apertures within cross bars of a concave as can be seen in later figures (see, e.g., FIGS. 62, 65).

At an end opposite the hinges points 1754 are the extended mounting portions 1703R, 1703L, 1753R, 1753L. As shown, the extended mounting portions 1703R, 1703L, 1753R, 1753L can vary in shape, weight, and size, but are each configured to provide a mounting place for the over-center latch assemblies 1300R, 1300L, 1400R, 1400L. The right-side cover plate assembly 1700R, 1750R can include a triangular mounting portion 1703R, 1753R that includes a cavity therethrough. Like the solid, extended mounting portion 1603, it is characterized by an edge (the lower leg of the triangle) intended to align with the slots 1308 in each side of the body 1301 of the over-center latch assembly 1300. A surface of each of the extended mounting portions 1703R, 1703L, 1753R, 1753L to which the over-center latch assemblies 1300, 1400 attach is angled to allow for connection to catches on the concave in such a way that will provide tension of the cover plate assemblies 1700, 1750 against the underside of the concave. A preferred method of attaching the over-center latch assemblies 1300, 1400 to the extended mounting portions 1703R, 1703L, 1753R, 1753L is via plug weld in the slots 1308, 1408.

The over-center latch assembly 1300 is also designed so as to be useable with each of the cover plate assemblies 1700, 1750, as shown in FIGS. 58A-60D.

FIGS. 61-65 show a concave assembly 2700, 2750. The concave assembly 2700, 2750 includes side rails 2701, 2751, a center rail 2702, 2752, cross bars 2703, 2753, a first end 2704, 2754, a second end 2705, 2755, and a wire lock clevis pin 2756.

The side rails 2701, 2751 form sides of the concave assembly 2700, 2750 each concluding at both of the first end 2704, 2754 and the second end 2705, 2755. Extending down a center of the concave assembly 2700, 2750 is the center rail 2702, 2752 substantially parallel to each of the side rails 2701, 2751. The concave assembly 2700, 2750 further includes the cross bar 2703, 2753 which may be a single cross bar 2703, 2753 or two cross bars 2703, 2753. The side rails 2701, 2751 may includes apertures along a length of the side rails 2701, 2751 so as to allow for varying placement of the cross bar 2703, 2753 depending on a size of MOG limiter or cover plates positioned therebetween. The cross bar 2703, 2753 includes apertures therein to receive the hinge points 1604, 1654, 1704, 1754 described herein. The first end 2704, 2754 of the concave assembly 2700, 2750 generally corresponds to the right side of the concave and the second end 2705, 2755 generally corresponds to the left side of the concave. As shown, the second end 2705, 2755 may include a c-clamp portion for affixing the concave assembly 2700, 2750 within the threshing chamber of the combine. The first end 2704, 2754 is configured to secure to the first mounting assembly 1500 and the second end 2705, 2755 is configured to secure to the second mounting assembly 1550.

The concave assembly 2700 further includes cover plate assemblies 1700 positioned at an underside of the concave with cover plate assemblies 1700R at a right side of the concave assembly 2700 and cover plate assemblies 1700L positioned at a left side of the concave assembly 2700. As shown, this correlates to using the over-latch assembly 1300R and 1300L respectively. The concave assembly 2750 further includes cover plate assemblies 1750 positioned at an underside of the concave with cover plate assemblies 1750R at a right side of the concave assembly 2750 and cover plate assemblies 1750L positioned at a left side of the concave assembly 2750. As shown, this correlates to using the over-latch assembly 1300R and 1300L respectively.

Figure 64:
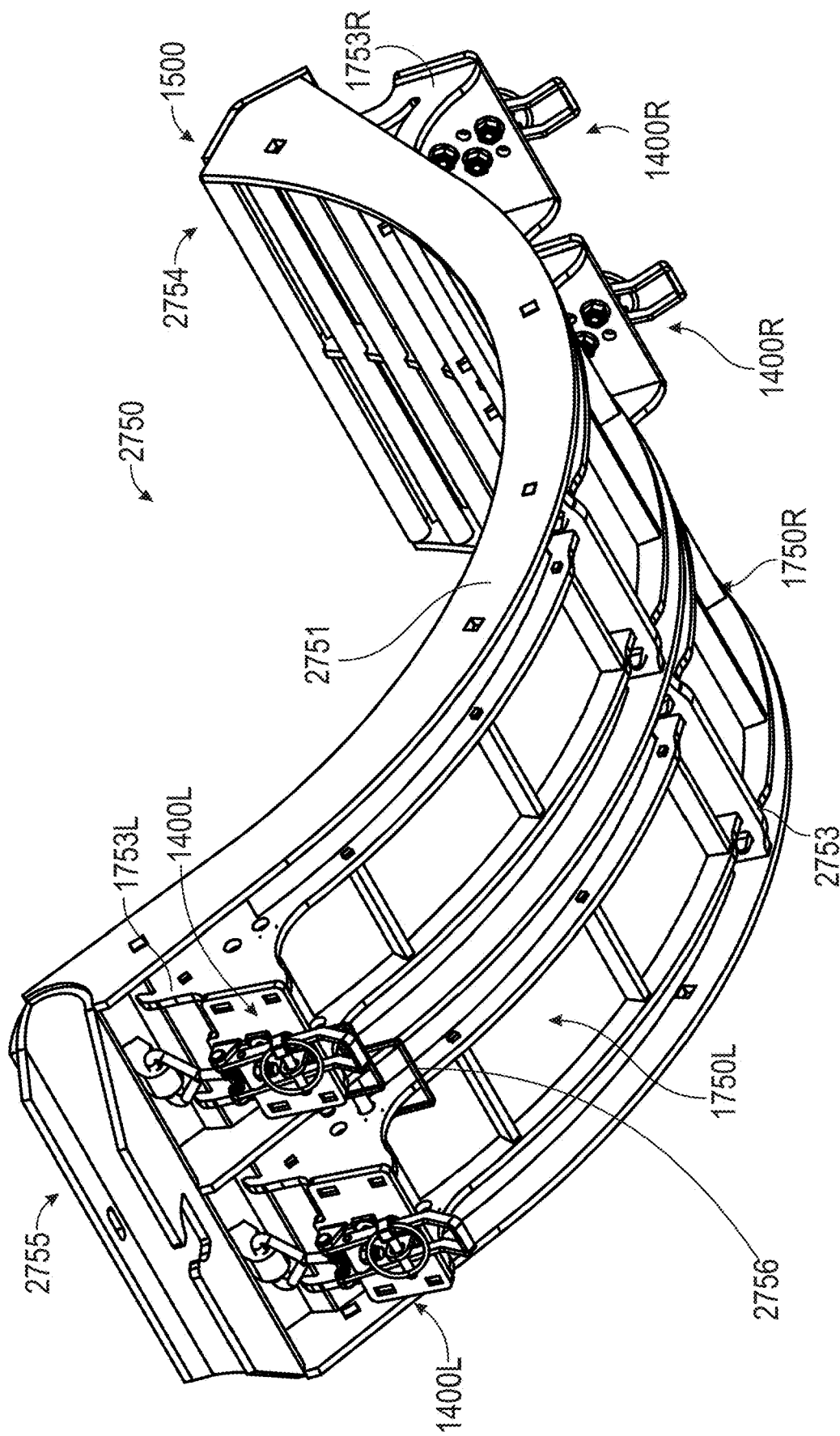
FIG. 64 shows a second perspective view thereof.
Figure 65:
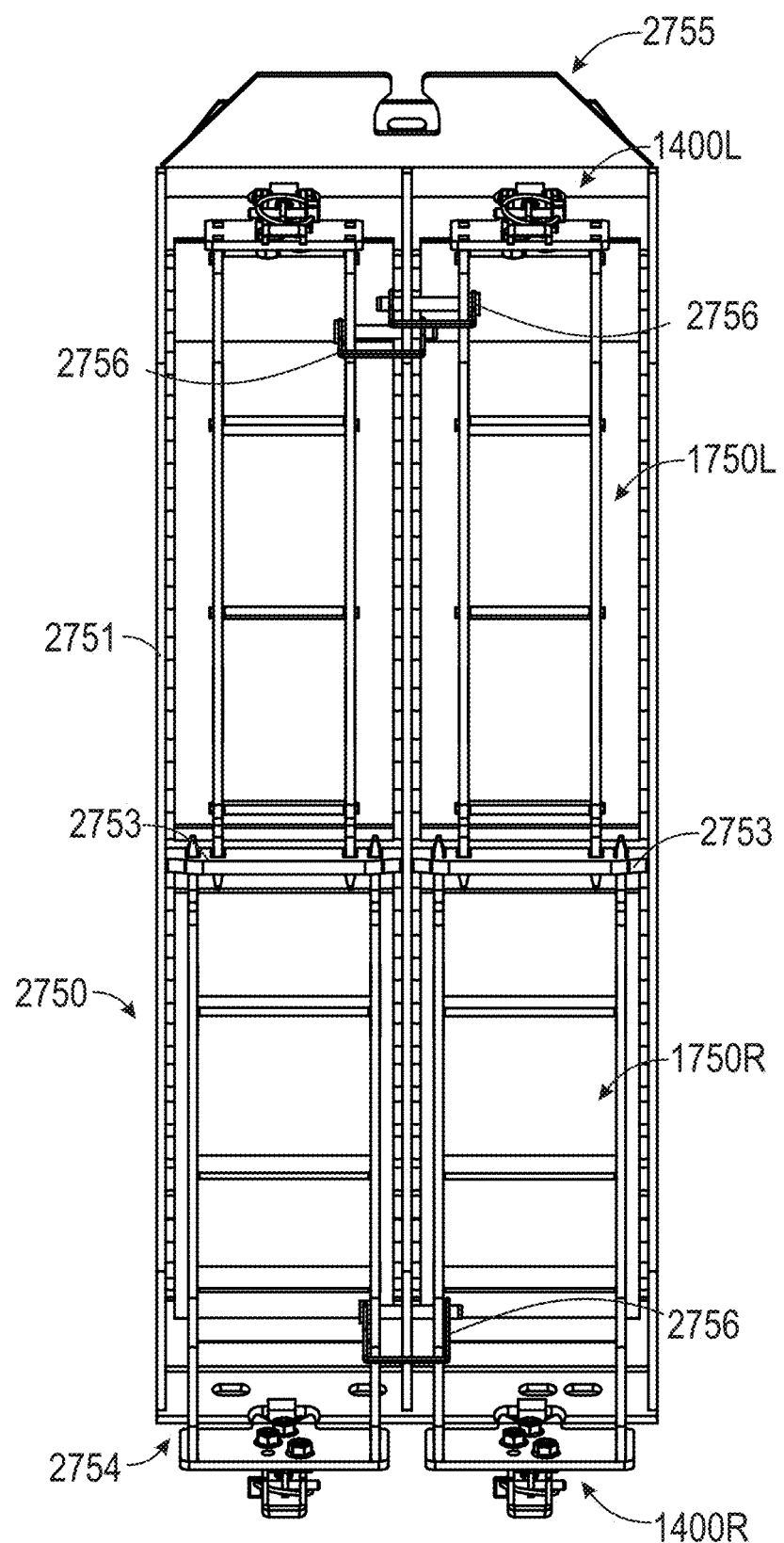
FIG. 65 shows a bottom plan view thereof.

As shown in the concave assembly 2750 in FIG. 64-65, the concave assembly 2750 further includes the wire lock clevis pin 2756 for further locking in place the cover plate assemblies 1700 to the concave. The wire lock clevis pin 2756 may be any locking mechanism suitable for extending through the center rail 2752 and the rail 1752 of the cover plate assembly 1700 (apertures can be seen throughout the figures of apertures existing on a portion of the cover plate assembly that transitions from the rail 1702, 1752 to the extended mounting portion 1703, 1753, and one such visual of the pin 2756 extending through these apertures can be seen in FIG. 64). As can be seen in FIG. 65, two wire lock clevis pins 2756 are included on the left side of the concave assembly 2750 whereas only one wire lock clevis pin 2756 is included on the right side of the concave assembly 2750. This is because of a wider stance of the rails 1752 on the cover plate assembly 1700R as opposed to the narrower stance of the rails 1752 on the cover plate assembly 1700L. As shown with previous embodiments, the cover plate assembly can be configured to alternate (see, e.g., FIG. 5) as opposed to adopting wider and narrower stance rails 1752. Although not shown in the figures, nothing precludes the wire lock clevis pin 2756 from being incorporated into the concave assembly 2700.

When fully assembled, the cover plate assemblies 1700, 1750 will be held in place against the concave 2700 via insertion of the hinge points 1704, 1754 into apertures of the cross bar 2703, 2753, and latching down of the over-center latch assemblies 1300, 1400 via the loops 1305, 1405 attaching to the catches 1501, 1502, 1551, 1552 and the converging of the handles 1302, 1402 towards the base plates 1301, 1401, and further via inclusion of the wire lock clevis pins 2756.

When fully assembled, and as shown in FIGS. 56A-56B the concave 100 can therefore attach one or more of the left-side quarter wrap (QW) MOG limiter assembly 1100 and one or more of the right-side quarter wrap (QW) MOG limiter assembly 1200 by way of the extended mounting portions 1603, the over-center latch assembly 1300, and the mounting assembly 1500.

Figure 61:
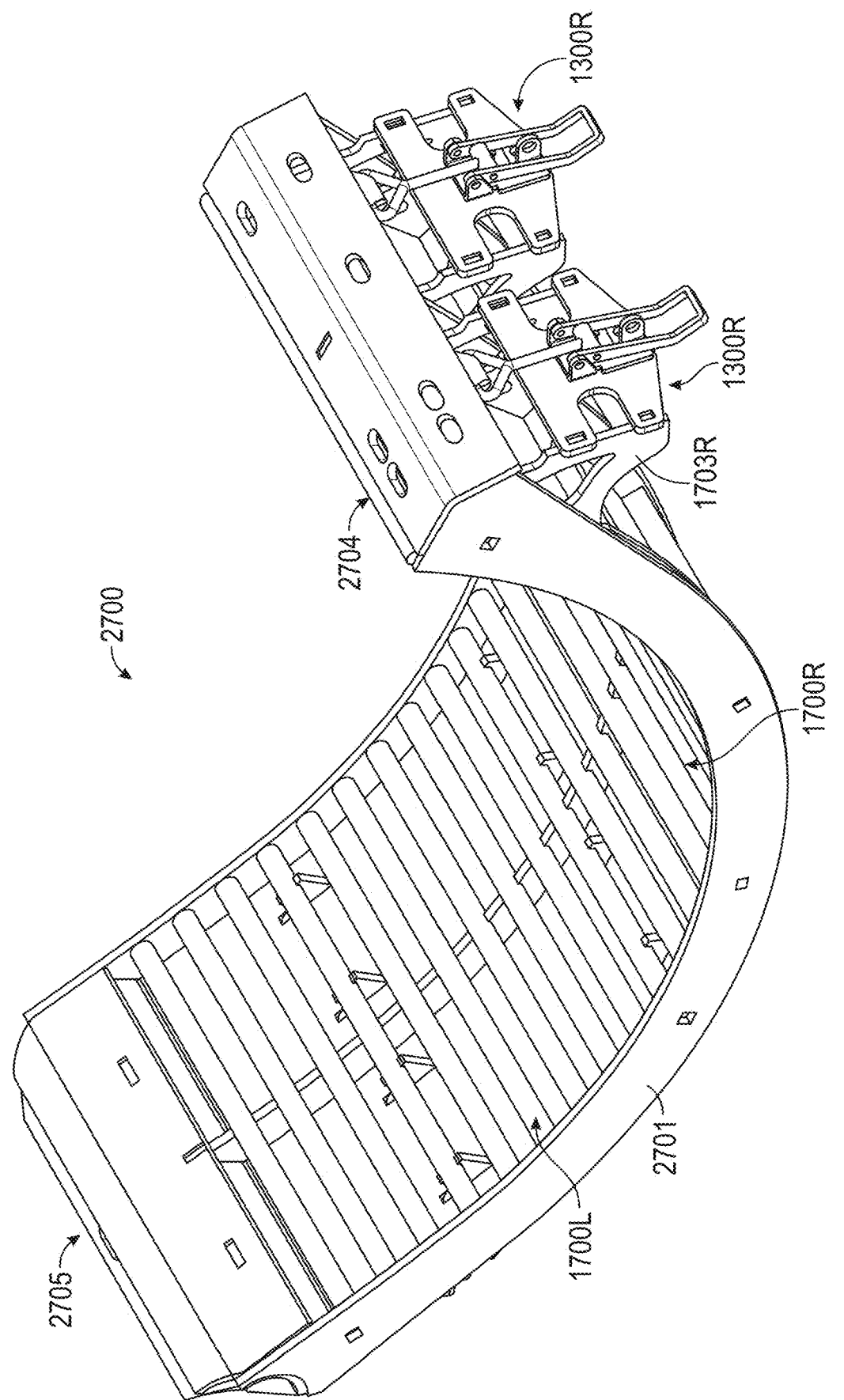
FIG. 61 shows a first perspective view of over-center latch assemblies securing two pairs of left-side and right-side cover plate assemblies to a concave.
Figure 62:
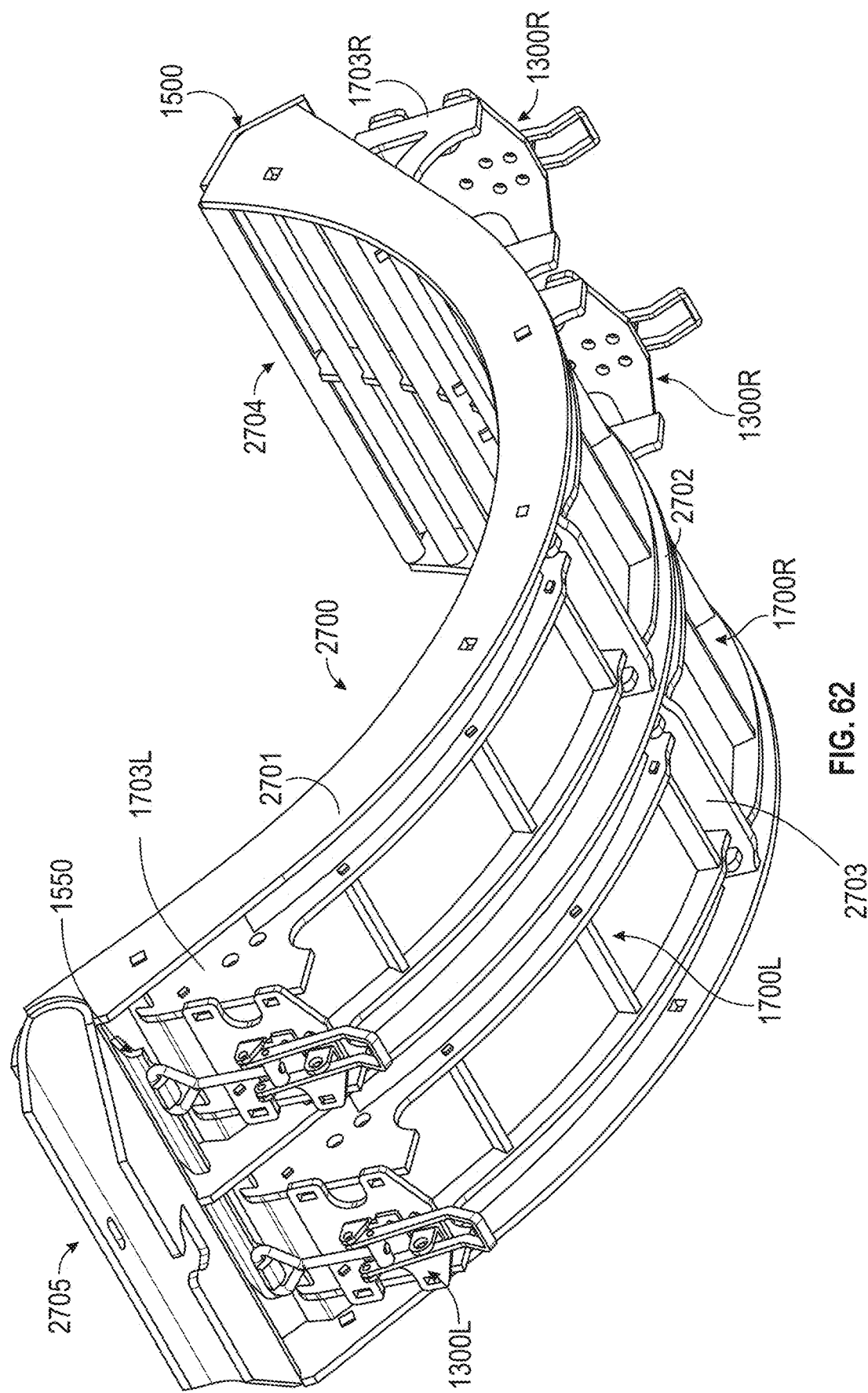
FIG. 62 shows a second perspective view thereof.
Figure 63:
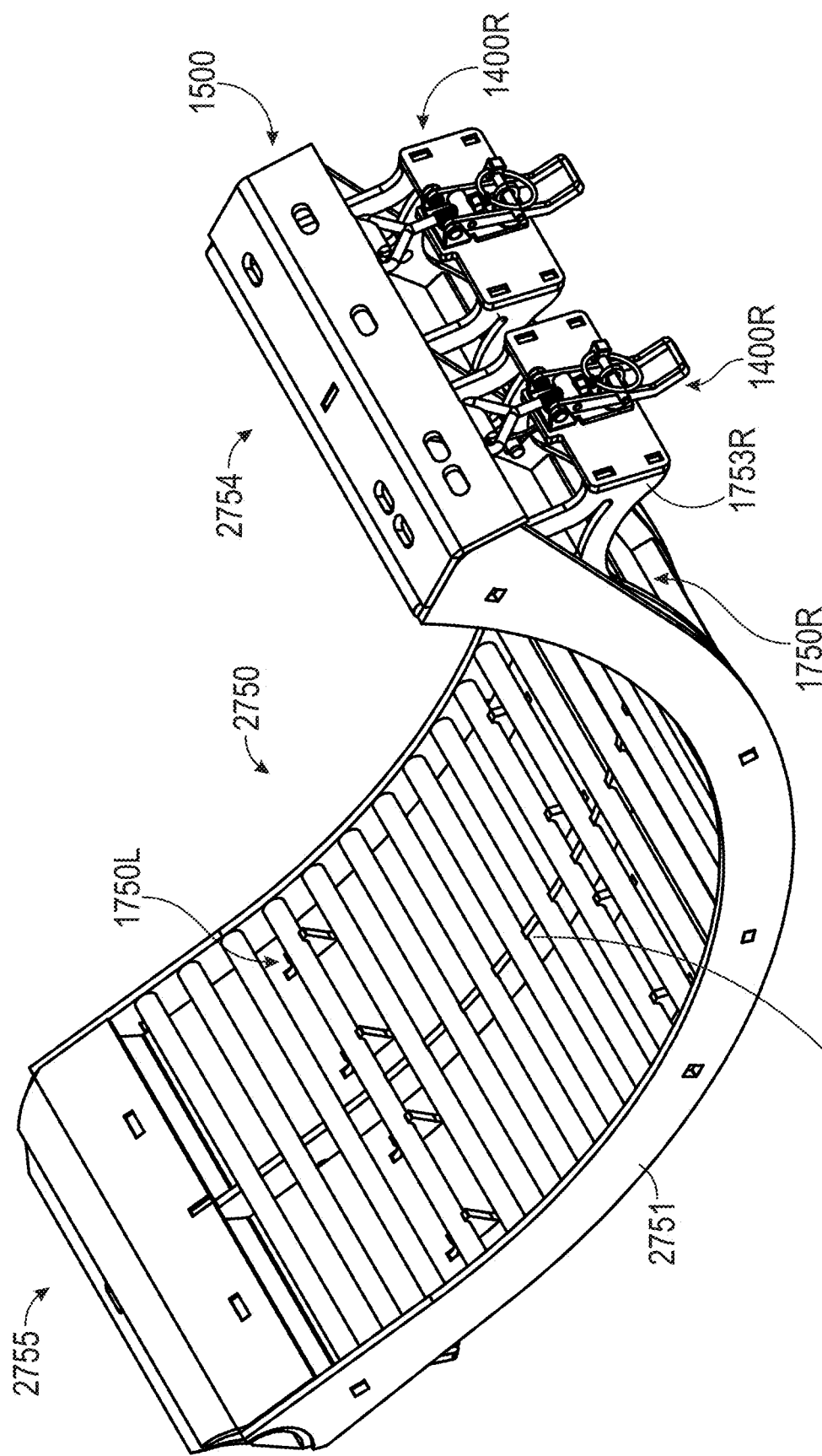
FIG. 63 shows a first perspective view of over-center latch assemblies securing two pairs of the cover plate assemblies shown in FIG. 59A and two pairs of the cover plate assemblies shown in FIG. 60A to a concave.

When fully assembled, and as shown in FIGS. 61-62 the concave 100 can therefore attach one or more of the left-side quarter wrap (QW) cover plate assembly 900 and one or more of the right-side quarter wrap (QW) cover plate assembly 1000 by way of the extended mounting portions 1603, the over-center latch assembly 1300, and the mounting assembly 1500.

Figure 66:
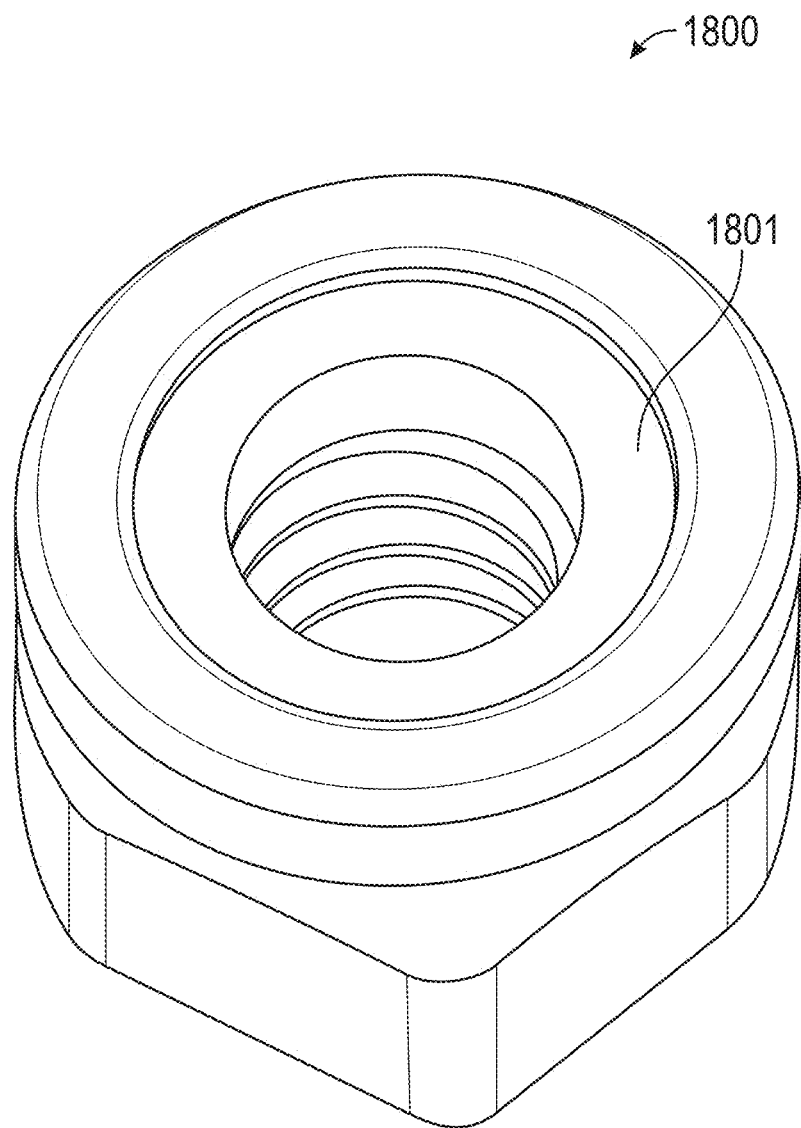
FIG. 66 shows a locking nut with a nylon friction ring incorporated therein.

FIG. 66 shows the locking nut 1800 with a nylon friction ring 1801 incorporated therein comprises a nut with a threaded nylon insert. The locking nut with a nylon friction ring is shown in use for example in FIGS. 36, 38, 40-42, 44-45, 48A-48B, 49A-50B, 50A-51C, among others. The nylon friction ring can be added instead of a locking nut for increased locking strength and can be particularly useful when in use with the screw loop so as to retain an initial position of the screw loop without concern of it rotating to either of a longer or shorter length for when in use with the assembly.

It is to be appreciated that any of the concave, MOG limiter, cover plate, over-center latch, etc. described herein may be intermixed and diversified in various combinations. One such example given by way of example and not of limitation is that FIGS. 56A-57C shows only MOG limiter assemblies attached to the concave, and FIGS. 61-65 show only cover plate assemblies attached to the concave and are designated as concave assembly 2600 and concave assembly 2700. This is in no way limiting to the combinations possible for the concaves as the concave itself within each of the concave assembly 2600 and the concave assembly 2700 can be the same concave. As such, components shown in each of these assemblies may be intermixed so as to have one MOG limiter assembly 1600R and three cover plate assemblies 1700R, 1700L, 1750L within the concave assembly or two and two placed at various positions etc. The same goes for over-center latch assemblies and extended mounting portions with intermixing and all sorts of combinations are possible.

It is to be appreciated any one or more of the concaves/ concave assemblies 101, 500, 600, 700, 800, mounting assembly 200, cover plates/cover plate assemblies 300, 400, 900, 1000, and MOG limiter assemblies 105, 1100, 1200, can be equipped with sensors and technologies that can automatically adjust based on field conditions and crop type.

It is to be appreciated any one or more of the concaves/ concave assemblies 101, 500, 600, 700, 800, mounting assembly 200, cover plates/cover plate assemblies 300, 400, 900, 1000, and MOG limiter assemblies 105, 1100, 1200, can be included in various combinations to form various kits. For example, according to embodiment, the kit includes components selected from the group consisting of: one or more concave, preferably three or more round bar concaves; one or more pairs of left-hand and right-hand cover plates, preferably two or more pairs; one or more pairs of left-hand and right-hand quarter-wrap mog-limiters, preferably six or more pairs; an auger bed bearing holder; a heavy duty stainless steel toggle locking latch used on one or more of the MOG limiters and/or cover plates, preferably sixteen of said latches; one or more lynch pins for securing said latches, preferably sixteen of said lynch pins; one or more square wire lock pins, preferably nine or more of said lock pins; and any combination thereof.

From the foregoing, it can be seen that the present disclosure accomplishes at least all of the stated objectives.

EXAMPLES

Figure 21:
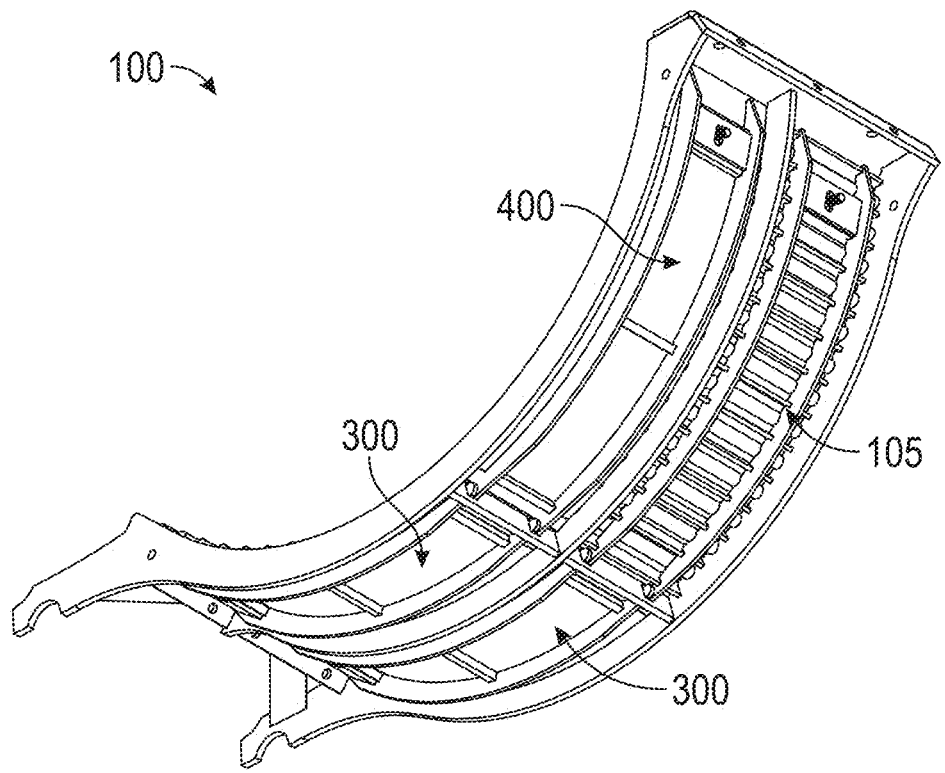
FIG. 21 is a fourth angled perspective view of the combination of FIG. 18.

In a preferred embodiment, a number of MOG limiters 105 are employed and strategically positioned on the concaves in positions #1, #2 and #3 within the combine as reflected on FIG. 21. This configuration provides maximum retention of the pods or other small grain within the rotary chamber. Using soybeans as an example, this increased retention at the beginning of the threshing operation allows for increased separation of the bean from the pod and also prevents the pods from dropping through to the cleaning system. In positions #2 and #3, the MOG limiters are solely utilized which allows for the threshed beans to flow out of the rotary chamber while retaining the MOG within the chamber. Experimentation has shown that this configuration is highly effective in opening the soybean pods to free the soybeans in the threshing operation and, thereafter, timely and efficiently exit the threshed soybeans from the rotary chamber to prevent damage or grinding while preventing MOG from flowing out of the chamber and into the cleaning system.

The number of cover plates utilized are directly related to the difficulty in getting the soybean pods to open and release the soybeans in the threshing operation. Therefore, when the farmer is harvesting greener soybeans which have a higher moisture content, retention time within the threshing chamber is increased by the addition of cover plates in position #2 and, depending upon conditions, #3. If the soybean plants being harvested at a particular time are well dried down, then lesser retention time in the threshing chamber is required, so the use of one or more additional MOG limiters in position #1 may allow for maximal efficient soybean harvest.

As a result of the improvements discussed in the present disclosure, the farmer is able to finish harvest of soybeans in an unirrigated field or a field having sandy soil with a combine set-up utilizing two or more MOG limiters in position #1, and then while in the field alter the configuration to match the configuration of FIG. 56A when transitioning to harvest the same variety of soybean plants having the same maturity, but which are greener due to irrigation or other soil factors which afford access to more moisture to the plants or factors which result in the differential moisture content of the plants under harvest.

Experimentation has identified a beneficial set up of a John Deere combine. This set up involves the use of three modified round bar concaves in positions #1, #2 and #3. MOG limiters are readily used on such concave designs and afford the farmer the maximum of adjustability based upon the harvest conditions being faced at the time. As for the Case IH combine, experimentation has identified a beneficial set up whereby the Max Flow concave is utilized on position #1 on which cover plates may be used as required and modified round bar concaves in positions #2 and #3 whereupon MOG limiters may be adjustably employed by the farmer.

Figure 22:
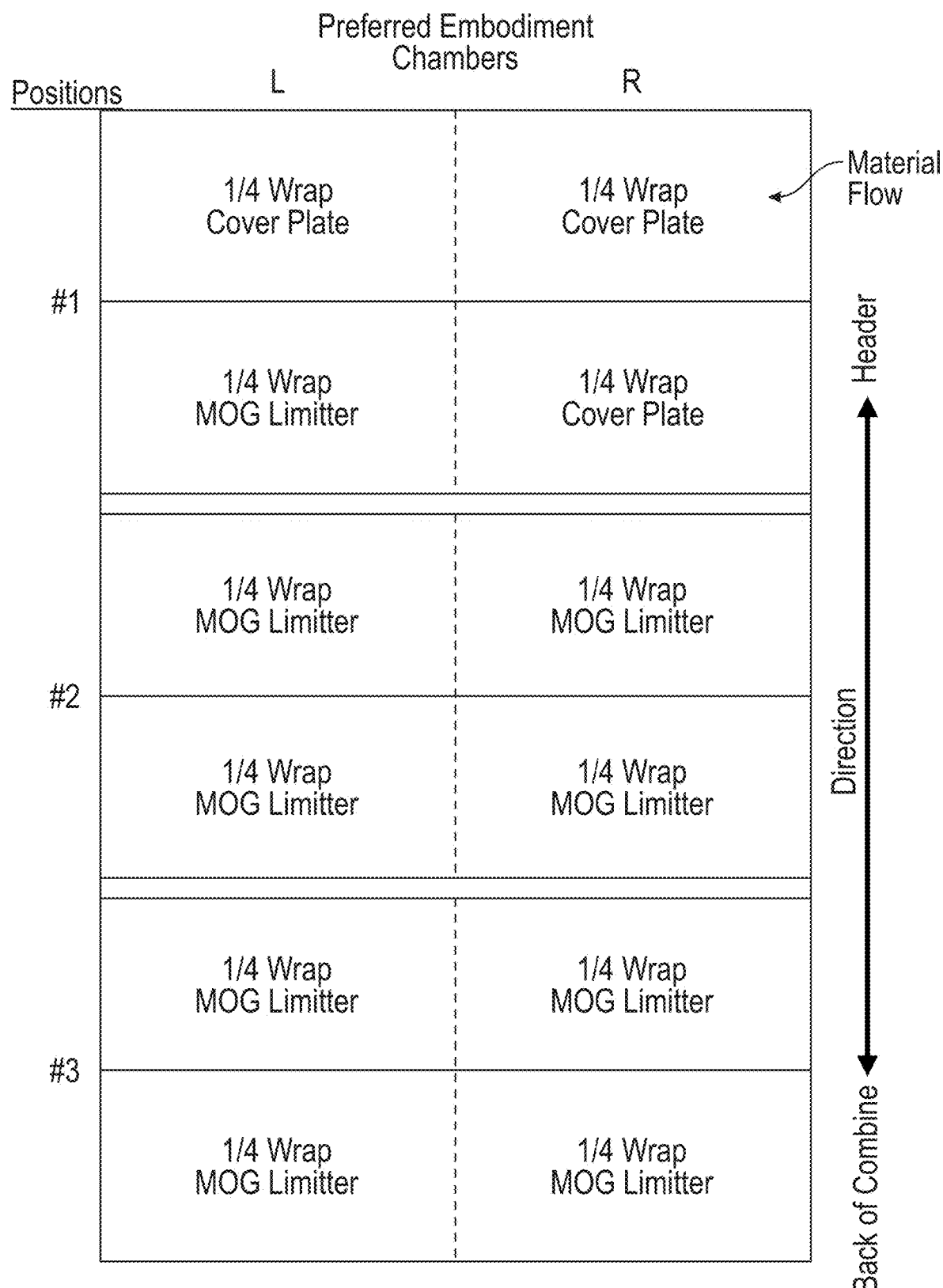
FIG. 22 shows an example configuration that employs a plurality of distinct combinations of concaves with MOG limiters and/or cover plates for the distinct concave position(s) of a combine, including the combination of FIG. 14 shown therein by way of example.

Regarding the embodiment shown throughout FIGS. 22-23, the modified MOG limiting concave assembly 100 was tested with wheat, and the wheat farmer was pleased with the results utilizing a plate on both the upper section and lower section of the 1st column with MOG Limiters in the remaining positions. The modified MOG limiting concave assembly 100 utilizes a ⅝" round bar having a ¾" gap in between; and a ⅜" wide MOG Limiter bar.

Regarding the embodiment shown throughout FIGS. 24-25, the modified MOG limiting concave assembly 200 utilizes alternating ⅝" round bars with ⅜" square bars, having a ⅛" gap with the top of the square bar positioned at an elevation ¼" above the top point of the round bars.

Regarding the embodiment shown throughout FIGS. 26-27, the modified MOG limiting concave assembly 300 utilizes a ¼" round bar having a ⅛" gap; and a grouping of ½" square bars having a 1⅛" gap; and further having a ⅛" elevation of the top of the square bars above top elevation point of the round bars.

Regarding the embodiment shown throughout FIGS. 28-29, the modified MOG limiting concave assembly 400 utilizes ⅝" round bar having a ¾" gap between each; every 3rd bar is a ⅜" square bar having a ⅞" gap on each side in relation to the round bar; and further having a ⅛" elevation of the top of the square bars above top elevation point of the round bars.

Comparative field data was gathered in a first field for the harvest of soybeans utilizing the following assemblies: the (1) OEM-JD S670 35' Conventional 3" and (2) the Calmer-JD S680 40' draper, as shown in Table 1:

| Sample Area | Loose Beans | Pods | x3 Beans/ Pod | Total | Loss per Sq Ft | BU/AC |
|---|---|---|---|---|---|---|
| 35 sq ft | 168 | 21 | 63 | 231.00 | 6.60 | 1.65 |
| 35 sq ft | 114 | 0 | 0 | 114.00 | 3.26 | 0.81 |
| | | | | Difference | 3.34 | 0.84 |
| Average BU/AC Loss with OEM ⅝"gap Concaves: | | | | | 1.65 | |
| Average BU/AC Loss with Calmer ¾"gap Concaves: | | | | | 0.81 | |
| Calmer BU/AC Advantage: | | | | | 0.84 | 50.6% |

Comparative field data was gathered in a second field for the harvest of soybeans utilizing the following assemblies: the (1) OEM-JD 9670 30' Head and (2) the Calmer-JD S680 40' draper, as shown in Table 2:

| Sample Area | Loose Beans | Pods | x3 Beans/ Pod | Total | Loss per Sq Ft | BU/AC |
|---|---|---|---|---|---|---|
| 30 sq ft | 165 | 25 | 75 | 240.00 | 8.00 | 2.00 |
| 30 sq ft | 113 | 7 | 21 | 134.00 | 4.47 | 1.12 |
| | | | | Difference | 3.53 | 0.88 |
| Average BU/AC Loss with OEM ⅝"gap Concaves: | | | | | 2.00 | |
| Average BU/AC Loss with Calmer ¾"gap Concaves: | | | | | 1.12 | |
| Calmer BU/AC Advantage: | | | | | 0.88 | 44.2% |

Comparative field data was gathered in a third field for the harvest of soybeans utilizing the following assemblies: the (1) OEM-JD 9670 30' Head and (2) the Calmer-JD S680 40' draper, as shown in Table 3:

| Sample Area | Loose Beans | Pods | x3 Beans/ Pod | Total | Loss per Sq Ft | BU/AC |
|---|---|---|---|---|---|---|
| 30 sq ft | 98 | 8 | 24 | 122.00 | 4.07 | 1.02 |
| 40 sq ft | 130 | 0 | 0 | 130.00 | 3.25 | 0.81 |
| | | | | Difference | 0.82 | 20.1% |
| Average BU/AC Loss with OEM ⅝"gap Concaves: | | | | | 1.02 | |
| Average BU/AC Loss with Calmer ¾"gap Concaves: | | | | | 0.81 | |
| Calmer BU/AC Advantage: | | | | | 0.20 | 20.1% |

The average results from the three counts are shown in Table 4:

| | | |
|---|---|---|
| Average Soybean Difference: | 2.56 | |
| Average BU/AC Loss with OEM 5/8"gap Concaves with no inserts: | 1.56 | |
| Average BU/AC Loss with Calmer 3/4"gap Concaves with cover plates and MOG limiters: | 0.91 | |
| Advantage Calmer | 0.64 | 41.2% |

A high performance upgrade kit that reduces grain loss during harvest was compared across corn and soybeans, as shown in Table 5:

| Crop | # Samples | Grain Loss | BU/AC |
|---|---|---|---|
| Corn | 1 Sample with JD Rotary Combine | 51% | 0.9 |
| Corn | 2 Samples with CASE Flagship | 47.1% | 1.76 |
| Soybeans | 2 Samples with JD Rotary Combine | 41.2% | .64 |

Another such high performance upgrade kit that reduces grain loss during harvest was compared across different types of combines, as shown in Table 6:

| 3 Combine Comparison | CASE Flagship | CASE Legacy | JD S-Series |
|---|---|---|---|
| Kernels (BU/AC) with the kits described herein installed | 2.90 / 1.45 | 1.57 / 0.8 | 0.73 / 0.36 |

FIG. 45 shows soybean pods that were harvested using a high performance upgrade kit that reduces grain loss during harvest.

Another comparison among residue data in a Calmer BT Super Chopper vs. JD RowMax is shown in Table 7:

| | "Small % <4"" long" | "Medium % 4-8"" long" | "Large % >8"" long" |
|---|---|---|---|
| 6 rows of Calmer 12 Blade Choppers | 39.1% | 31.7% | 29.3% |
| 6 rows of John Deere RowMax | 18.4% | 30.7% | 50.9% |

Residue was separated into categories; each category was weighed. Weights are presented as a % of total weight for residue produced.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 8

| | List of Reference Characters |
|---|---|
| 100 | assembly |
| 101 | concave |
| 102 | upper concave connector |
| 102A | upper concave connector (opposite side) |
| 103 | lower concave connector |
| 104 | insert slot |
| 105 | MOG limiter |
| 106 | insert |
| 107 | rail support |
| 108 | mounting plate |
| 109 | notch |
| 110 | concave crossbar |
| 111 | hinge point |
| 112 | bolts |
| 200 | mounting plate |
| 201 | threaded post |
| 202 | J-hook, threaded at one end |
| 203 | hexagonal sleeve (female threaded) |
| 204 | lever |
| 300 | left-side cover |
| 301 | curvilinear plate |
| 302 | first arced support |
| 303 | second arced support |
| 304 | slot |
| 305 | mounting plate |
| 306 | bridge support |
| 400 | right-side cover |
| 401 | curvilinear plate |
| 402 | first arced support |
| 403 | second arced support |
| 404 | slot |
| 405 | mounting plate |
| 406 | bridge support |
| 500 | first embodiment of a modified concave |
| 501 | an enhanced side flow rail |
| 502 | a C-clamp end |
| 503 | first-end round bar drive |
| 504 | second end plate |
| 505 | quarter wrap center catch |
| 506 | an enhanced flow center rail |
| 507 | round bars |
| 508 | left over center catch |
| 509 | right over center catch |
| 600 | second embodiment of a modified concave |
| 601 | an enhanced side flow rail |
| 602 | a C-clamp end |
| 603 | first-end round bar drive |
| 604 | second end plate |
| 605 | quarter wrap center catch |
| 606 | an enhanced flow center rail |
| 607 | rub bars |
| 608 | round bars |
| 609 | left over center catch |
| 610 | right over center catch |
| 700 | third embodiment of a modified concave |
| 701 | an enhanced side flow rail |
| 702 | a C-clamp end |
| 703 | first-end round bar drive |
| 704 | second end plate |
| 705 | quarter wrap center catch |
| 706 | an enhanced flow center rail |
| 707 | rub bars |
| 708 | round bars |
| 709 | left over center catch |
| 710 | right over center catch |
| 800 | fourth embodiment of a modified concave |
| 801 | an enhanced side flow rail |
| 802 | a C-clamp end |
| 803 | first-end round bar drive |
| 804 | second end plate |
| 805 | quarter wrap center catch |
| 806 | rub bars |
| 807 | round bars |
| 808 | an enhanced flow center rail |
| 809 | left over center catch |
| 810 | right over center catch |
| 900 | left-side quarter wrap (QW) cover plate assembly |
| 901 | left-side quarter wrap cover plate |
| 902 | left-side quarter wrap cover plate support |
| 903 | left-side cover plate over center handle anchor plate |
| 904 | left-side quarter wrap cover plate rail |
| 905 | J-bolt |
| 906 | threaded long-steel coupling nut |
| 907 | threaded long hex head screw |
| 908 | threaded nylon insert lock nut |

TABLE 8-continued

List of Reference Characters

| | |
|---|---|
| 909 | steel washer |
| 910 | CMF over center handle |
| 1000 | right-side quarter wrap (QW) cover plate assembly |
| 1001 | right-side quarter wrap cover plate |
| 1002 | right-side quarter wrap cover plate support |
| 1003 | right-side cover plate over center handle anchor plate |
| 1004 | right-side quarter wrap cover plate rail |
| 1005 | J-bolt |
| 1006 | threaded long-steel coupling nut |
| 1007 | threaded long hex head screw |
| 1008 | threaded nylon insert lock nut |
| 1009 | steel washer |
| 1010 | CMF over center handle |
| 1100 | left-side quarter wrap (QW) MOG limiter assembly |
| 1101 | left-side quarter wrap MOG limiting rail |
| 1102 | left-side MOG limiting rub bar |
| 1103 | left-side ML over center handle anchor plate |
| 1104 | J bolt |
| 1105 | threaded long steel coupling nuts |
| 1106 | threaded long hex head screw |
| 1107 | threaded nylon insert locknut |
| 1108 | steel washer |
| 1109 | CMF over center handle |
| 1200 | right-side quarter wrap (QW) MOG limiter assembly |
| 1201 | right-side quarter wrap MOG limiting rail |
| 1202 | right-side MOG limiting rub bar |
| 1203 | right-side ML over center handle anchor plate |
| 1204 | J bolt |
| 1205 | threaded long steel coupling nuts |
| 1206 | threaded long hex head screw |
| 1207 | threaded nylon insert locknut |
| 1208 | steel washer |
| 1209 | CMF over center handle |
| 1300 | center over latch |
| 1301 | base plate (e.g., pentagonal body) |
| 1302 | handle |
| 1303 | padlock hole |
| 1304 | latch arm |
| 1305 | loop |
| 1306 | center pin |
| 1307 | ear |
| 1308 | slot |
| 1309 | hole |
| 1310 | threaded nylon insert locknut |
| 1311 | subbase |
| 1400 | over-center latch assembly |
| 1401 | base plate (e.g., pentagonal body) |
| 1402 | handle |
| 1403 | locking hole |
| 1404 | lever |
| 1405 | loop |
| 1406 | center pin |
| 1407 | ear |
| 1408 | slot |
| 1409 | hole |
| 1410 | threaded nylon insert locknut |
| 1411 | subbase |
| 1412 | locking mechanism |
| 1450 | over-center latch |
| 1500 | first mounting assembly |
| 1501 | first over-center catch |
| 1502 | second over-center catch |
| 1503 | adjacent plate |
| 1504 | end plate |
| 1550 | second mounting assembly |
| 1551 | first over-center catch |
| 1552 | second over-center catch |
| 1554 | end plate |
| 1600R | MOG limiter assembly (right) |
| 1600L | MOG limiter assembly (left) |
| 1651 | rub bar |
| 1652 | rail |
| 1653R | extended mounting portion (right) |
| 1653L | extended mounting portion (left) |
| 1654 | hinge point |
| 1700R | cover plate assembly (right) |
| 1700L | cover plate assembly (left) |
| 1701 | curvilinear plate |
| 1702 | rail |
| 1703R | extended mounting portion (right) |
| 1703L | extended mounting portion (left) |
| 1704 | hinge point |
| 1705 | contact protrusion |
| 1750R | cover plate assembly (right) |
| 1750L | cover plate assembly (left) |
| 1751 | curvilinear plate |
| 1752 | rail |
| 1753R | extended mounting portion (right) |
| 1753L | extended mounting portion (left) |
| 1754 | hinge point |
| 1755 | contact protrusion |
| 1800 | locknut |
| 1801 | nylon insert |
| 2600 | concave |
| 2601 | side rail |
| 2602 | center rail |
| 2603 | cros frame |
| 2604 | first end |
| 2605 | second end |
| 2650 | concave |
| 2651 | side rail |
| 2652 | center rail |
| 2653 | cross frame |
| 2654 | first end |
| 2655 | second end |
| 2656 | wire lock clevis pin |
| 2700 | concave assembly |
| 2701 | side rail |
| 2702 | center rail |
| 2703 | cross frame |
| 2704 | first end |
| 2705 | second end |
| 2750 | concave assembly |
| 2751 | side rail |
| 2752 | center rail |
| 2753 | cross frame |
| 2754 | first end |
| 2755 | second end |
| 2756 | wire lock clevis pin |

Glossary

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. An over-center latch for attaching a cover plate or MOG limiter to an outer surface of a concave for a combine comprising:
   a subbase including a pair of ears protruding therefrom;
   a handle in rotational communication with the pair of ears at a base of the handle;
   a center pin positioned between the base of the handle and a distal end of the handle configured to be in rotational communication with the handle;
   a lever attached at a base of the lever to the center pin, wherein the center pin allows the lever to rotate with respect to a handle;
   a loop at a distal end of the lever opposite the base of the lever; and
   a base plate attached to a bottom of the subbase;
   wherein the cover plate or MOG limiter includes:
      rails running curvilinear along a length of the cover plate or MOG limiter;
      extended mounting portions extending outwardly from an outer surface of each of the rails and each of the extended mounting portions forming an edge, wherein each of the edges are flat and angled away from the rails such that no portion of the edges are parallel to any portion of the outer surface of the rails from which the extended mounting portions extend;
   wherein the base plate attaches to the edges of the extended mounting portions;
   wherein either the handle or the lever can be pulled into a vertical position orthogonal the subbase.

2. The over-center latch of claim 1, further comprising a lock hole protruding from the subbase in a same direction as the pair of ears.

3. The over-center latch of claim 2, further comprising a locking mechanism positioned within the lock hole.

4. The over-center latch of claim 3, wherein the locking mechanism is a linchpin.

5. The over-center latch of claim 1, further comprising a threaded portion along a length of the lever that extends into the center pin, wherein the center pin includes a threaded section to receive the threaded portion of the lever.

6. The over-center latch of claim 5, further comprising a locking nut that can attach the threaded portion of the lever to the center pin.

7. The over-center latch of claim 6, further comprising a nylon friction ring positioned within the locking nut that dampens vibration.

8. The over-center latch of claim 1, wherein the handle includes an angled portion on the distal end of the handle to assist with lifting the handle, wherein the angled portion is angled away from the subbase when the handle is positioned substantially parallel to the subbase.

9. The over-center latch assembly of claim 1, wherein the subbase includes a plurality of apertures and the base plate includes a plurality of holes, wherein the apertures may align with the holes for connecting the base plate to the subbase.

10. The over-center latch assembly of claim 9, further comprising threaded rods or screws inserted through the holes and the apertures for connecting the subbase and base plate, wherein the threaded rods or screws include a locking nut with a nylon insert to fasten the threaded rods or screws to the over-center latch assembly.

11. The over-center latch assembly of claim 1, wherein the subbase and the base are a monolithic component via weld such that the pair of ears extend directly from the base plate.

12. The over-center latch assembly of claim 1, wherein the base plate includes slots positioned at opposite ends of the base plate and the base plate attaches to the MOG limiter or the cover plate via plug welds in the slots.

13. The over-center latch assembly of claim 12, wherein the over-center latch assembly secures the cover plate or the MOG limiter to an outer surface of a concave.

14. The over-center latch assembly of claim 13, wherein the concave includes catches for the loop to connect to for securing the cover plate or the MOG limiter to the concave.

15. A method for securing a MOG limiter or cover plate to a concave via an over-center latch assembly, comprising:
   positioning a hinge point of the MOG limiter or cover plate within a cross bar of the concave;
   lifting a handle of the over-center latch such that a lever operatively connected to the handle extends outwardly away from the MOG limiter or cover plate;
   placing a loop that is positioned at a distal end of the lever on a catch of the concave;
   rotating the handle a direction opposite the lifting such that lever retracts back towards the MOG limiter or cover plate; and
   placing a locking mechanism through a lock hole on the over-center latch assembly after the handle has been rotated past the lock hole.

16. The method of claim 15, further comprising securing the cover plates and/or MOG limiters to the concave.

17. The method of claim 15, further comprising inserting a wire lock clevis pin through rails of the cover plates and/or MOG limiters and a center rail of the concave.

18. The method of claim 15, wherein the cover plates and/or MOG limiters comprise half a length of the concave.

19. A combine including a concave, comprising:
   a plurality of cover plates and/or MOG limiters positioned on an outer surface of the concave; and
   a plurality of over-center latch assemblies configured to secure the plurality of cover plates and/or MOG limiters to the outer surface of the concave;
   wherein each of the cover plates and/or MOG limiters includes one of the plurality of over-center latch assemblies secured thereto;
   wherein each of the plurality of over-center latch assemblies comprises a base plate with a pair of ears extending therefrom; a handle operatively connected to the pair of ears; a center pin positioned along a length of the handle and capable of rotating with relation to the handle; a lever extending from the center pin; and a loop positioned at a distal end of the lever;
   wherein the cover plates and/or MOG limiters are secured to the concave via insertion of hinge points into a cross bar of the concave, wherein the hinge points are positioned on the cover plate and/or MOG limiter at an end opposite the over-center latch assembly, wherein the cover plate and/or MOG limiter is further secured to the concave via attaching the loops of the over-center latch assemblies to catches positioned at each end of the concave.

* * * * *